(12) United States Patent
Fujii et al.

(10) Patent No.: US 11,249,722 B2
(45) Date of Patent: Feb. 15, 2022

(54) SEMICONDUCTOR DEVICE AND METHOD OF CONTROLLING THE SEMICONDUCTOR DEVICE

(71) Applicant: RENESAS ELECTRONICS CORPORATION, Tokyo (JP)

(72) Inventors: Taro Fujii, Tokyo (JP); Takao Toi, Tokyo (JP); Teruhito Tanaka, Tokyo (JP); Katsumi Togawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 137 days.

(21) Appl. No.: 16/410,825

(22) Filed: May 13, 2019

(65) Prior Publication Data

US 2019/0384574 A1 Dec. 19, 2019

(30) Foreign Application Priority Data

Jun. 15, 2018 (JP) .............................. JP2018-114861

(51) Int. Cl.
*G06F 7/544* (2006.01)
*G06F 17/16* (2006.01)

(52) U.S. Cl.
CPC ............ *G06F 7/5443* (2013.01); *G06F 17/16* (2013.01)

(58) Field of Classification Search
CPC ...... G06F 7/5443; G06F 7/57; G06F 15/7867; G06F 17/16; G06F 15/17343
See application file for complete search history.

(56) References Cited

U.S. PATENT DOCUMENTS

| | | | |
|---|---|---|---|
| 6,738,891 B2 | 5/2004 | Fujii et al. | |
| 7,406,573 B2* | 7/2008 | Huppenthal | H05K 1/181 |
| | | | 711/154 |
| 7,680,962 B2* | 3/2010 | Anjo | G06F 15/8007 |
| | | | 710/22 |

(Continued)

FOREIGN PATENT DOCUMENTS

| | | | |
|---|---|---|---|
| JP | 2005122303 A | * | 5/2005 |
| JP | 3674515 B2 | | 7/2005 |
| JP | 2017-021483 A | | 1/2017 |

OTHER PUBLICATIONS

T. Fujii et al., "New Generation Dynamically Reconfigurable Processor Technology for Accelerating Embedded AI Applications," 2018 IEEE Symposium on VLSI Circuits, Honolulu, HI, 2018, pp. 41-42, doi: 10.1109/VLSIC.2018.8502438. (Year: 2018).*

(Continued)

*Primary Examiner* — Jaweed A Abbaszadeh
*Assistant Examiner* — Carlo Waje
(74) *Attorney, Agent, or Firm* — McDermott Will & Emery LLP

(57) ABSTRACT

A semiconductor device includes a dynamic reconfiguration processor that performs data processing for input data sequentially input and outputs the results of data processing sequentially as output data, an accelerator including a parallel arithmetic part that performs arithmetic operation in parallel between the output data from the dynamic reconfiguration processor and each of a plurality of predetermined data, and a data transfer unit that selects the plurality of arithmetic operation results by the accelerator in order and outputs them to the dynamic reconfiguration processor.

19 Claims, 40 Drawing Sheets

(56) References Cited

U.S. PATENT DOCUMENTS

| | | | | |
|---|---|---|---|---|
| 8,402,298 | B2* | 3/2013 | Yabe | G06F 1/04 |
| | | | | 713/400 |
| 10,032,110 | B2* | 7/2018 | Young | G06F 17/16 |
| 10,698,842 | B1* | 6/2020 | Dastidar | G06F 9/3877 |
| 10,817,260 | B1* | 10/2020 | Huang | G06F 7/523 |
| 10,824,584 | B1* | 11/2020 | Noguera Serra | G06F 15/17306 |
| 10,902,315 | B2* | 1/2021 | Fang | G06N 3/08 |
| 10,936,941 | B2* | 3/2021 | Li | G06N 3/0454 |
| 11,003,985 | B2* | 5/2021 | Kim | G06F 7/5443 |
| 2009/0083519 | A1* | 3/2009 | Yang | G06F 7/483 |
| | | | | 712/36 |
| 2010/0332795 | A1* | 12/2010 | Furukawa | G06F 9/3001 |
| | | | | 712/29 |
| 2017/0115958 | A1* | 4/2017 | Langhammer | G06F 7/57 |
| 2018/0046903 | A1* | 2/2018 | Yao | G06N 3/082 |
| 2018/0121795 | A1* | 5/2018 | Kato | G06N 3/0454 |
| 2019/0026078 | A1* | 1/2019 | Bannon | G06F 7/52 |
| 2019/0087708 | A1* | 3/2019 | Goulding | G06F 12/0824 |
| 2019/0236049 | A1* | 8/2019 | Vantrease | G06F 15/8046 |
| 2020/0341758 | A1* | 10/2020 | Wan | G06F 9/3802 |

OTHER PUBLICATIONS

H. Amano, "A Survey on Dynamically Reconfigurable Processors", IEICE Trans. Commun., vol. E89-B, No. 12 Dec. 2006, https://search.ieice.org/bin/pdf_link.php?category=B&lang=E&year=2006&fname=e89-b_12_3179&abst= (Year: 2006).*

H. Amano. "Japanese 2nd generation Dynamically Reconfigurable Processors". Presentation Slides. https://vdocuments.mx/japanese-2-nd-generation-dynamically-reconfigurable-processors.html (Year: 2009).*

N. P. Jouppi et al., "In-datacenter performance analysis of a tensor processing unit," 2017 ACM/IEEE 44th Annual International Symposium on Computer Architecture (ISCA), Toronto, ON, 2017, pp. 1-12, doi: 10.1145/3079856.3080246. (Year: 2017).*

Oshita et al. "Data transfer controller, electronic equipment and data transfer control method". Machine Translation of JP2005122303A. https://patents.google.com/patent/JP2005122303A/en?oq=JP2005122303. (Year: 2005).*

"SIMD", [online], (Search on Jan. 26, 2018), Internet <URL:https://ja.wikipedia.org/wiki/SIMD> corresponding to "SIMD" at https://en.wikipedia.org/wiki/SIMD.

"Mechanisms for 30 times faster mechanical learning with Google Tensor Processing Unit", [online], [Search Jan. 26, 2018], Internet <URL:https://cloudplatform-jp.googleblog.com/2017/05/an-in-depth-look-at-googles-first-tensor-processing-unit-tpu.html>.

English Translation of "Mechanisms for 30 times faster mechanical learning with Google Tensor Processing Unit", [online], [Search Jan. 26, 2018], Internet <URL:https://cloudplatform-jp.googleblog.com/2017/05/an-in-depth-look-at-googles-first-tensor-processing-unit-tpu.html>.

Japanese Notice of Reasons for Refusal issued in corresponding Japanese Patent Application No. 2018-114861, dated Oct. 12, 2021, with Engish translation.

* cited by examiner

FIG. 9

FIRST-ROW DATA OF MATRIX DATA IN (m=20)

$[b_0 \ b_1 \ \ldots \ b_{19}]$

×

MATRIX DATA W (m=20, n=20)

$\begin{bmatrix} a_{0,0} & a_{0,1} & \ldots & a_{0,19} \\ a_{1,0} & a_{1,1} & \ldots & a_{1,19} \\ a_{19,0} & a_{19,1} & \ldots & a_{19,19} \end{bmatrix}$

=

$\begin{bmatrix} (a_{0,0} \times b_0 + a_{1,0} \times b_1 + \ldots + a_{19,0} \times b_{19}) \\ (a_{0,1} \times b_0 + a_{1,1} \times b_1 + \ldots + a_{19,1} \times b_{19}) \\ \ldots \\ (a_{0,19} \times b_0 + a_{1,19} \times b_1 + \ldots + a_{19,19} \times b_{19}) \end{bmatrix}$

SEMICONDUCTOR DEVICE AND METHOD OF CONTROLLING THE SEMICONDUCTOR DEVICE

CROSS-REFERENCE TO RELATED APPLICATIONS

The disclosure of Japanese Patent Application No. 2018-114861 filed on Jun. 15, 2018 including the specification, drawings and abstract is incorporated herein by reference in its entirety.

BACKGROUND

The present invention relates to a semiconductor device and a control method thereof, and more particularly relates to, for example, a semiconductor device and a control method thereof which are suitable for realizing efficient arithmetic processing.

In addition to Central Processing Units (CPU) there are dynamic reconfiguration processors that perform high processing performance. The dynamic reconfiguration processors is referred Dynamically Reconfigurable Processor (DRP) or array-type processor. The dynamic reconfiguration processor is a processor capable of dynamically reconfiguring a circuit by dynamically switching the operation content of each of a plurality of processor elements and the connection relationship between the plurality of processor elements in accordance with operation instructions sequentially given. A technique related to a dynamic reconfiguration processor is disclosed in, for example, Japanese Patent No. 3674515 (Patent Document 1) as an array processor.

In addition, "SIMD", <ja.wikipedia.org/wiki/SIMD> (Non-Patent Document 1) and "Mechanisms for 30 times faster mechanical learning with Google Tensor Processing Unit", <cloudplatform-jp.googleblog.com/2017/05/an-in-depth-look-at-googles-first-tensor-processing-unit-tpu.html> (Non-Patent Document 2) disclose techniques related to parallel arithmetic processing.

SUMMARY

However, the processing performance of the dynamic reconfiguration processor disclosed in Patent Document 1 is insufficient to perform large-scale arithmetic processing such as, for example, deep learning processing. Other objects and novel features will become apparent from the description of this specification and the accompanying drawings.

According to one embodiment, the semiconductor device includes a data processing unit that performs data processing on sequentially input first input data and sequentially outputs the result of data processing as first output data, a parallel arithmetic unit that performs arithmetic processing in parallel between the first output data sequentially output from the data processing unit and each of a plurality of predetermined data, a holding circuit that holds the results of the arithmetic processing, and a first data transfer unit that sequentially selects a plurality of arithmetic processing results held by the accelerator in order and sequentially outputs the results of the arithmetic processing as the first input data.

According to another embodiment, a control method of a semiconductor device performs arithmetic processing on first input data sequentially input using a data processing unit, sequentially outputs the result of arithmetic processing as first output data, performs arithmetic processing in parallel between the first output data sequentially output from the data processing unit and each of a plurality of predetermined data using an accelerator, sequentially selects a plurality of arithmetic processing results output from the accelerator, and sequentially outputs the same as the first input data.

According to the above-mentioned embodiment, it is possible to provide a semiconductor device capable of realizing efficient arithmetic processing and a control method thereof.

BRIEF DESCRIPTION OF THE DRAWINGS

FIG. 9 is a diagram showing the multiplication equation of the first row of data matrix In and the matrix data W.

DETAILED DESCRIPTION

Figure 1:
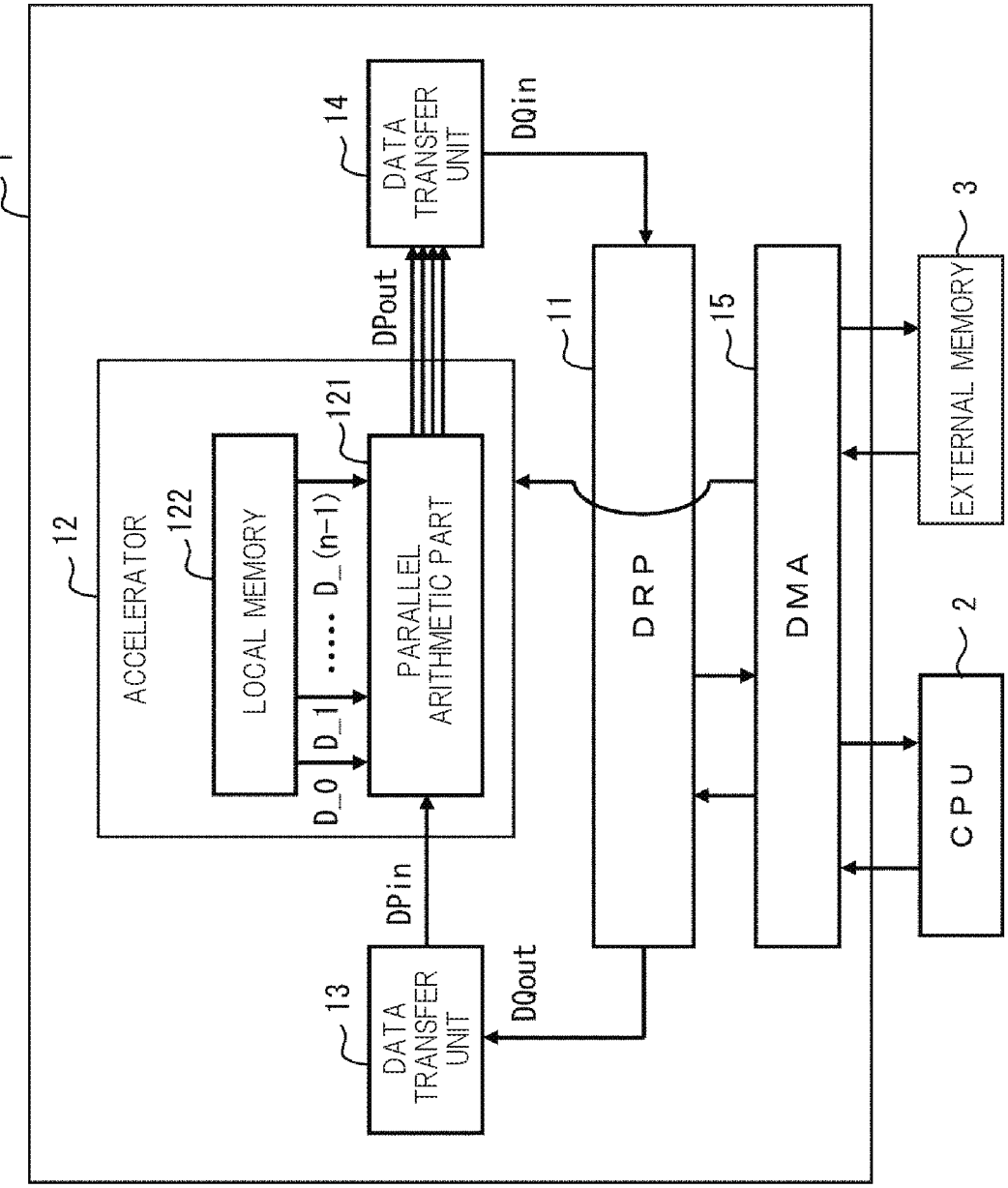
FIG. 1 is a block diagram showing a configuration example of a semiconductor system in which a semiconductor device according to a first embodiment is mounted.

For clarity of explanation, the following description and drawings are appropriately omitted and simplified. The respective elements described in the drawings as functional blocks for performing various processes can be configured by a CPU (Central Processing Unit), a memory, and other circuits in terms of hardware, and are realized by programs loaded in the memory in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

The programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory), CD-R, CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

First Embodiment

FIG. 1 is a block diagram showing a configuration example of a semiconductor system SYS1 on which a semiconductor system 1 according to a first embodiment of the present invention is mounted. The semiconductor device 1 according to the present embodiment includes an accelerator having a parallel arithmetic part that performs parallel arithmetic operation, a data processing unit such as a dynamic reconfiguration processor that sequentially performs data exchange, and a data transfer unit that sequentially selects and sequentially outputs from a plurality of arithmetic processing results by the accelerator to the data processing unit. As a result, the semiconductor device 1 and the semiconductor system SYS1 including the semiconductor device 1 according to the present embodiment can perform a large amount of regular data processing using an accelerator, and perform other data processing using a data processing unit, thereby realizing efficient arithmetic processing. Hereinafter, a concrete description will be given.

As shown in FIG. 1, the semiconductor system SYS1 includes a semiconductor device 1, a CPU2, and an external memory 3. The semiconductor device 1 includes a dynamic reconfiguration processor (hereinafter referred to as a DRP) 11, an accelerator 12, a data transfer unit 13, a data transfer unit 14, and a Direct Memory Access (DMA) 15.

The DRP 11 executes arithmetic processing on data sequentially inputted from the external memory 3, for example, and sequentially outputs the result of the arithmetic processing as a data DQout. In this manner, the DRP 11 can transmit and receive data every cycle. Here, the DRP 11 is a data processor capable of dynamically reconfiguring circuits by dynamically switching the operation content of each of a plurality of processor elements and the connections between the plurality of processor elements in accordance with operation instructions read from a configuration data memory provided in the DRP 11.

For example, the DRP 11 includes a plurality of processor elements provided in array, a plurality of switching elements provided corresponding to the plurality of processor elements, and a status managing unit. The state management unit issues instructions pointer determined in advance by a program to each of the processor elements. Each of the processor elements comprises, for example, at least an instruction memory and an arithmetic unit. The arithmetic unit performs arithmetic processing in accordance with an operation instruction specified by an instruction pointer from the state management unit, among a plurality of operation instructions stored in the instruction memory. The arithmetic unit may be, for example, a 16-bit arithmetic unit that performs arithmetic processing on 16-bit width data, or an arithmetic unit that performs arithmetic processing on other bit width data. Alternatively, the arithmetic unit may be configured by a plurality of arithmetic units. Each of the switch elements sets a connection relationship between a corresponding processor element and another processor element in accordance with an operation instruction read from an instruction memory of the corresponding processor element. Thereby, the DRP 11 can dynamically switch the circuitry in accordance with the sequentially applied operation instructions.

In this embodiment, the DRP 11 is provided in the semiconductor device 1, but it is not limited thereto. For example, a central processing unit (CPU) may be provided instead of the DRP 11, as long as the CPU performs arithmetic processing on sequentially inputted data.

The data transfer unit 13 distributes or serializes the data DQout in accordance with, for example, the degree of parallelism of the arithmetic processing required for the parallel arithmetic part 121, and outputs the data as data DPin.

The accelerator 12 performs an arithmetic operation between the data DPin sequentially outputted from the data transfer unit 13 and n (n is an integer equal to or greater than 2) pieces of predetermined data D_0 to D_(n−1) in parallel. In the following description, the predetermined data D_0 to D_(n−1) are not distinguished and may be simply referred to as predetermined data D.

Specifically, the accelerator 12 includes a parallel arithmetic part 121 and a local memory 122. The local memory 122 stores, for example, a plurality of pieces of predetermined data D_0 to D_(n−1) read from the external memory 3 and initial setting information such as a bias value b.

For example, when k×m elements constituting matrix data with k rows and m columns are successively input to the accelerator 12 as data DPin, k rows each having m data are input to the accelerator 12 sequentially, i.e., k×m data. However, regardless of the value of k, the accelerator 12 uses the predetermined data D_0 to D_(n−1) for each of the m data, which are input data for one row, for arithmetic processing. Therefore, n pieces of predetermined data D_0 to D_(n−1), i.e., m×n pieces of data corresponding to m data corresponding to one row of input data are stored in the local memory 122. The parallel arithmetic part 121 is configured by a plurality of arithmetic units that perform arithmetic processing in parallel. The parallel arithmetic part 121 performs arithmetic operation in parallel between the data DPin and each of the plurality of predetermined data D_0 to D_(n−1), and outputs n arithmetic processing results as a data DPout.

The data transfer unit 14 sequentially selects n pieces of data DPout output in parallel from the accelerator 12, and sequentially outputs the selected pieces of data as a data DQin.

The DRP 11 performs arithmetic processing on the data DQin sequentially outputted from the data transfer unit 14, and sequentially outputs the results of the arithmetic processing to, for example, the external memory 3.

The CPU 2 controls the operation of the semiconductor device 1 in accordance with a control instruction read from the external memory 3, for example. More specifically, the CPU 2 prepares data strings (descriptors) for instructing operations of the accelerators 12 and the data transfer units 13 and 14 in detail, and stores the data strings (descriptors) in the external memory 3.

The DMA 15 reads the descriptors from the external memory 3, interprets the contents, and issues an operation instruction to the accelerator 12 and the data transfer units 13 and 14. For example, the DMA 15 transfers an initial setting information stored in the external memory 3 to the local memory 122 in accordance with an instruction described in the descriptor. The DMA 15 instructs the data transfer unit 13 to distribute or serialize the data DPin in accordance with the degree of parallelism of the arithmetic processing by the parallel arithmetic part 121. The DMA 15 instructs the data transfer unit 14 to combine or serialize the n pieces of data DPout outputted in parallel in accordance with the degree of parallelism of the arithmetic processing by the parallel arithmetic part 121.

When the operation specified by one descriptor is completed, the DMA 15 reads the next descriptor from the external memory 3, and issues an operation instruction to the accelerator 12 and the data transfer units 13 and 14. It is preferable that the descriptor is read prior to the completion of the operation by the descriptor read immediately before. Thereby, the processing latency can be hidden.

The descriptors may be applied from programs operating in the DRP 11 instead of the CPU 2, or may be generated in advance.

Figure 2:
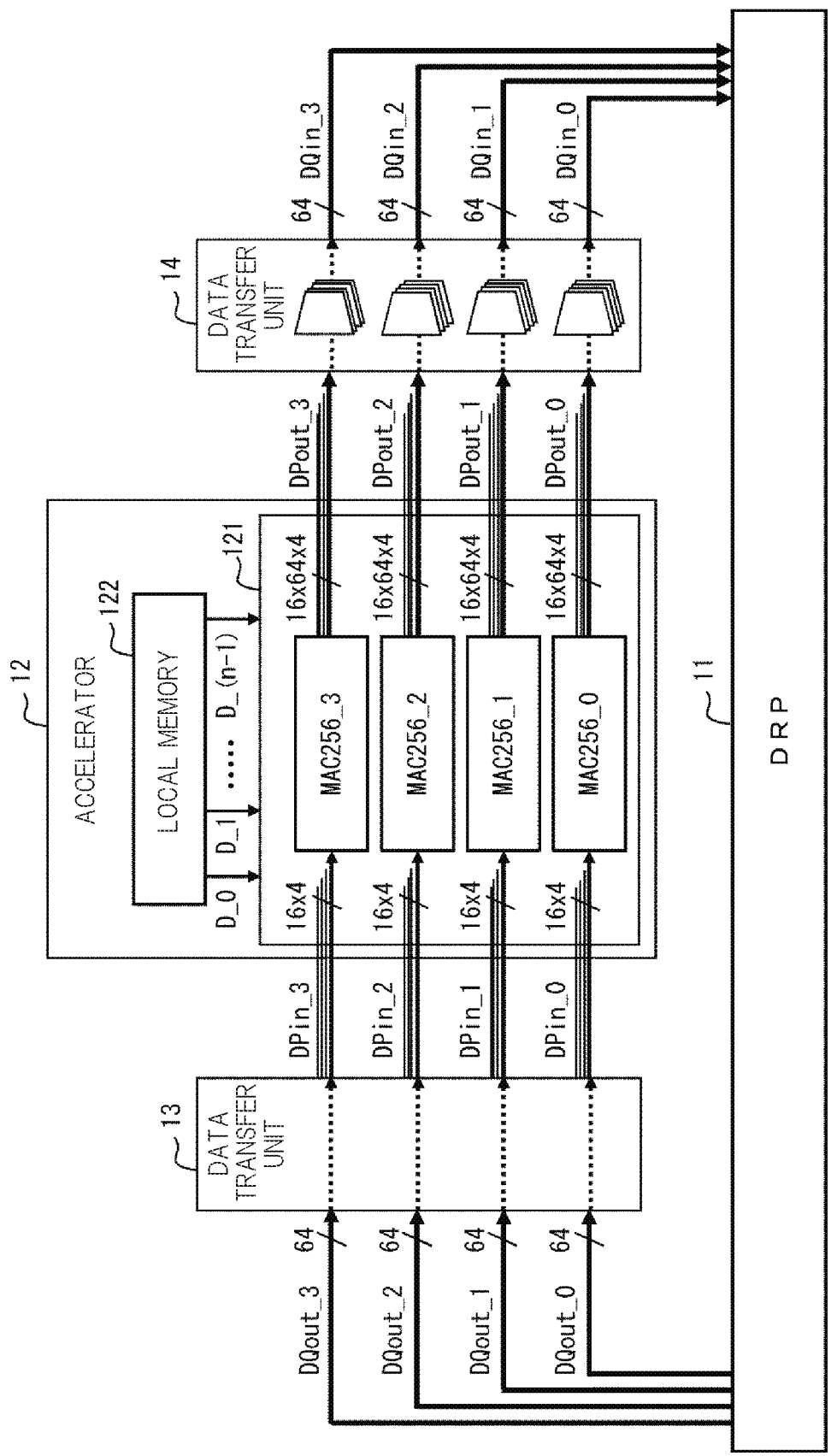
FIG. 2 is a block diagram illustrating a specific configuration example of a semiconductor device of FIG. 1.

FIG. 2 is a block diagram showing a specific configuration example of the semiconductor device 1. In FIG. 2, the DRP 11 outputs data DQout of 64-bit width of 4 channels as data DQout_0 to DQout_3. The DRP 11 is not limited to outputting data DQout_0 to DQout_3 of four channels, and can be appropriately changed to a configuration for outputting data of any number of channels and any number of bit widths.

In FIG. 2, the data transfer unit 13 transfers the 64-bit width data DQout_0 to DQout_3 sequentially output from the DRP 11 as the data DPin_0 to DPin_3. In FIG. 2, each of the data DPin_0 to DPin_3 constitutes 64-bit width data by bundling four 16-bit width operation results represented by the floating-point method, but the present invention is not limited thereto. For example, 16-bit width, 32-bit width, and 48-bit width data may be configured by bundling operation results of 1 to 3 16-bit widths.

The parallel arithmetic part 121 includes, for example, parallel arithmetic units MAC256_0 to MAC256_3. Each of the parallel arithmetic units MAC256_0 to MAC256_3 includes 256 arithmetic units that perform arithmetic processing in parallel. The data DPin_0 to DPin_3 are input to the parallel arithmetic units MAC256_0 to MAC256_3, respectively.

The parallel arithmetic unit MAC256_0 outputs a maximum of 256 arithmetic processing results by executing arithmetic processing in parallel using a maximum of 256 arithmetic units (four sets of 64 units) with respect to the 64-bit width (16-bit width×4 sets) data DPin_0.

Similarly, the parallel arithmetic unit MAC256_1 outputs a maximum of 256 arithmetic processing results by executing arithmetic processing in parallel using a maximum of 256 arithmetic units (four sets of 64 units) with respect to the 64-bit width (16-bit width×4 sets) data DPin_1. The parallel arithmetic unit MAC256_2 outputs a maximum of 256 arithmetic processing results by executing arithmetic processing in parallel using a maximum of 256 arithmetic units (four sets of 64 units) with respect to the 64-bit width (16-bit width×4 sets) data DPin_2. The parallel arithmetic unit MAC256_3 outputs a maximum of 256 arithmetic processing results by executing arithmetic processing in parallel using a maximum of 256 arithmetic units with respect to data DPin_3 having a width of 64 bits (16 bits width×4 sets).

Figure 3:
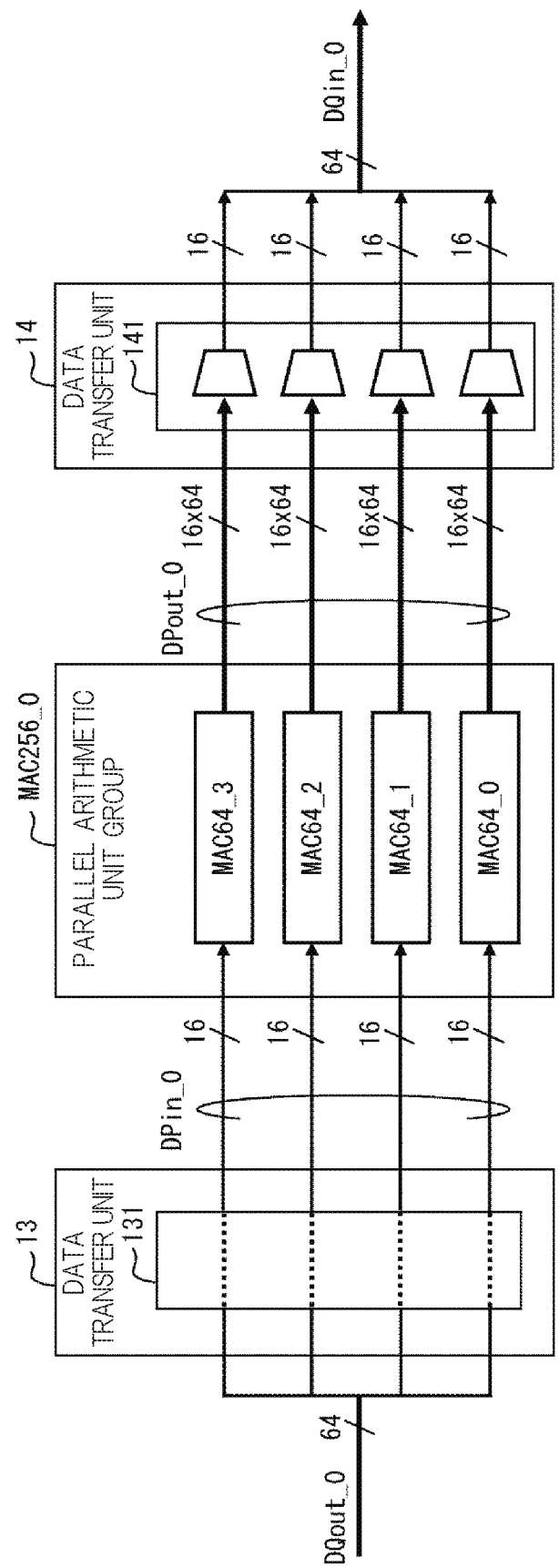
FIG. 3 is a block diagram illustrating a configuration example of a parallel arithmetic unitr of FIG. 2.

FIG. 3 is a block diagram showing a configuration example of the parallel arithmetic unit MAC256_0. FIG. 3 also shows the data transfer units 13 and 14 provided before and after the parallel arithmetic unit MAC256_0.

As shown in FIG. 3, the parallel arithmetic unit MAC256_0 includes parallel arithmetic units MAC64_0 to MAC64_3. Each of the parallel arithmetic units MAC64_0 to MAC64_3 is composed of arithmetic units that perform arithmetic processing in parallel.

The 0th bit to 15th bit (hereinafter referred to as data DPin_00) of the 64-bit width data DPin_0 are input to the parallel arithmetic unit MAC64_0. The 16th bit to 31st bit (hereinafter referred to as data DPin_01) of the 64-bit width data DPin_0 are input to the parallel arithmetic unit MAC64_1. The 32nd bit to 47th bit (hereinafter, referred to as data DPin_02) of the 64-bit width data DPin_0 are input to the parallel arithmetic unit MAC64_2. The 48th bit to 63rd bit of the 64-bit width data DPin_0 (hereinafter referred to as the data DPin_03) are input to the parallel arithmetic unit MAC64_3.

The parallel arithmetic unit MAC64_0 performs arithmetic processing on 16-bit width data DPin_00 in parallel using a maximum of 64 arithmetic units and output an arithmetic processing result of a maximum of 64 of the arithmetic processing results each having 16-bit width. The parallel arithmetic unit MAC64_1 performs arithmetic processing on 16-bit width data DPin_01 in parallel using a maximum of 64 arithmetic units and output a maximum of 64 arithmetic processing results each having 16-bit width. The parallel arithmetic unit MAC 64_2 can perform arithmetic processing on 16-bit width data DPin_02 in parallel using a maximum of 64 arithmetic units and output a maximum of 64 arithmetic processing results each having 16-bit width. The parallel arithmetic unit MAC64_3 can perform arithmetic processing on 16-bit width data DPin_03 in parallel using a maximum of 64 arithmetic units and output a maximum of 64 arithmetic processing results each having 16-bit width.

The parallel arithmetic units MAC256_1 to MAC256_3 have the same configuration as that of the parallel arithmetic unit MAC256_0, and therefore description thereof is omitted.

Returning to FIG. 2, the description will be continued. The parallel arithmetic unit MAC256_0 performs arithmetic processing on data DPin_0 having a 64-bit width (16-bit width×4 sets), and outputs four sets of a maximum of 64 arithmetic processing results each having 16-bit width as data DPout_0.

Similarly, the parallel arithmetic unit MAC256_1 performs arithmetic processing on the data DPin_1, and outputs four sets of a maximum of 64 arithmetic processing results each having 16-bit width as data DPout_1. The parallel arithmetic unit MAC 256_2 performs arithmetic processing on the data DPin_2, and outputs four sets of a maximum of 64 arithmetic processing results each having 16-bit width as data DPout_2. The parallel arithmetic unit MAC 256_3 performs arithmetic processing on the data DPin_3, and outputs four sets of a maximum of 64 arithmetic processing results each having 16-bit width as data DPout_3.

The data transfer unit 14, for example, selects one by one from each of the four sets each having 64 16-bit width data included in the data DPout_0 output in parallel from the parallel processor MAC256_0 and sequentially outputs the data DQin_0 which comprises the four sets each having 16-bit width data (i.e., the data DQin_0 of the 64 bit width).

As described above, the data transfer unit 14 may select and sequentially output 16-bit width data one by one from each set, or may sequentially output all data for each set so as to output 64 16-bit width data in one set and then output 64 16-bit width data in the next set, but the present invention is not limited thereto. The data output method of the data transfer unit 14 may be switched depending on the mode.

Similarly, the data transfer unit 14 sequentially selects, for example, one by one from each of four sets each having 64 16-bit width data included in the data DPout_1 output in parallel from the parallel arithmetic unit MAC 256_1, and sequentially outputs the data DQin_1 which comprises four sets of 16-bit width data (i.e., 64-bit width data DQin_1). In addition, the data transfer unit 14 selects one by one from each of four sets each having 64 16-bit width data included in the data DPout_2 output in parallel from the parallel processor MAC 256_2, and outputs the data DQin_2 which comprises four sets of the 16-bit width data (i.e., the 64-bit width data DQin_2) in sequence. The data transfer unit 14 sequentially selects, for example, one by one from each of four sets each having 64 16-bit width data in DPout_3 output in parallel from the parallel processor MAC 256_3, and outputs the data DQin_3 which comprises four sets of 16-bit width data (i.e., a 64-bit width data DQin_3).

These 64-bit width data DQin_0 to DQin_3 are inputted to the DRP 11. The DRP 11 performs arithmetic processing on the data DQin_0 to DQin_3, and sequentially outputs the arithmetic processing results to the external memory 3. The data DQin_0 to DQin_3 may be used for calculation of the data DQout_0 to DQout_3.

As described above, the semiconductor device 1 according to the present embodiment includes an accelerator having a parallel arithmetic part that performs arithmetic processing in parallel, a data processing unit such as DRP that sequentially transfers data, and a data transfer unit that sequentially selects and outputs a plurality of arithmetic processing results by the accelerator to the data processing unit. As a result, the semiconductor device according to the present embodiment and the semiconductor system including the same can perform a large amount of regular data processing using an accelerator and perform other data processing using a data processing unit, so that efficient arithmetic processing can be realized even in a large-scale arithmetic processing such as, for example, a deep learning processing.

Figure 4:
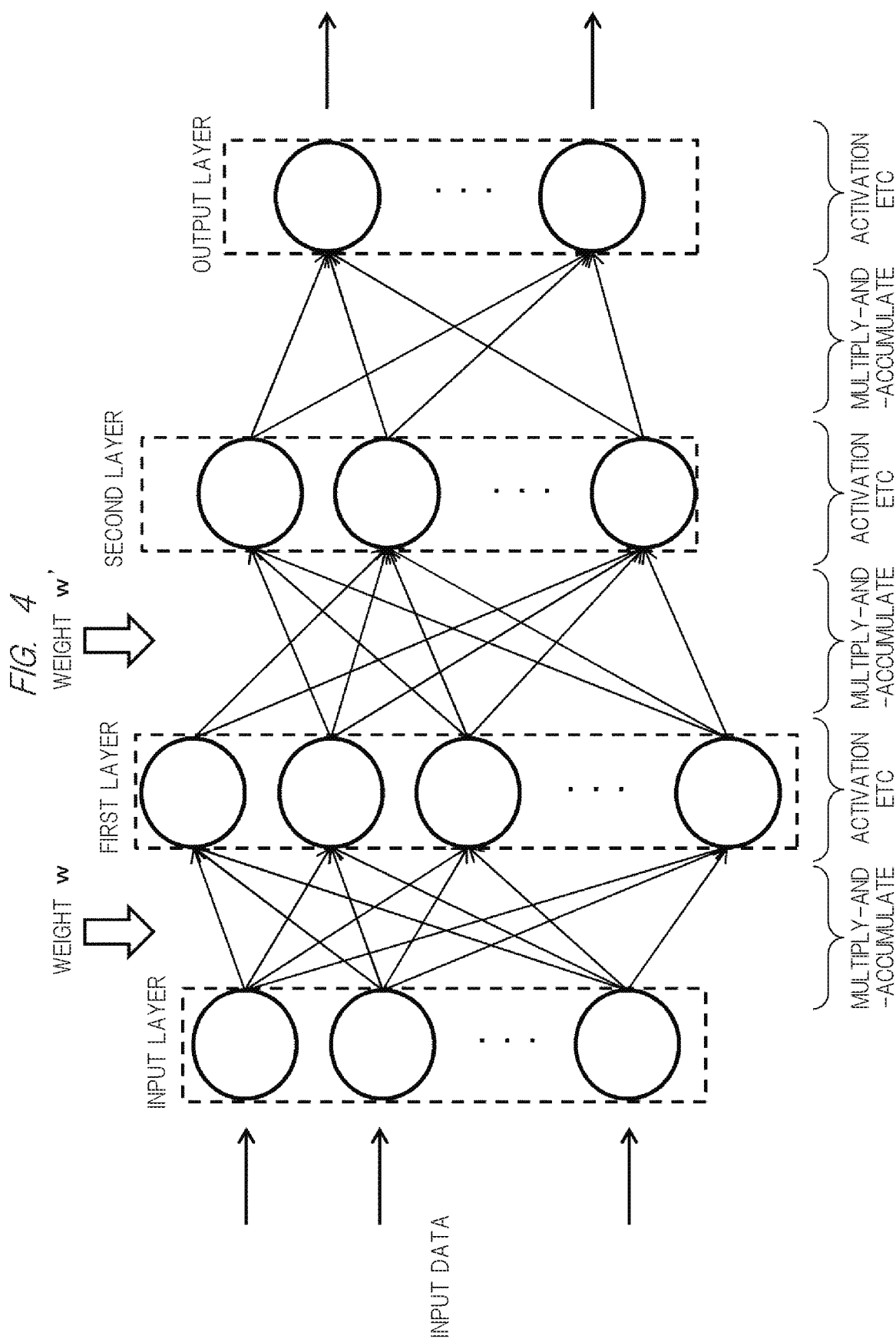
FIG. 4 is a diagram illustrating an example of a neural network structure.
Figure 5:
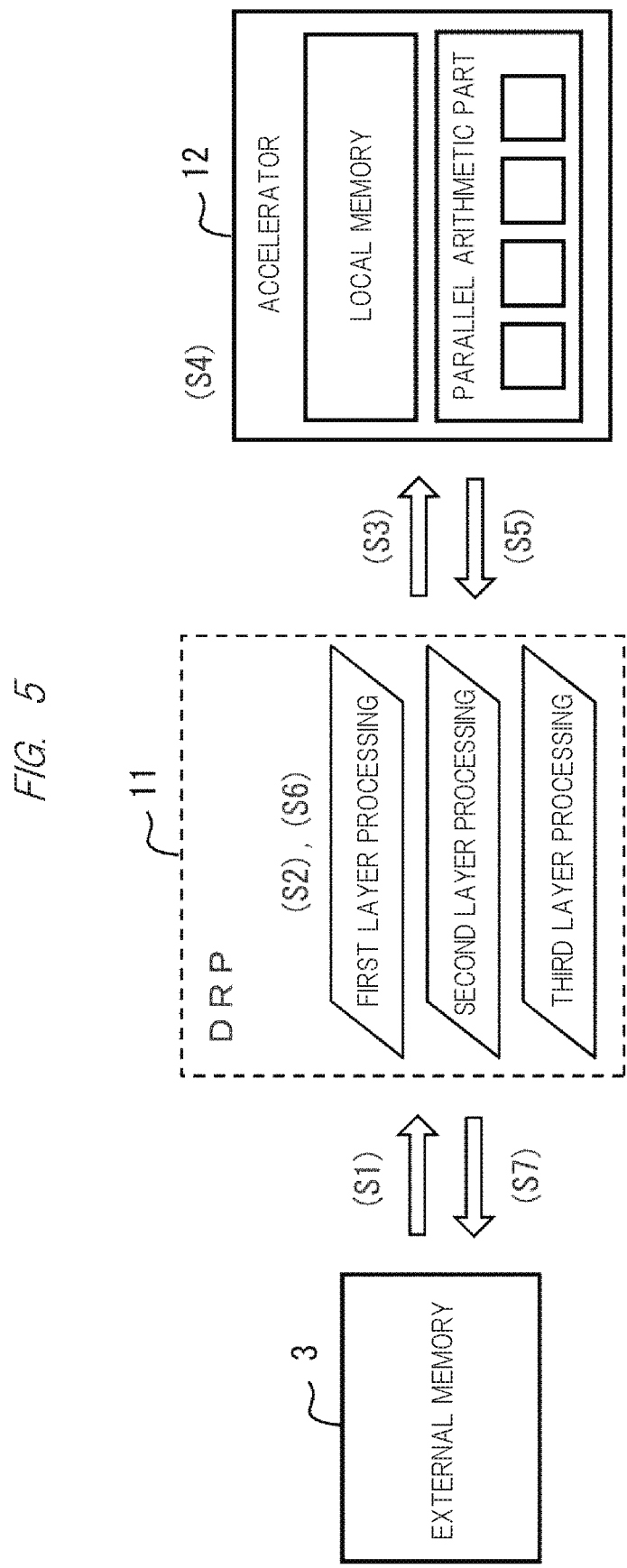
FIG. 5 is a schematic diagram showing a flow of an arithmetic process of a neural network.

Hereinafter, a calculation method of a neural network using the semiconductor device 1 according to the present embodiment will be described with reference to FIGS. 4 and 5. FIG. 4 is a diagram showing an example of a neural network structure. FIG. 5 is a diagram schematically showing the flow of the operation processing of the neural network.

As shown in FIG. 4, the operation of the neural network takes a procedure of performing a multiply-and-accumulate calculation operation of multiplying the input data with the weight w(w'), performing an operation such as activation on the result, and outputting the operation result.

As shown in FIG. 5, the DRP 11 reads out data required for the arithmetic processing of the accelerator 12 from the external memory 3 (step S1), and rearranges the calculator and the data as necessary (step S2). Thereafter, the data read from the external memory 3 is sequentially outputted from the DRP 11 to the accelerator 12 as data inputted to the accelerator 12. The accelerator 12 performs a parallel multiply-and-accumulate calculation operation by multiplying the data sequentially outputted from the DRP 11 with the data (corresponding to the weight) stored in the local memory in order from the received data from the DRP 11 (step S4). Then, the arithmetic results by the accelerator 12 are sequentially outputted to the DRP 11 (step S5). The DRP 11 performs operations such as addition and activation on the data received from the accelerator 12 as required (step S6). The processing results of the DRP 11 are stored in the external memory 3 (step S7). By realizing the processing of the neural network by such processing and repeating this processing, it is possible to execute the arithmetic processing required for the deep learning.

In this manner, in the neural network, it is possible to realize high-speed operation by executing regular parallel multiply-and-accumulate calculation operation using the accelerator 12 among required operations. Further, the DRP 11 which is a data processor capable of dynamically reconfiguring circuits executes the arithmetic processing other than the regular parallel multiply-and-accumulate calculation operation, it becomes possible to flexibly set the processing such as activation in different layers (first layer and second layer in the example of FIG. 5). In addition, the DRP 11 can reconfigure the circuit configuration so that the input data required for the multiply-and-accumulate calculation operation is divided and read out from the external memory 3 to be output to the accelerator 12 in accordance with the parallel operation size which can be simultaneously processed by the accelerator 12. Thereby, the degree of freedom of the operation format of the parallel arithmetic part 121 can be provided.

Figure 6:
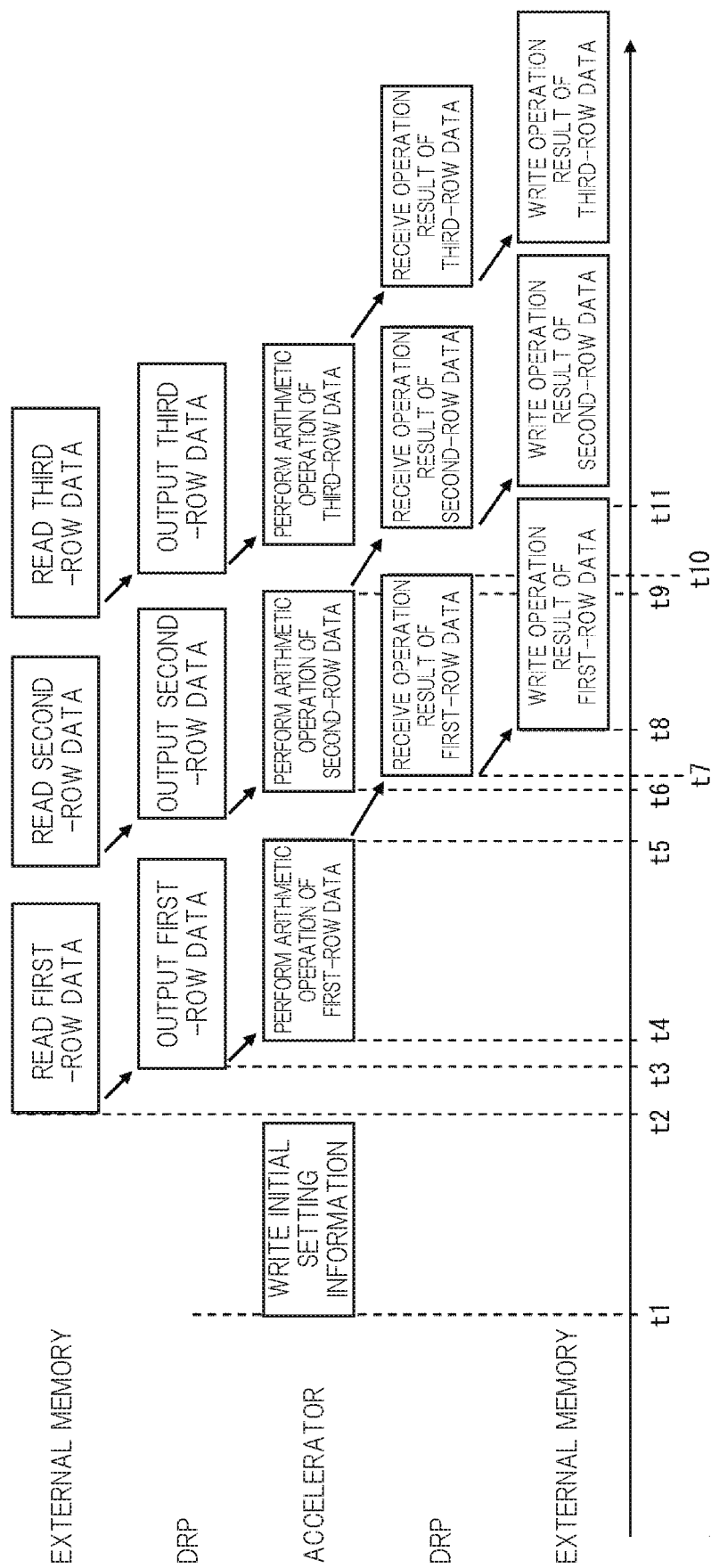
FIG. 6 is a timing chart illustrating a process flow of a semiconductor system according to the first embodiment.

Next, the operation of the semiconductor system SYS1 will be described with reference to FIG. 6. FIG. 6 is a timing chart showing a processing flow of the semiconductor system SYS1.

Figure 7:
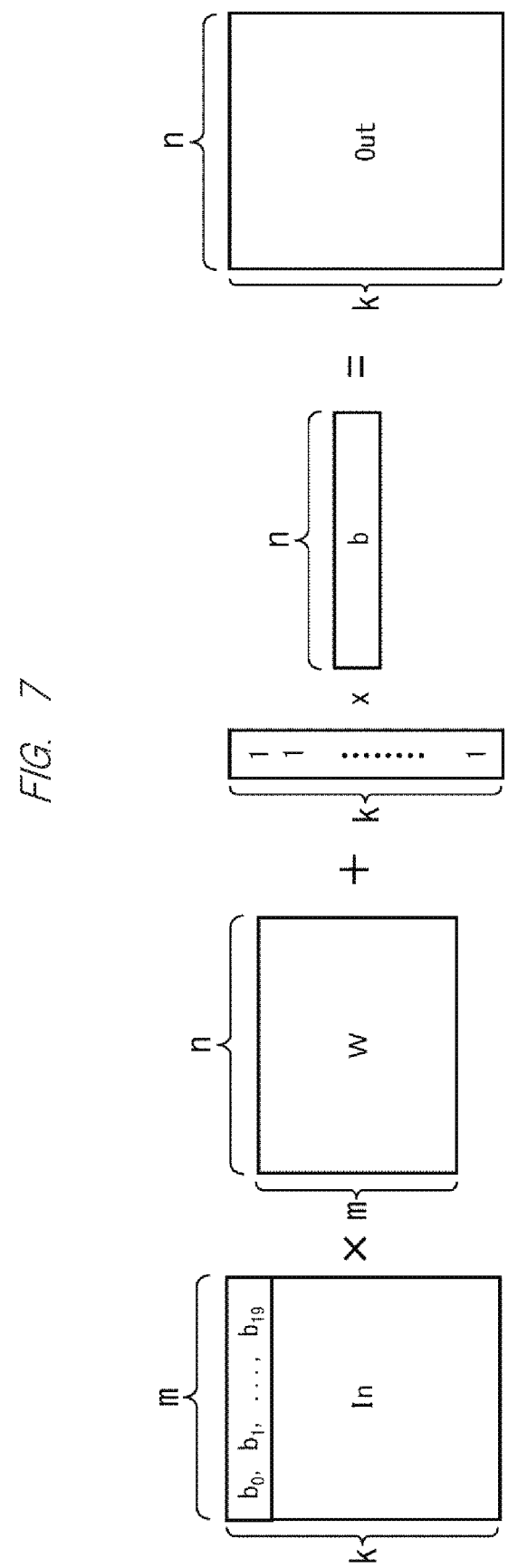
FIG. 7 is a schematic diagram of a matrix arithmetic.

Hereinafter, a case where matrix operation is performed by the accelerator 12 will be described as an example. FIG. 7 is a diagram schematically showing a matrix arithmetic expression. In FIG. 7, multiplication operation of matrix data In composed of elements of k rows×m columns and matrix data W composed of elements of m rows×n columns is performed, and the result of adding the bias value b to each element of the multiplication result is output as matrix data Out composed of elements of k rows×n columns.

Figure 8:
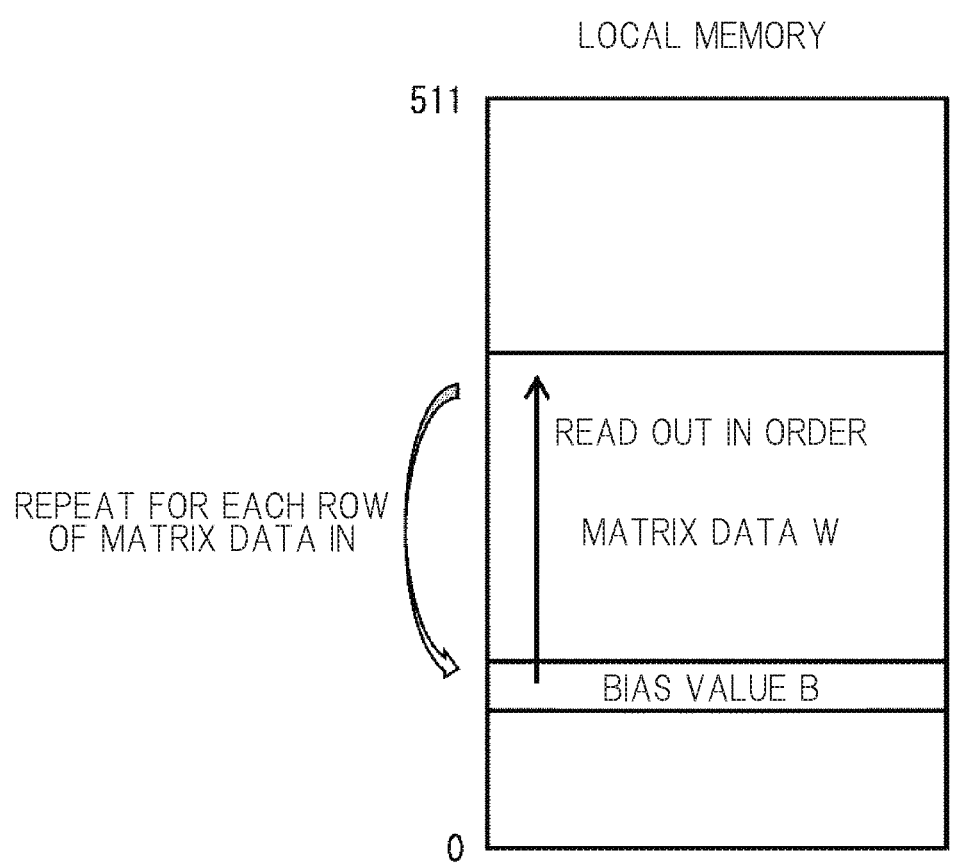
FIG. 8 is a diagram illustrating the default information stored in the local memory.

When the accelerator 12 performs calculation operation on the matrix data In of the first layer, initial setting information including the matrix data W and the bias value b corresponding to the matrix data In of the first layer is stored in the local memory 122 of the accelerator 12 (times t1 to t2 in FIG. 6) (see FIG. 8). More specifically, the DMA 15 transfers the initial setting information read from the external memory 3 to the local memory 122 in accordance with the instruction of the descriptor generated by the CPU 2. Note that a DMA (not shown) dedicated to the accelerator 12 may be provided separately from the DMA 15, and initial setting information read from the external memory 3 may be transferred to the local memory 122 using the DMA dedicated to the accelerator 12.

Thereafter, the first row data of the matrix data In (hereinafter, also referred to as row data In 1) is read from the external memory 3 (time t2 in FIG. 6). The DRP 11 outputs the row data In1 read from the external memory 3 to the accelerator 12 after performing a predetermined process as needed (time t3 of FIG. 6).

The accelerator 12 sets the bias value b read from the local memory 122 as an initial value in the respective arithmetic units of the parallel arithmetic part 121, and then performs an arithmetic process of the row data In1 (corresponding to the data DPin) and the matrix data W (corresponding to the predetermined data D) read from the local memory 122 (time t4 in FIG. 6).

FIG. 9 is a diagram showing a specific example of a multiplication expression of row data In1 (the first row data of matrix data In) and matrix data W. In FIG. 9, it is assumed that the row data In1 is composed of 20 columns of elements b0 to b19. In the matrix data W, it is assumed that the first row data is composed of elements a0,0 a0,1 . . . a0,19 of 20 columns, the second row data is composed of elements a1,0 a1,1 . . . a1,19 of 20 columns, and the 20th row data, which is the last row, is composed of elements a19,0 a19,1 . . . a19,19 of 20 columns.

Here, the accelerator 12 performs multiplication operation in parallel on the elements (e.g., b0) of each column of the row data In1 and the elements (e.g., a0,0 a0,1 . . . a0,19) of the 20 columns of each row of the matrix data W, and then adds the multiplication operation results of 20 pieces in each column to calculate the elements of each column of the matrix data Out.

Figure 10:
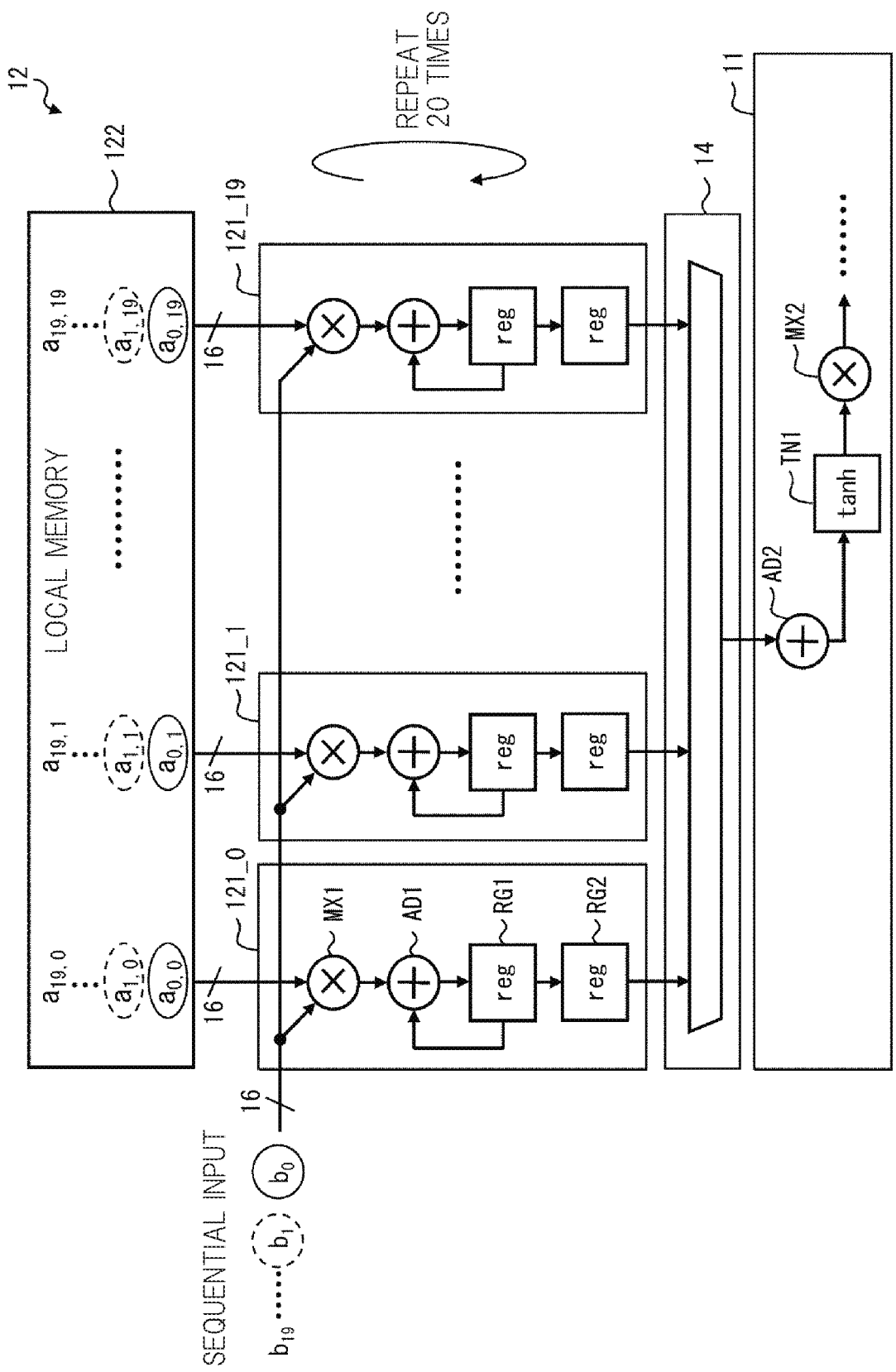
FIG. 10 is a diagram showing a configuration example of an accelerator according to the first embodiment.

FIG. 10 is a diagram showing a specific configuration example of the accelerator 12. In the example of FIG. 10, 20 arithmetic units 121_0 to 121_19 among a plurality of arithmetic units provided in the parallel arithmetic part 121 are used. Each of the arithmetic units 121_0 to 121_19 includes a multiplier MX1, an adder AD1, a register RG1 and a register RG2.

In the arithmetic unit 121-$j$ (j is any one of 0 to 19), the bias value b read from the local memory 122 is set as an initial value in the register RG1 (the bias value b is not shown in FIG. 10).

Thereafter, the multiplier MX1 multiplies the element b0 of the first column data in the row data In1 (corresponding to the 16-bit width data DPin) by the elements a0,$j$ of first row in the matrix data W read from the local memories 122 (corresponding to the predetermined data D_j of 16-bit width). The adder AD1 adds the multiplication result (a0,$j$×b0) by the multiplier MX1 and the value (bias value b) stored in the register RG1 and transfers the addition result to the register RG1.

After that, the multiplier MX1 multiplies the element b1 of the second column in the row data In1 input subsequently by the element a1,$j$ of the second row in the matrix data W read from the local memory 122. The adder AD1 adds the multiplication result (a1,$j$×b1) by the multiplier MX1 and the value (a0,$j$×b0) stored in the register RG1 and transfers the addition result to the register RG 1.

Since the operations of multiplying, adding, and storing as described above are repeated for 20 cycles, the register RG1 stores the element of the first row in the matrix data Out ((a0,$j$×b0)+(a1,$j$×b1)+·+(a19,$j$×b19)). Thereafter, the value stored in the register RG1 is transferred to the register RG2, and the value stored in the register RG2 is output as an element of the first row of the matrix data Out after time t5 in FIG. 6.

When the data transfer from the register RG1 to the register RG2 is completed (time t5 of FIG. 6), it is possible to start the arithmetic operation by the arithmetic unit 121_$j$ for the data of the second row (also called row data In2), which is the next row in the matrix data In (time t6 of FIG. 6). Thereby, the accelerator 12 can execute the parallel arithmetic operation on the row data In2 (times t6 to t9 in FIG. 6) while transferring the arithmetic operation result stored in the register RG2 to the data transfer unit 14 (corresponding to times t7 to t10 in FIG. 6). As a result, the efficiency of the parallel arithmetic operation can be increased.

Figure 11:
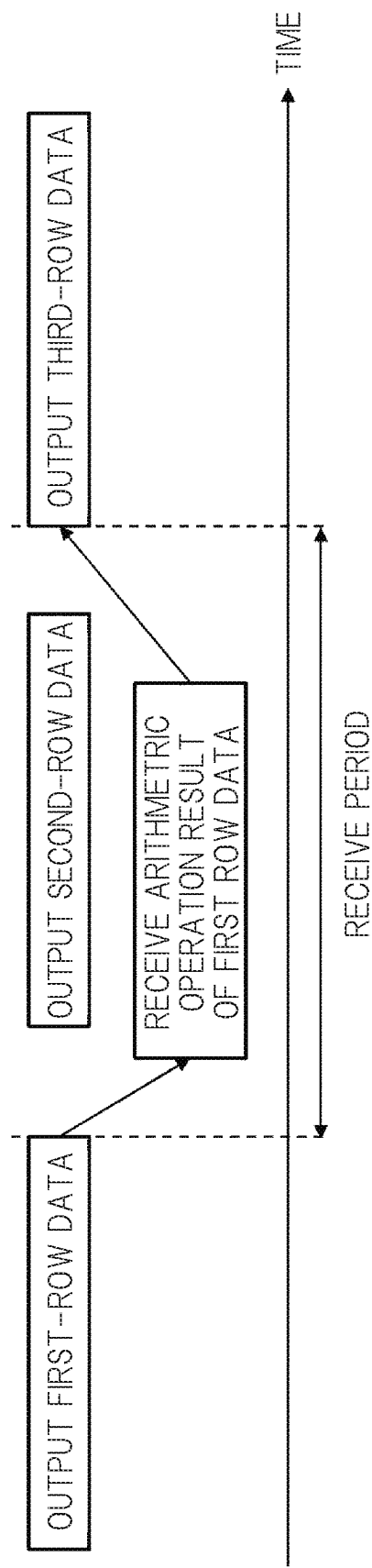
FIG. 11 is a timing chart for explaining the relationship between the data output and the data input of a dynamic reconfiguration processor.

Therefore, it is preferable for the DRP 11 to receive the arithmetic operation result of row data Int by the accelerator 12 during an output period of the second row data In2, which is a period from the completion of the output of the first row data In1 in the matrix data In to the start of the output of the third row data In3 (see FIG. 11).

The data transfer unit 14 sequentially selects the 20 arithmetic operation results each having 16-bit width (corresponding to the data DPout) outputted from the arithmetic units 121_0 to 121_19, and sequentially outputs them as a 16-bit width data DQin. In other words, the data transfer unit 14 sequentially outputs the elements of the twenty columns of the first row of the matrix data Out as the data DQin. The sequentially outputted data DQin is received by the DRP 11 at times t7 to t10 in FIG. 6.

In the DRP 11, for example, the adder AD2 performs addition processing on the data DQin sequentially outputted from the data transfer unit 14, the arithmetic unit TN1 performs predetermined arithmetic operation based on the hyperbolic tangent functions, and the multiplier MX2 performs multiplication operation. The operation result is written to the external memory 3, for example, at times t8 to t11 in FIG. 6.

When the accelerator 12 completes the arithmetic operation for all the row data from the first row to the k-th row of the matrix data In of the first layer, the same arithmetic operation is subsequently performed for the matrix data In of the second layer. Before the arithmetic operation is performed on the matrix data In of the second layer, initial setting information (matrix data W and bias value b) corresponding to the matrix data In of the second layer is stored in the local memory 122. The accelerator 12 repeats such parallel arithmetic operation.

Figure 12:
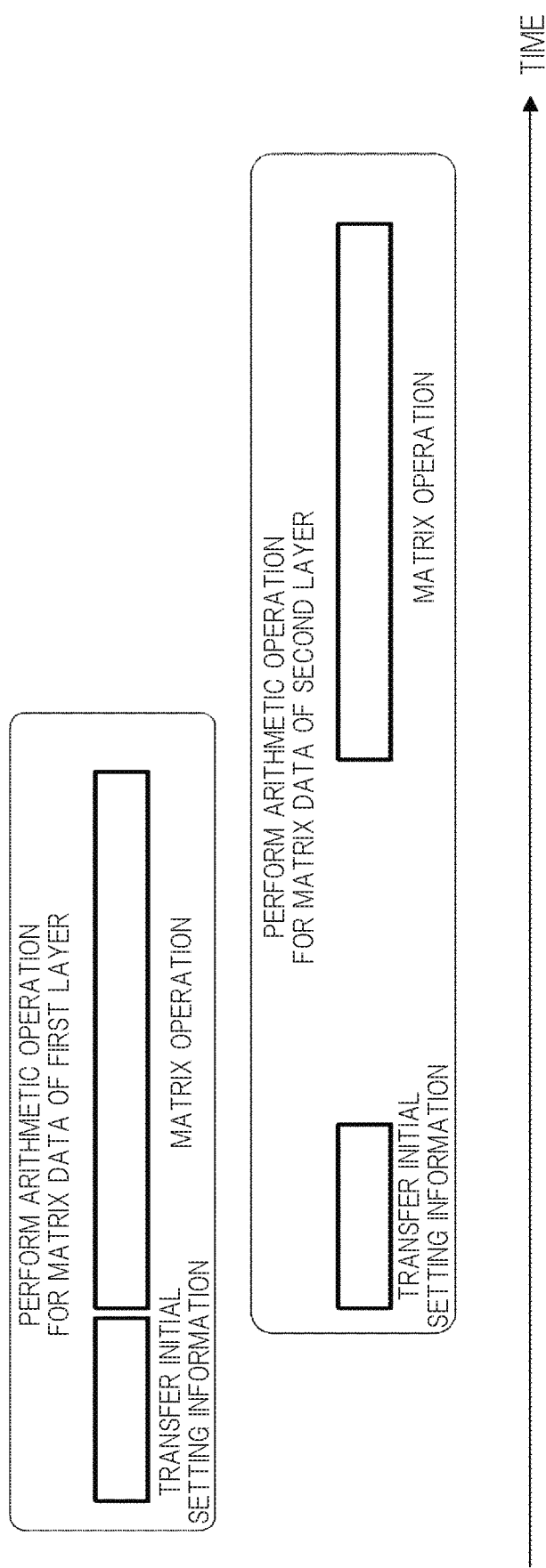
FIG. 12 is a timing chart for explaining the relationship between the arithmetic processing for matrix data of each layer by the accelerator.

It is preferable that the local memory 122 has a storage area to store initial setting information corresponding to the matrix data In of at least two layers, i.e., the matrix data W and the bias value b. Thereby, during execution of the matrix operation on the matrix data In of the first layer, the initial setting information used for the operation on the matrix data In of the second layer can be transferred to the free area of the local memory 122. Thereby, after completion of the arithmetic operation for the matrix data of the first layer, the matrix calculation for the matrix data of the second layer can be quickly executed without waiting for the transfer of the initial setting information, as shown in FIG. 12. In this case, it is preferable that the local memory 122 is configured to be capable of reading and writing data at the same time.

On the other hand, even if the local memory 122 does not have enough storage space to store the initial setting information corresponding to one layer of matrix data In, or has storage space to store the initial setting information corresponding to one layer of matrix data In, the initial setting information may be divided and stored. Hereinafter, a brief description will be given with reference to FIG. 13.

Figure 13:
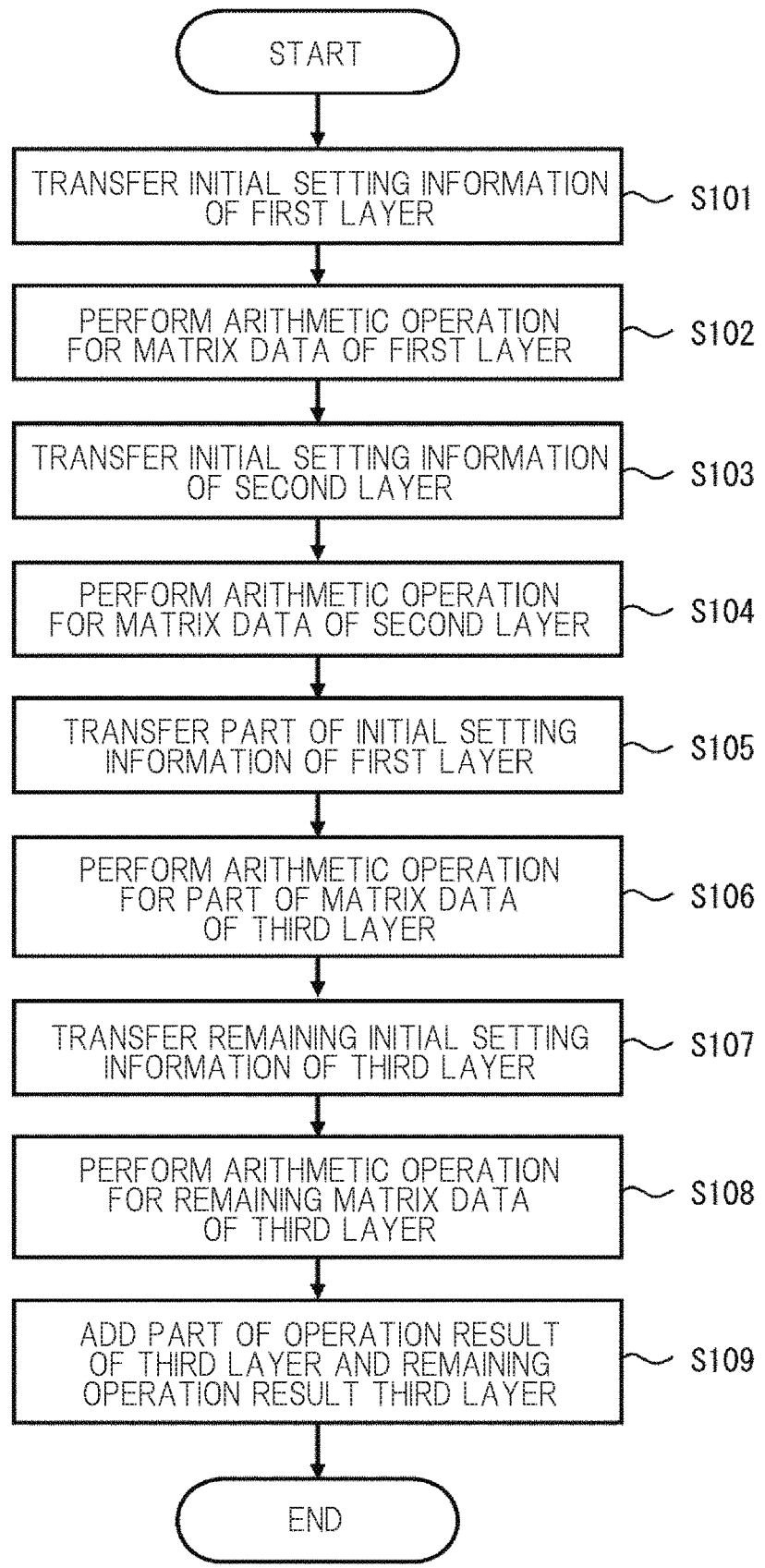
FIG. 13 is a flow chart illustrating operation of a semiconductor system according to the first embodiment.

FIG. 13 is a flow chart showing the operation of the semiconductor system SYS1. In the example of FIG. 13, it is assumed that the local memory 122 does not have a storage area sufficient to store the initial setting information corresponding to the matrix data In of the third layer.

As shown in FIG. 13, in step S101, initial setting information corresponding to the matrix data In of the first layer is stored in the local memory 122. Thereafter, in step S102, the parallel arithmetic part 121 performs an arithmetic operation on the matrix data In of the first layer. Thereafter, the initial setting information corresponding to the matrix data In of the second layer is stored in the local memory 122 in step S103. Thereafter, in step S104, the parallel arithmetic part 121 performs an arithmetic operation on the matrix data In of the second layer. Thereafter, in step S105, initial setting information corresponding to a part of the matrix data In of the third layer is stored in the local memory 122. In step S106, the parallel arithmetic part 121 performs an arithmetic operation on a part of the matrix data In of the third layer. In step S107, the initial setting information corresponding to the remaining matrix data In of the third layer is stored in the local memory 122. In step S108, the parallel arithmetic part 121 performs an arithmetic operation on the remaining matrix data In of the third layer. Thereafter, the result of the arithmetic operation executed in step S106 and the result of the arithmetic processing executed in step S108 are added in the DRP 11 in step S109. Thereby, it is possible to realize the arithmetic operation on the matrix data In of the third layer.

As described above, the semiconductor device 1 according to the present embodiment includes an accelerator having a parallel arithmetic part that performs arithmetic operation in parallel, a data processing unit such as DRP that sequentially transfers data, and a data transfer unit that sequentially selects and outputs a plurality of arithmetic operation results by the accelerator to the data processing unit. As a result, the semiconductor device according to the present embodiment and the semiconductor system including the semiconductor device perform a large amount of regular data processing using an accelerator and perform other data processing using a data processing unit, so that efficient arithmetic processing can be realized even in a large-scale arithmetic processing such as, for example, a deep learning processing.

In the present embodiment, the case where each of the arithmetic units 121_0 to 121_19 includes the register RG2 in addition to the multiplier MX1, the adder AD1, and the register RG1 has been described as an example, but the present invention is not limited thereto. Each of the arithmetic units 121_0 to 121_19 may include the multiplier MX1, the adder AD1, and the register RG1, and may not include the register RG2. This further suppresses the circuit scale.

In the present embodiment, the case where the bias value b is stored in the local memory 122 has been described as an example, but the present invention is not limited to this. For example, the bias value b may be stored in a register or the like provided separately from the local memory 122, or the bias value b may be a fixed value such as 0 and may not be stored in the local memory 122.

Figure 14:
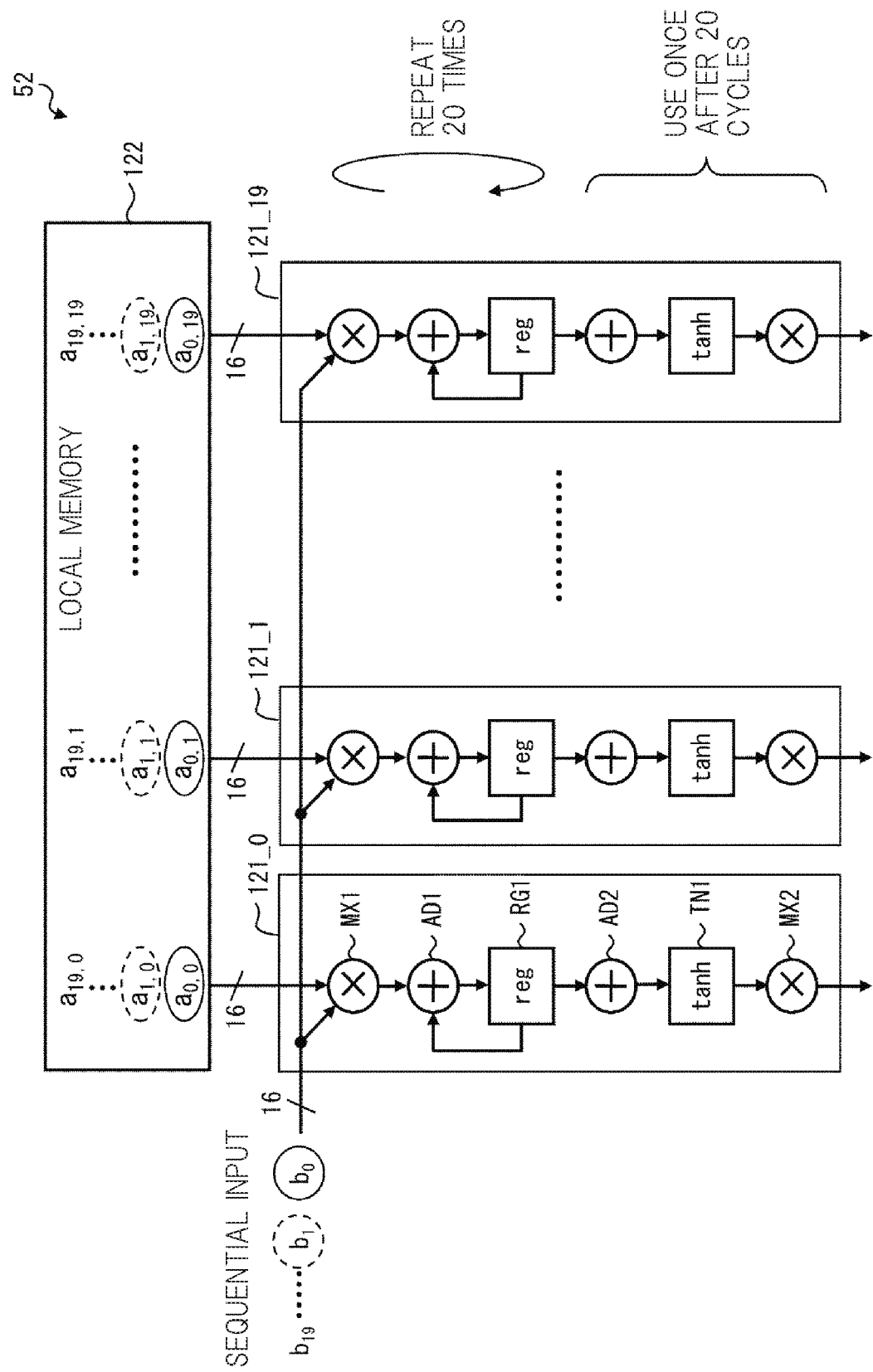
FIG. 14 is a comparative example of a configuration of an accelerator.

FIG. 14 is a diagram showing a configuration example of the accelerator 52 according to the comparative example. As shown in FIG. 14, in the accelerator 52, each of the arithmetic units 121_0 to 121_19 includes a multiplier MX1, an adder AD1, a register RG1, an adder AD2, an arithmetic unit TN1, and a multiplier MX2. That is, in the accelerator 52, the adder AD2, the arithmetic unit TN1 and the multiplier MX2 which are provided in the DRP 11 in the accelerator 12, are provided in the arithmetic units 121_0 to 121_19. However, in the accelerator 52, after the arithmetic operation processing by the multiplier MX1, the adder AD1 and the register RG1 is repeated for 20 cycles in each arithmetic unit, the arithmetic operation processing by the adder AD2, the arithmetic unit TN1 and the multiplier MX2 is executed for only one cycle. That is, in the accelerator 52, since the adder AD2, the arithmetic unit TN1 and the multiplier MX 2 which are used less frequently are provided in all of the plurality of arithmetic units, there is a problem that the circuit scale increases.

Figure 15:
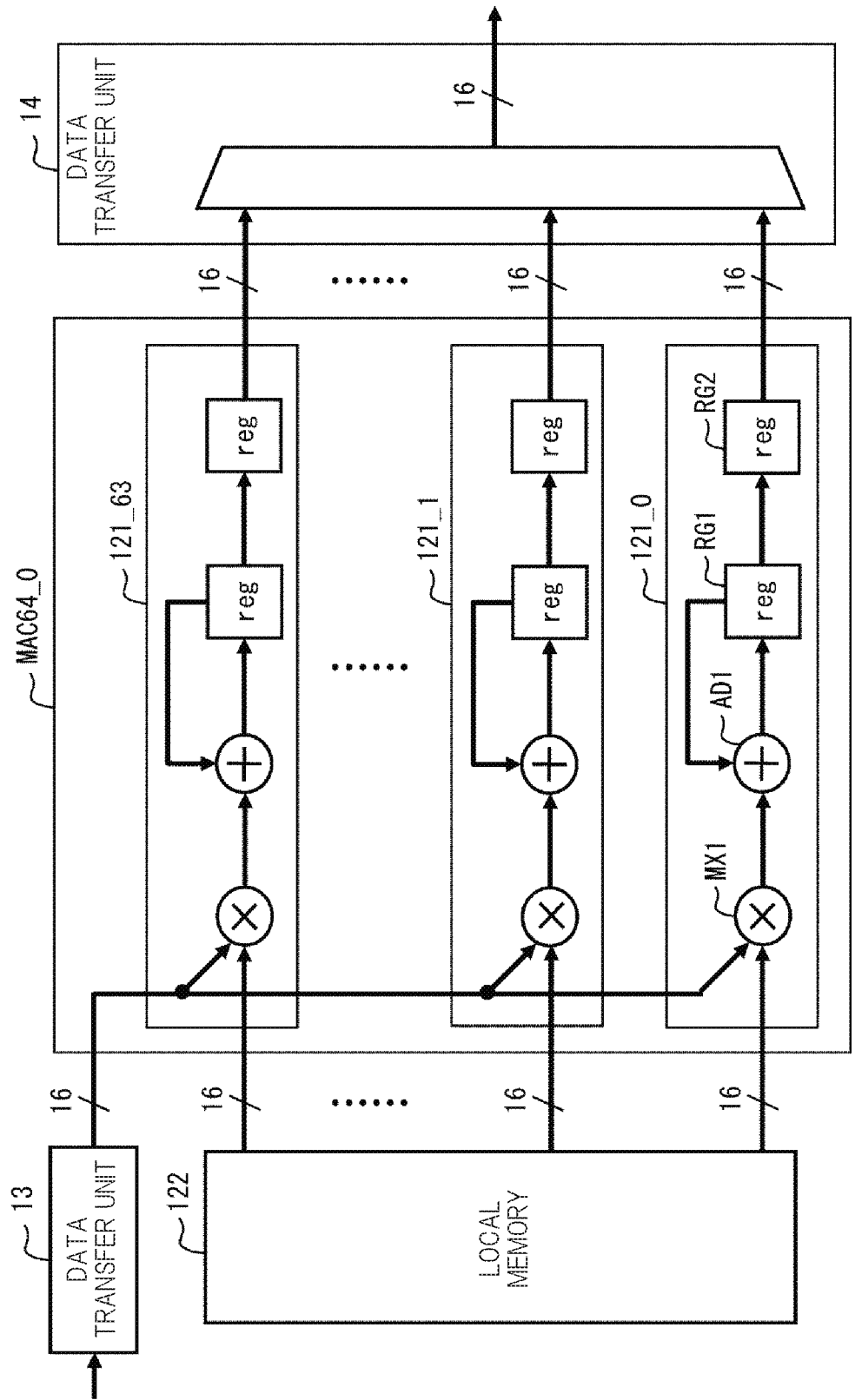
FIG. 15 is a diagram illustrating a configuration example of the parallel arithmetic unit.

On the other hand, in the accelerator 12, the arithmetic units 121_0 to 121_19 do not include the adder AD2, the arithmetic unit TN1 and the multiplier MX2, which are used infrequently, and these arithmetic units are configured and commonly used in the preceding stage of the DRP 11. Thereby, an increase in the circuit scale can be suppressed.
Configuration Example of the Parallel Arithmetic Units Next, a specific configuration example of a plurality of arithmetic units provided in the parallel arithmetic part 121 will be described. FIG. 15 is a diagram showing a specific configuration example of the parallel arithmetic unit MAC64_0. As shown in FIG. 15, the parallel arithmetic unit MAC64_0 includes 64 arithmetic units 121_0 to 121_63 that perform arithmetic operation processing in parallel. Each of the arithmetic units 121_0 to 121_63 includes a multiplier MX1, an adder AD1, a register RG1, and a register RG2. Here, the paths of the multiplier MX1, the adder AD1, the register RG1 and the register RG2 in the arithmetic units 121_0 to 121_63 perform predetermined arithmetic operation processing on the 16-bit width data, and output 16-bit width data.

Figure 16:
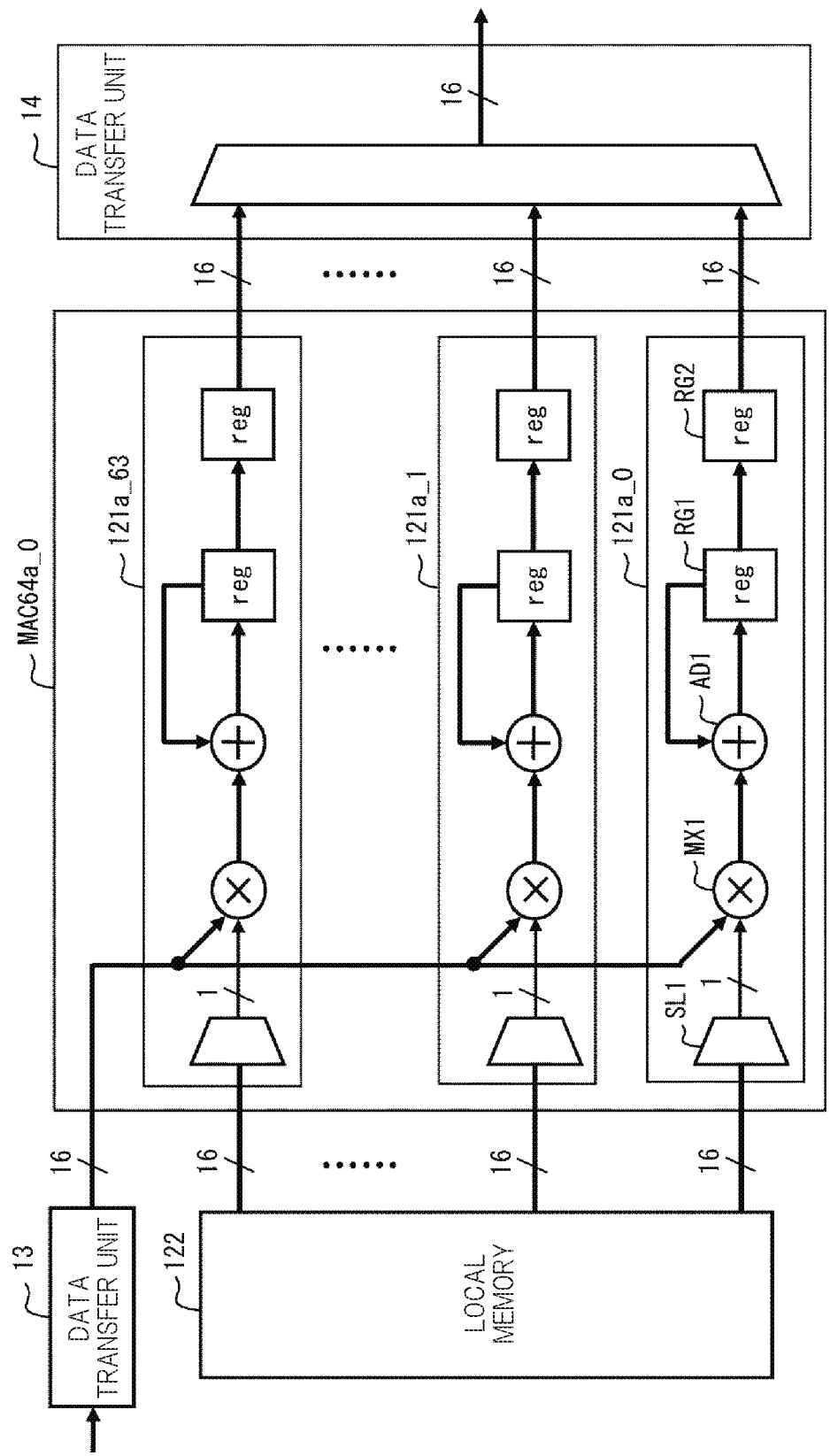
FIG. 16 is a diagram illustrating a first modification of the parallel arithmetic unit.

Since the parallel arithmetic units MAC64_1 to MAC64_3 have the same configuration as that of the parallel arithmetic unit MAC64_0, their descriptions are omitted.
First Modification of the Parallel Arithmetic Units FIG. 16 is a diagram showing a first modification of the parallel arithmetic unit MAC64_0 as the parallel operator MAC 64a_0. As shown in FIG. 16, the parallel arithmetic unit MAC64a_0 includes 64 arithmetic units 121a_0 to 121a_63. Each of the arithmetic units 121a_0 to 121a_63 includes a selector SL1, a multiplier MX1, an adder AD1, a register RG1, and a register RG2.

The selector SL1 sequentially selects and outputs 16-bit data read from the local memory 122 bit by bit. The paths of the multiplier MX1, the adder AD1, the register RG1, and the register RG2 perform arithmetic operation processing using the 1-bit width data output from the selector SL1 and the 16-bit width data from the data transfer unit 13, and output 16-bit width data.

In this way, even when the parallel arithmetic unit MAC64a_0 carries out the arithmetic operation process for the data having 1-bit width read out from the local memory 122, it is possible to suppress the increase in the number of readings from the local memory 122 by reading the data having a 16-bit width from the local memory 122 and then sequentially selecting one bit from the data having a 16-bit width and performing the arithmetic operation processing. As a result, power consumption can be reduced.

The parallel arithmetic units MAC64a_1 to MAC64a_3 have the same configuration as that of the parallel arithmetic unit MAC64a_0, and therefore description thereof is omitted.

Figure 17:
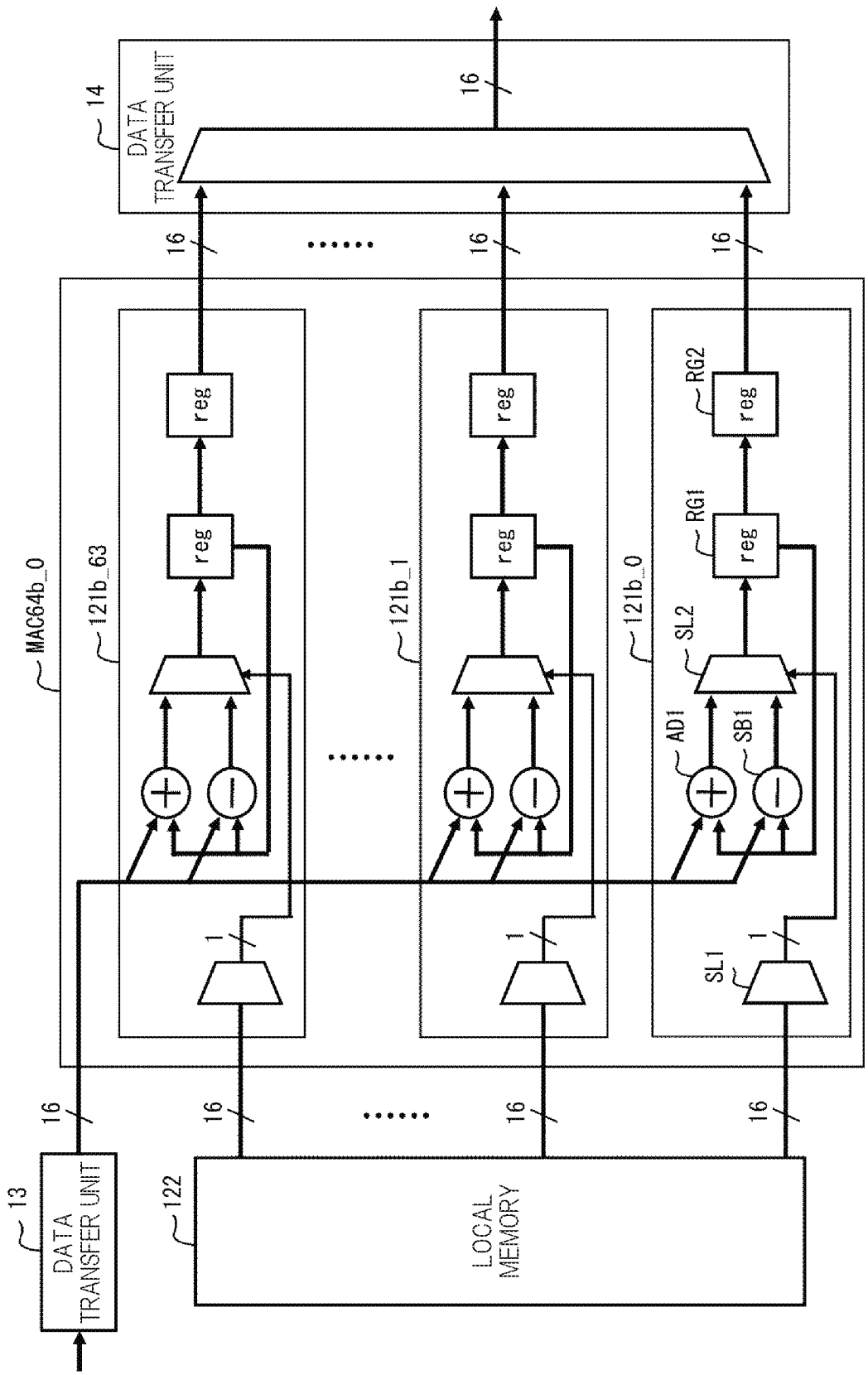
FIG. 17 is a diagram showing a second modification of the parallel arithmetic unit.

It should be noted that when the arithmetic operation processing is performed on the 1-bit width data read out from the local memory 122, the multiplication processing means multiplying the data from the data transfer unit 13 by either +1 or −1. Therefore, the multiply and accumulate calculation operation adds or subtracts the data from the data transfer unit 13 to or from the data stored in the register RG1. This can also be realized by the configuration of the parallel arithmetic unit as shown in FIG. 17.
Second Modification of the Parallel Arithmetic Units FIG. 17 is a diagram showing a second modification of the parallel operator MAC64__0 as the parallel operator MAC64b_0. As shown in FIG. 17, the parallel arithmetic unit MAC64b_0 includes 64 arithmetic units 121b_0 to 121b_63. Each of the arithmetic units 121b_0 to 121b_63 includes a selector SL1, an adder AD1, a subtractor SB1, a selector SL2, a register RG1, and a register RG2.

Here, the selector SL1 sequentially selects and outputs 16-bit data read from the local memory 122 bit by bit. The adder AD1 adds the 16-bit width data from the data transfer unit 13 and the data stored in the register RG1. The subtractor SB1 subtracts the data stored in the register RG1 from the 16-bit width data from the data transfer unit 13. The selector SL2 selects and outputs either the addition result by the adder AD1 or the subtraction result by the subtractor SB1 based on the value of the 1-bit width data output from the selector SL1. The data output from the selector SL2 is stored in the register RG1. Thereafter, the data stored in the register RG1 is stored in the register RG2 and then output to the data transfer unit 14.

The parallel arithmetic unit MAC64b_0 can realize the same operation as the parallel arithmetic unit MAC64a_0.

Figure 18:
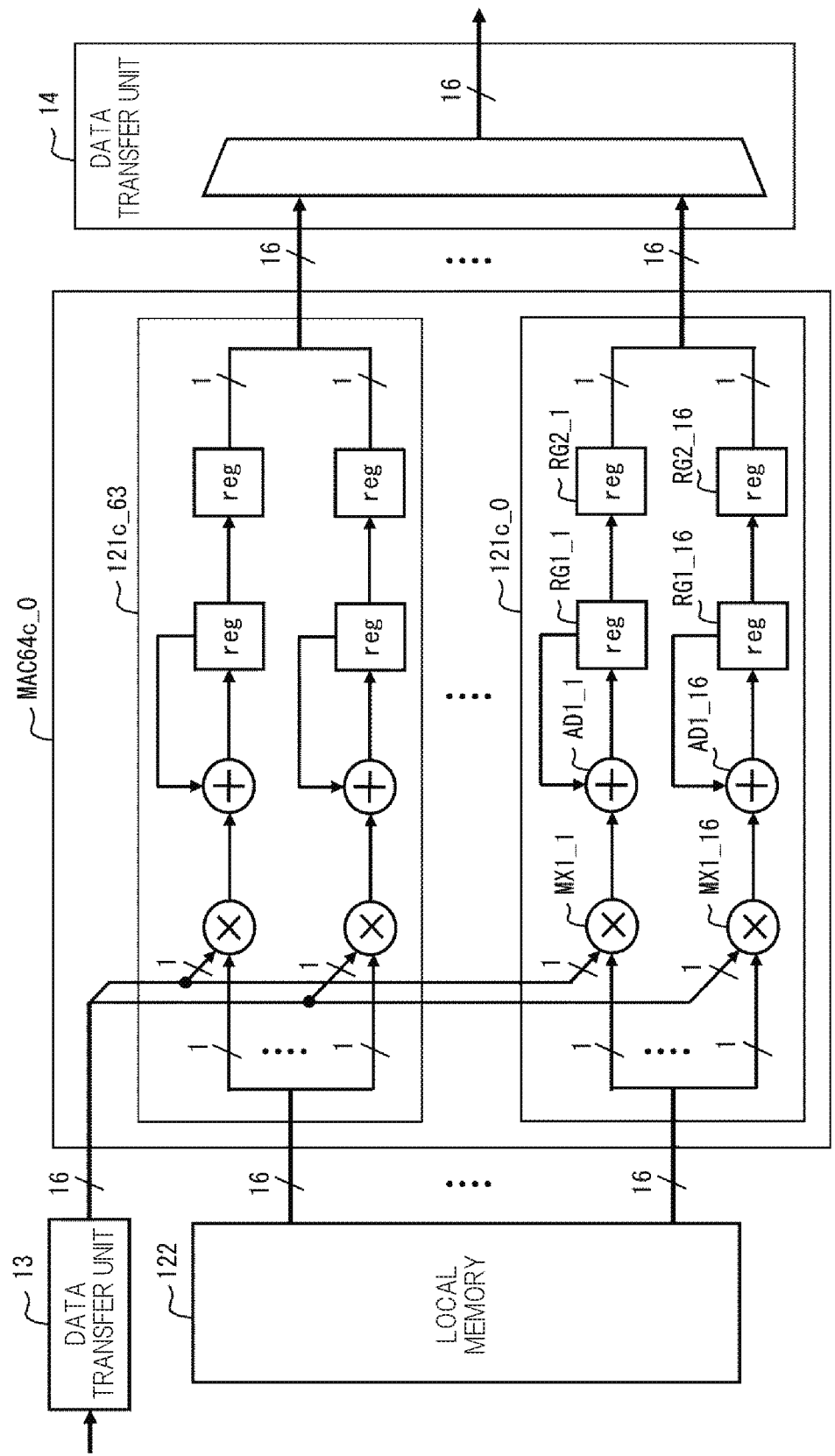
FIG. 18 is a diagram illustrating a third modification of the parallel arithmetic unit.

The parallel arithmetic units MAC64b_1 to MAC64b_3 have the same configuration as that of the parallel arithmetic unit MAC64b_0, and therefore description thereof is omitted.
Third Modification of the Parallel Arithmetic Units FIG. 18 (a third modification of a plurality of arithmetic units comprising a parallel arithmetic unit) shows a third modification of the parallel arithmetic unit MAC64_0 as the parallel operator MAC64c_0. As shown in FIG. 18, the parallel arithmetic unit MAC64c_0 includes 64 arithmetic units 121c_0 to 121c_63. Each of the arithmetic units 121c_0 to 121c_63 performs arithmetic operation processing between 16 pieces of 1-bit data from the data transfer unit 13 and 16 pieces of 1-bit data read from the local memory 122 in units of 1 bit.

Each of the arithmetic units 121c_0 to 121c_63 includes 16 paths including a multiplier MX1, an adder AD1, a register RG1, and a register RG2. Here, each path performs arithmetic operation processing by using one of 16 pieces of 1-bit data from the data transfer unit 13 and one of 16 pieces of 1-bit data read from the local memory 122, and outputs 1-bit data. The 1-bit data is represented by binary values of 1 and 0 in hardware, and these values of 1 and 0 are used for calculation as +1 and −1, respectively, in meaning.

As described above, the parallel calculator MAC64c_0 can perform 16 arithmetic operation processes for 1-bit data by transferring and reading data using a 16-bit data path, even when the calculation process is performed using 1-bit data from the data transfer unit 131 and 1-bit data read from the local memory 122.

Figure 19:
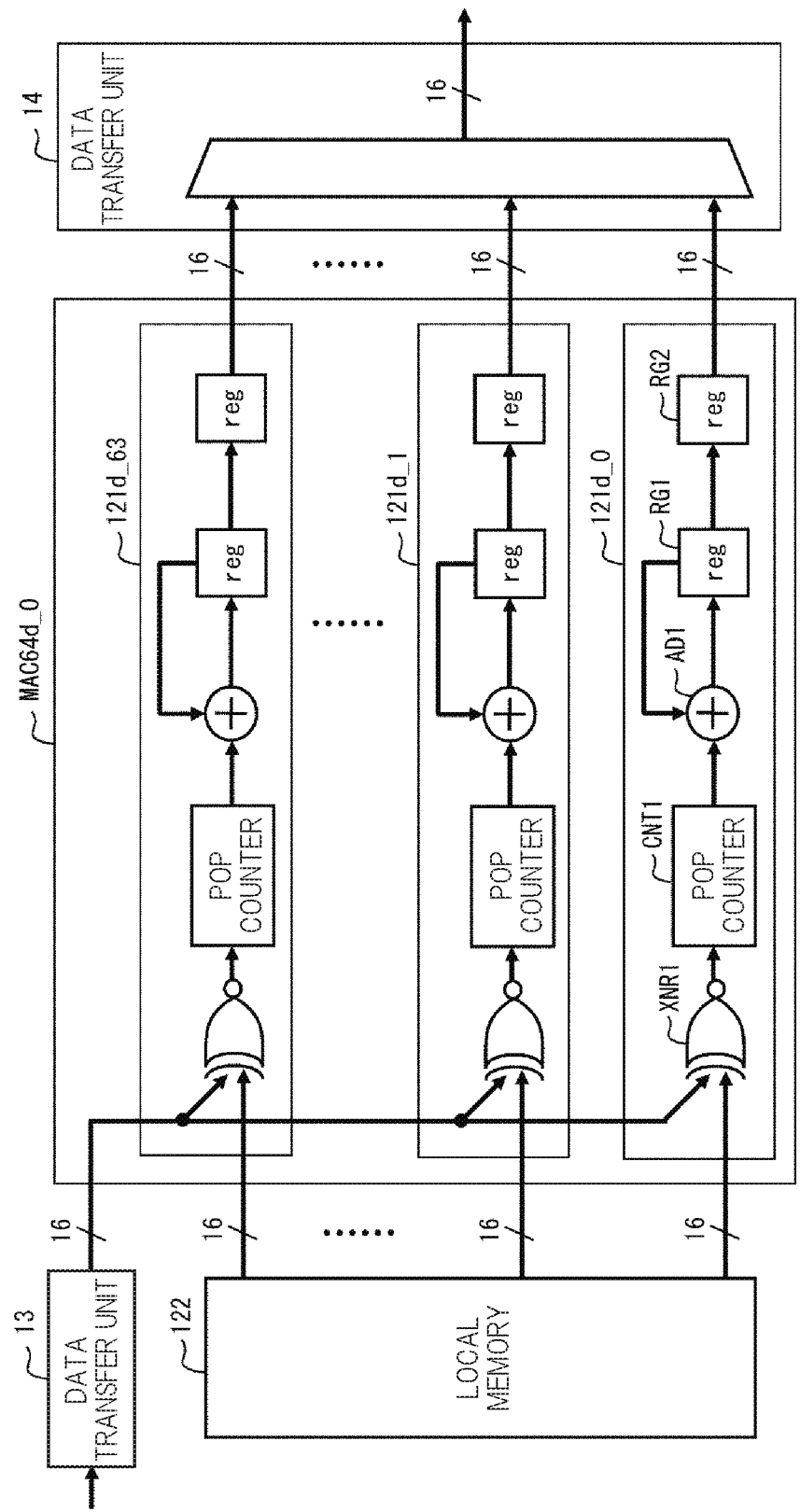
FIG. 19 is a diagram illustrating a fourth modification of the parallel arithmetic unit.

The operation of the configuration shown in FIG. 18 can also be realized by the configuration of the parallel arithmetic unit as shown in FIG. 19.
Fourth Modification of the Parallel Arithmetic Units FIG. 19 is a diagram showing a fourth modification of the parallel operator MAC64_0 as the parallel operator MAC64d_0. As shown in FIG. 19, the parallel arithmetic unit MAC64d_0 includes 64 arithmetic units 121d_0 to 121d_63. The arithmetic units 121d_0 to 121d_63 include XNOR circuits XNR1, pop counters CNT1, an adder AD1, a register RG1, and a register RG2.

The XNOR circuit XNR1 performs a negative exclusive OR operation on 16 pieces of 1-bit data from the data transfer unit 13 and 16 pieces of 1-bit data read from the local memory 122 in units of 1 bit. The pop counter CNT1 counts the number of "1" output values when the output values of the XNOR circuits XNR1 are viewed in binary units. Here, the output value of the pop counter CNT1 represents the number of bits having the same output value when the output value of the pop counter CNT1 represents the number of bits having the same value when the 16-bit data from the data transfer unit 13 and the 16-bit data read from the local memory 122 are viewed as binary numbers. The output data of the pop counter CNT1 is added to the data stored in the register RG1 by the adder AD1. However, since the values to be +1 and −1 are originally calculated as 1 and 0, it is necessary to correct the output value. It is also possible to cope with this problem by processing the bias value necessary for correction in advance.

As described above, the parallel arithmetic unit MAC64$d$_0 performs arithmetic operation processing in units of 1-bit between 16 pieces of 1-bit data from the data transfer unit 13 and 16 pieces of 1-bit data read from the local memory 122 in parallel by 16 pieces, adds these pieces of arithmetic operation processing, and outputs the result as 16-bit data. Thereby, the parallel arithmetic unit MAC 64$d$_0 can realize the same operation as that of the parallel arithmetic unit MAC64$d$_0.

Figure 20:
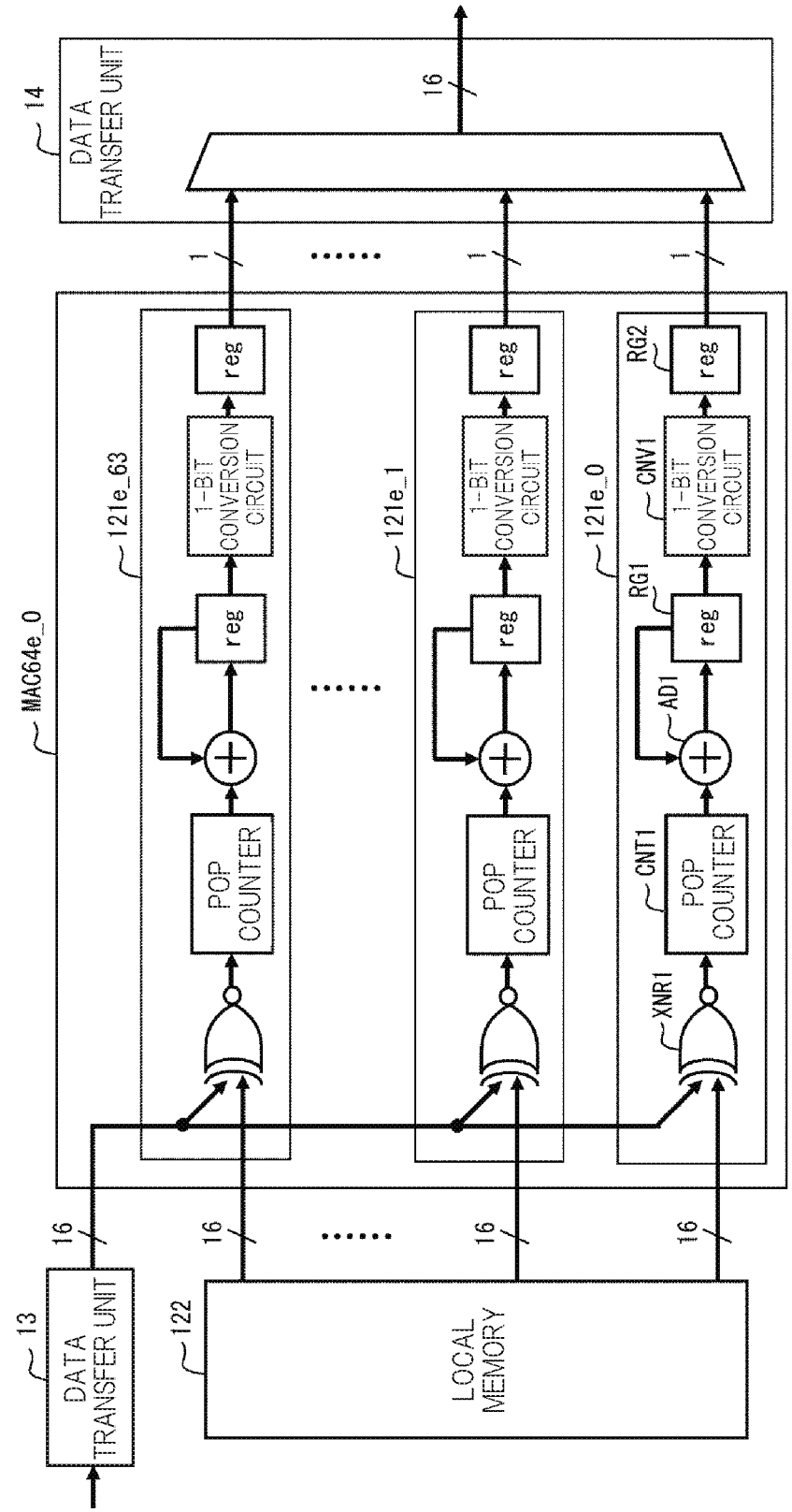
FIG. 20 is a diagram showing a fifth modification of the parallel arithmetic unit.

The parallel arithmetic units MAC64$d$_1 to MAC64$d$_3 have the same configuration as that of the parallel arithmetic unit MAC64$d$_0, and therefore description thereof is omitted. Fifth modification of the parallel arithmetic units FIG. 20 (a fifth modification of a plurality of operators comprising a parallel calculator) shows a fifth modification of the parallel calculator MAC64_0 as the parallel calculator MAC64$e$_0. The parallel operator MAC64$e$_0 includes 64 operators 121$e$_0 to 121$e$_63.

The arithmetic units 121$e$_0 to 121$e$_63 further include 1-bit conversion circuits CNV1 for converting 16-bit width data stored in the register RG1 into 1-bit width data, as compared with the arithmetic units 121$d$_0 to 121$d$_63. The 1-bit conversion circuit CNV1 can output the activated value as a 1-bit value by outputting 0 when the operation result is negative and 1 otherwise, for example, by using the bias value. In this case, 64 pieces of 1-bit data from the arithmetic units 121$e$_0 to 121$e$_63 are input to the data transfer unit 14. It should be noted that the data transfer unit 14 can also output 64 pieces of 1-bit data as 16-bit width data by bundling them. Thus, the data transfer unit 14 can output 64 pieces of 1-bit data in four cycles.

Sixth Modification of the Parallel Arithmetic Units

Figure 21:
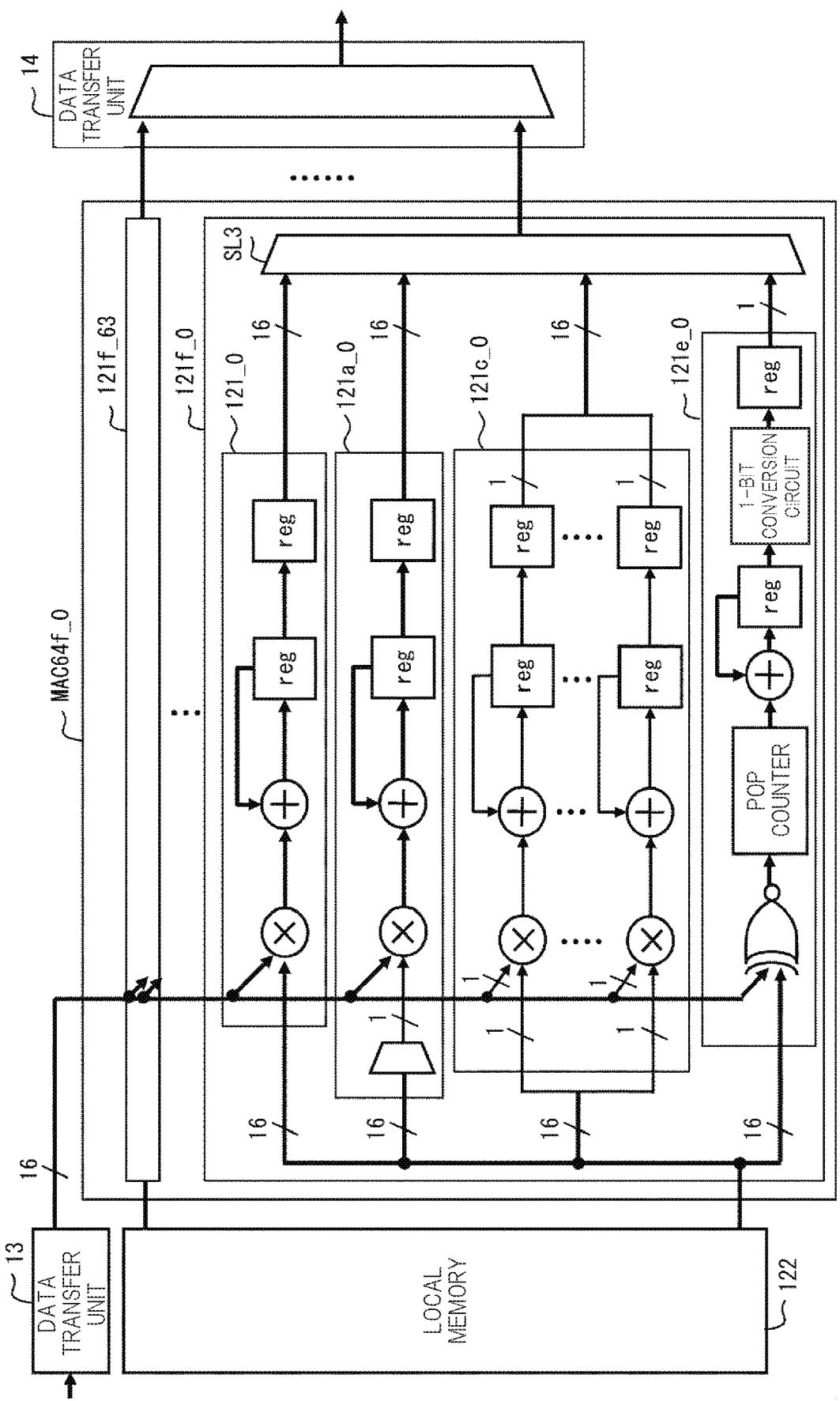
FIG. 21 a diagram illustrating a sixth modification of the parallel arithmetic unit.

FIG. 21 is a diagram showing a sixth modification of the parallel operator MAC64_0 as the parallel arithmetic unit MAC64$f$_0. The parallel arithmetic unit MAC64$f$_0 includes 64 arithmetic units 121$e$_0 to 121$e$_63.

The arithmetic unit 121$e$_0 includes arithmetic units 121_0, 121$a$_0, 121$c$_0, and 121$e$_0 and a selector SL3. The selector SL3 selects one of the arithmetic units 121_0, 121$a$_0, 121$c$_0, and 121$e$_0 according to the mode and outputs the selected one. The arithmetic units 121$e$_1 to 121$e$_63 have the same configuration as that of the arithmetic unit 121$e$_0, and therefore description thereof is omitted. Note that a part of the arithmetic unit 121$e$_0 and a part of the arithmetic unit 121$c$_0 can have a common circuit, and whether to output 16 bits as it is or via a 1-bit conversion circuit may be selected. The mode may be fixedly specified, for example, by setting a register by the CPU, or may be specified for each descriptor by describing information of the mode to be specified in the descriptor.

In this manner, the parallel arithmetic unit MAC64$f$_0 can switch the content of the arithmetic operation processing according to the required arithmetic accuracy, memory usage, and throughput. The parallel arithmetic units MAC64$e$_1 to MAC64$e$_3 have the same configuration as that of the parallel arithmetic unit MAC64$e$_0, and therefore description thereof is omitted.

Example of Data Transfer by the Data Transfer Unit 13

Next, an example of data transfer from the DRP 11 to the accelerator 12 by the data transfer unit 13 will be described. Hereinafter, examples of data transfer by the data transfer unit 13 in accordance with a mode of an operation in which data is input from the DRP 11 to the accelerator 12 via the data transfer unit 13, hereinafter referred to as an input mode, will be described.

Figure 22:
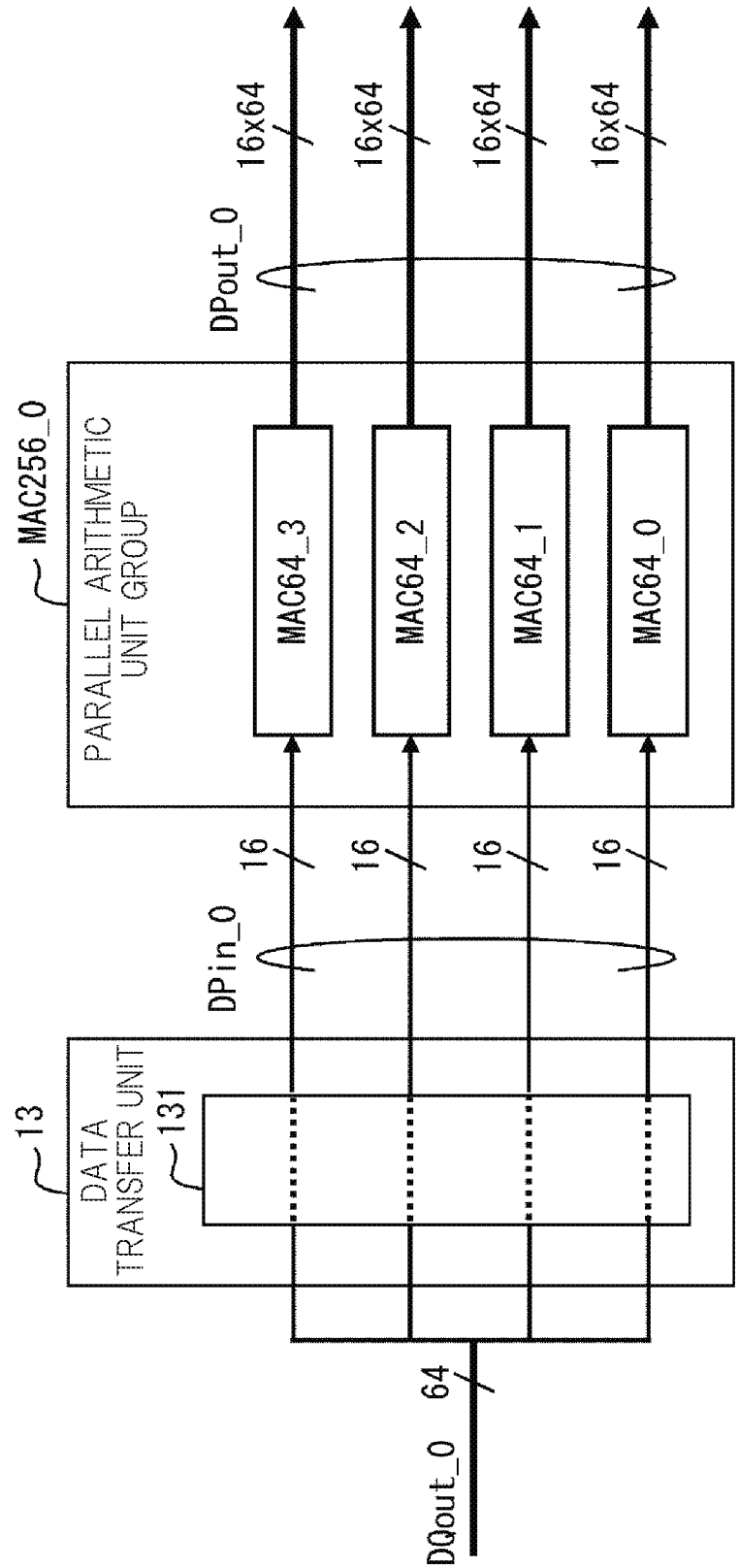
FIG. 22 is a diagram illustrating a data transfer unit and a parallel arithmetic unit in the accelerator when the input mode is the first input mode.

FIG. 22 is a diagram showing the parallel arithmetic unit MAC256_0, the data transfer unit 13 and the accelerator 12 when the input mode is the first input mode. In this case, the data transfer unit 13 outputs 64-bit (16-bit×4) data DQout_0 as it is as data DPin_0 using the selection circuit 131. The 16-bit data DPin_00 to DPin_03 constituting the 64-bit data DPin_0 are input to the parallel arithmetic units MAC64_0 to MAC64_3, respectively.

The relationship between the data transfer unit 13 and the parallel arithmetic units MAC256_1 to MAC256_3 is the same as the relationship between the data transfer unit 13 and the parallel arithmetic unit MAC256_0, the description thereof is omitted.

Figure 23:
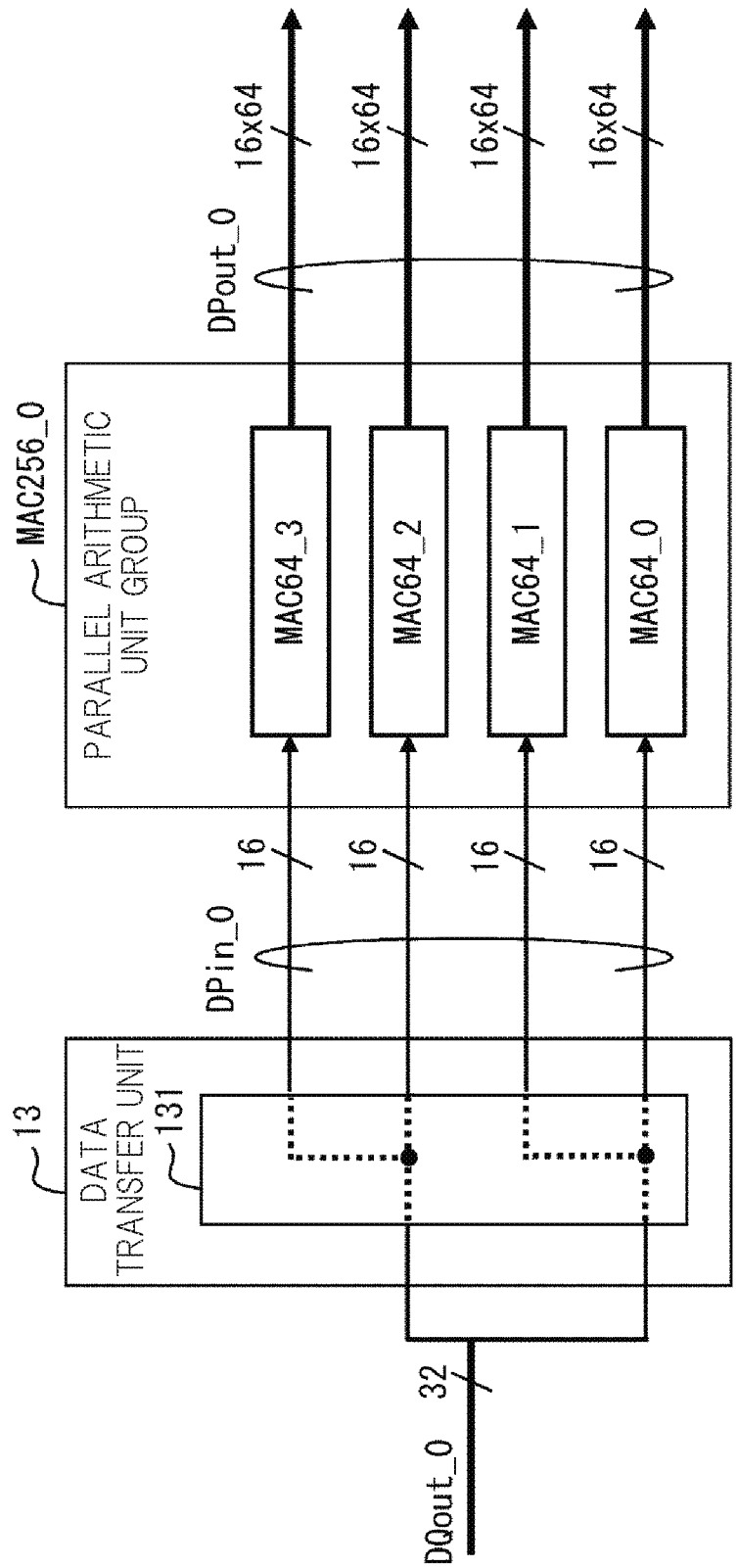
FIG. 23 is a diagram illustrating a data transfer unit and a parallel arithmetic unit in the accelerator when the input mode is the second input mode.

FIG. 23 is a diagram showing the parallel arithmetic unit MAC256_0, the data transfer unit 13 and the accelerator 12 when the input mode is the second input mode. In this case, the data transfer unit 13 uses the selection circuit 131 to divide the data DQout_00 into two pieces of 16-bit data DQout_00 and DQout_02 constituting the data DQout_0 of 32 bits (16 bits×2) and output the divided pieces of 16-bit data DPin_00 and DPin_01, and also divides the data DQout_02 into two pieces and outputs the divided pieces of 16-bit data DPin_02 and DPin_03. These 16-bit data DPin_00 to DPin_03 are input to the parallel arithmetic units MAC64_0 to MAC64_3, respectively.

The relationship between the data transfer unit 13 and the parallel arithmetic units MAC256_1 to MAC256_3 is the same as the relationship between the data transfer unit 13 and the parallel arithmetic unit MAC256_0, the description thereof is omitted.

Figure 24:
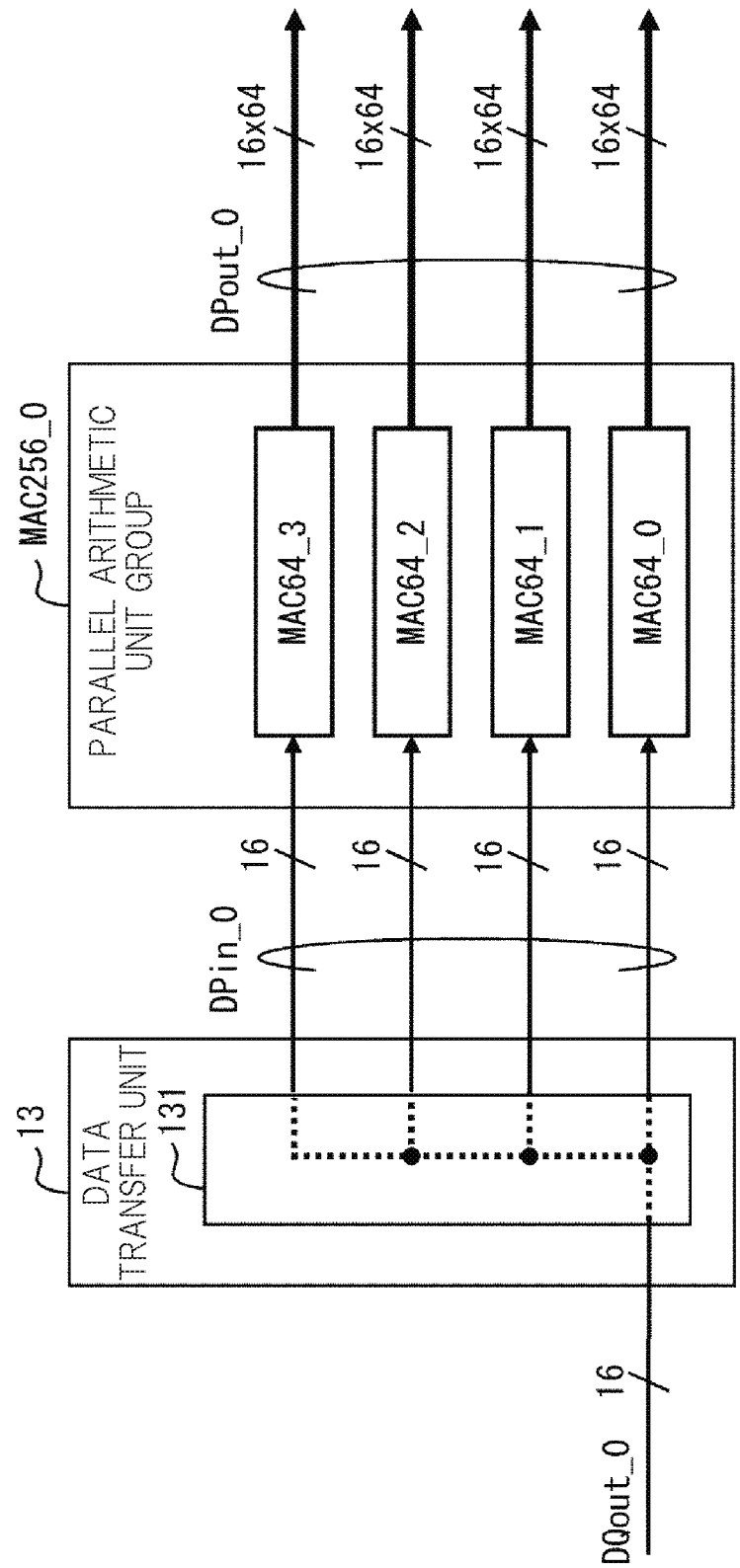
FIG. 24 is a diagram illustrating a data transfer unit and a parallel arithmetic unit in the accelerator when the input mode is the third input mode.

FIG. 24 is a diagram showing the parallel arithmetic unit MAC256_0, the data transfer unit 13 and the accelerator 12 when the input mode is the third input mode. In this case, the data transfer unit 13 uses the selection circuit 131 to distribute the 16-bit data DQout_0 to four pieces of data, and outputs the divided pieces of data as 16-bit data DPin_00 to DPin_03. These 16-bit data DPin_00 to DPin_03 are input to the parallel arithmetic units MAC64_0 to MAC64_3, respectively.

The relationship between the data transfer unit 13 and the parallel arithmetic units MAC256_1 to MAC256_3 is the same as the relationship between the data transfer unit 13 and the parallel arithmetic unit MAC256_0, the description thereof is omitted.

Figure 25:
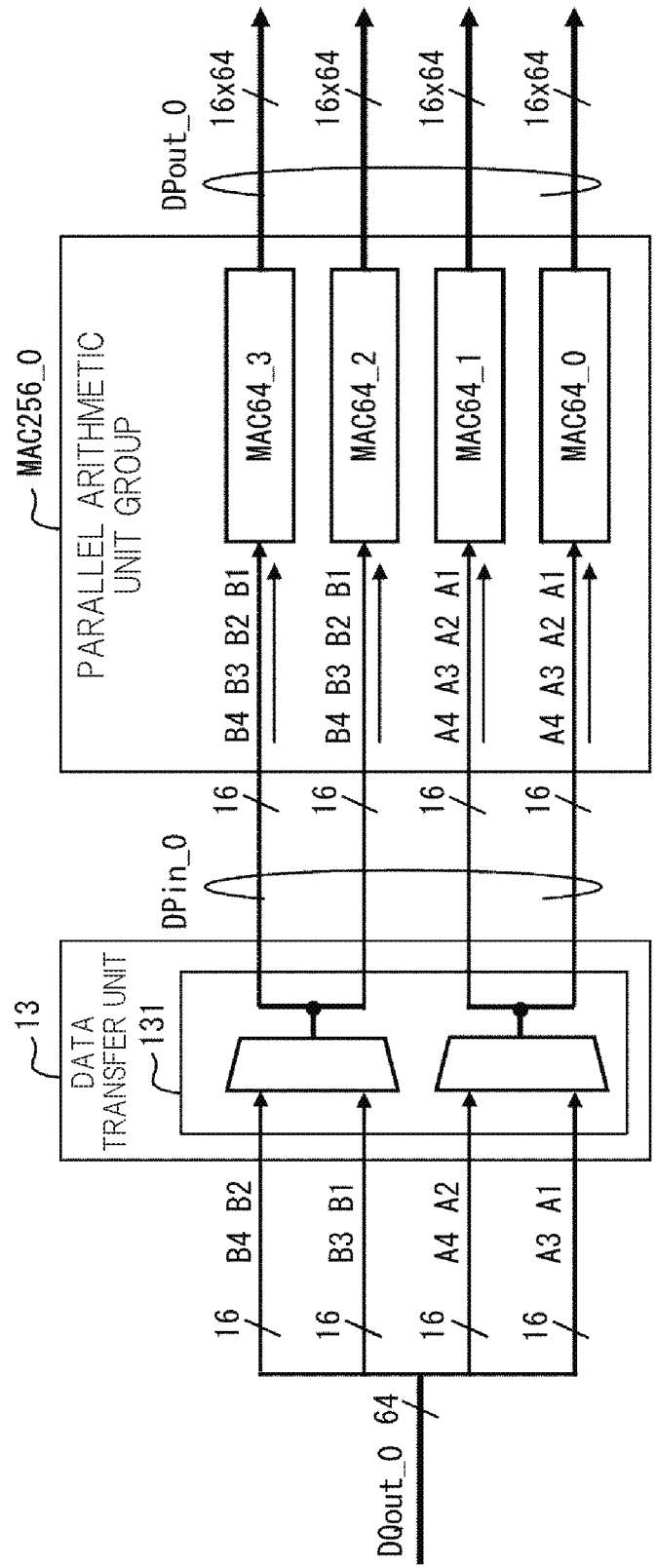
FIG. 25 is a diagram illustrating a data transfer unit and a parallel arithmetic unit in the accelerator when the input mode is the fourth input mode.

FIG. 25 is a diagram showing the parallel arithmetic unit MAC256_0, the data transfer unit 13 and the accelerator 12 when the input mode is the fourth input mode. In this case, the data transfer unit 13 alternately selects the 16-bit data DQout_00 and DQout_01 out of the 16-bit data DQout_00 to DQout_03 composing the 64-bit data DQout_0 (16-bit×4) using the selection circuit 131 (in the example shown in FIG. 25, select B1, B2, B3, and B4 in this order), distributes the selection result to two, and outputs the data DPin_00 and DPin_01 of 16-bit. The remaining 16-bit data DQout_02 and DQout_03 are alternately selected (in the example of FIG. 25, A1, A2, A3, and A4 are selected in this order), and the selection result is divided into two and output as 16-bit data DPin_02 and DPin_03. These 16-bit data DPin_00 to DPin_03 are input to the parallel arithmetic units MAC64_0 to MAC64_3, respectively. The relationship between the data transfer unit 13 and the parallel arithmetic units MAC256_1 to MAC256_3 is the same as the relationship between the data transfer unit 13 and the parallel arithmetic unit MAC256_0, the description thereof is omitted.

At this time, two pieces of data to be output in one output process of the DRP 11 are input to each input terminal of the accelerator 12. Therefore, the processing speed of the accelerator 12 is balanced by doubling the processing speed of the DRP 11. In order to maximize the processing performance of the accelerator 12, it is preferable to adjust the processing speed of the accelerator 12 to be slightly slower than twice the processing speed of the DRP 11. When data is intermittently outputted from the DRP 11, it is preferable to increase the processing rate of the DRP 11 in accordance with the degree of intermittency of the data because the processing performance of the accelerator 12 can be maximized.

Figure 26:
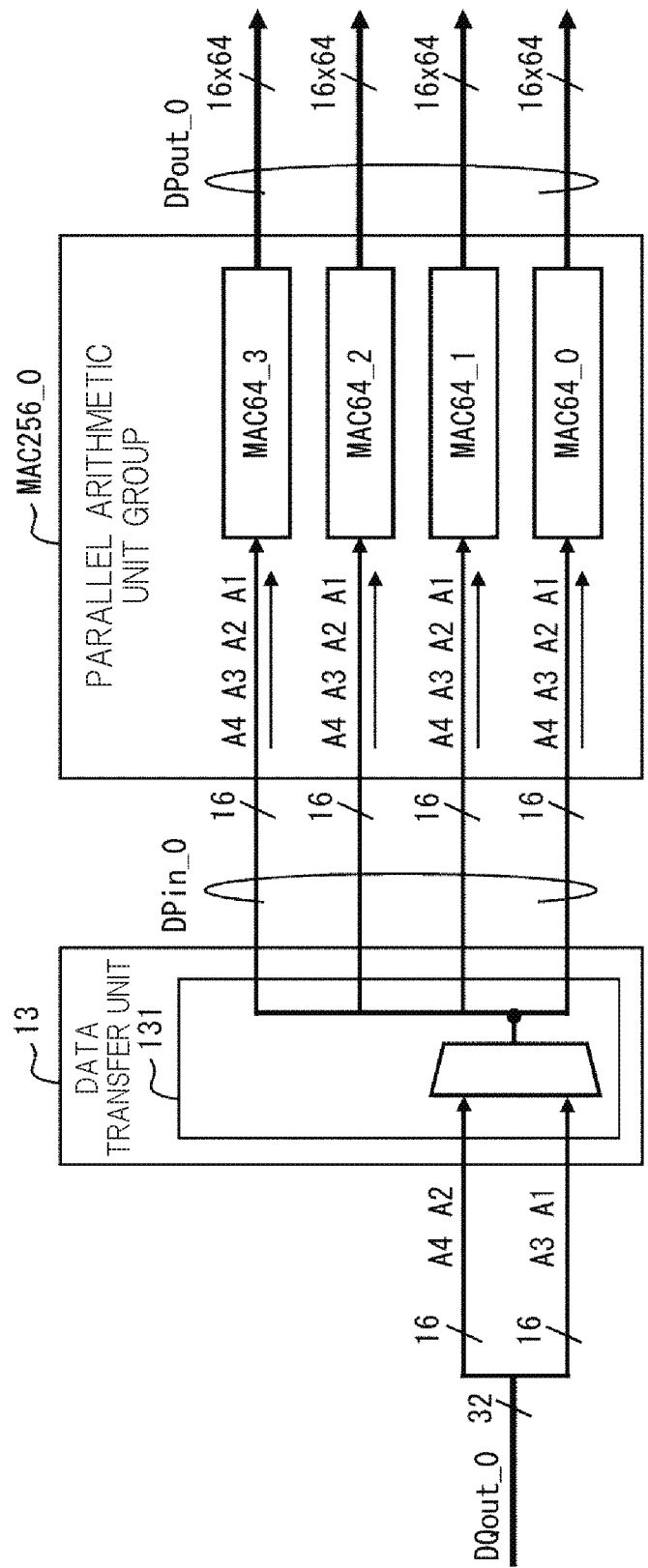
FIG. 26 is a diagram illustrating a data transfer unit and a parallel arithmetic unit in the accelerator when the input mode is the fifth input mode.

FIG. 26 is a diagram showing the parallel arithmetic unit MAC256_0, the data transfer unit 13 and the accelerator 12 when the input mode is the fifth input mode. In this case, the data transfer unit 13 uses the selection circuit 131 to alternately select the 16-bit data DQout_00 and DQout_01 constituting the 32-bit data DQout_0 (16 bits×2) (in the example of FIG. 26, A1, A2, A3, and A4 are selected in this order), distributes the selection result to four, and outputs 16-bit data DPin_00 to DPin_03. These 16-bit data DPin_00 to DPin_03 are input to the parallel arithmetic units MAC64_0 to MAC64_3, respectively.

The relationship between the data transfer unit 13 and the parallel arithmetic units MAC 256_1 to MAC256_3 is the same as the relationship between the data transfer unit 13 and the parallel arithmetic unit MAC256_0, the description thereof is omitted.

At this time, two pieces of data to be output in one output process of the DRP 11 are input to each input terminal of the accelerator 12. Therefore, the processing speed of the accelerator 12 is balanced by doubling the processing speed of the DRP 11. In order to maximize the processing performance of the accelerator 12, it is preferable to adjust the processing speed of the accelerator 12 to be slightly slower than twice the processing speed of the DRP 11. When data is intermittently outputted from the DRP 11, it is preferable to increase the processing rate of the DRP 11 in accordance with the degree of intermittency of the data because the processing performance of the accelerator 12 can be maximized.

Figure 27:
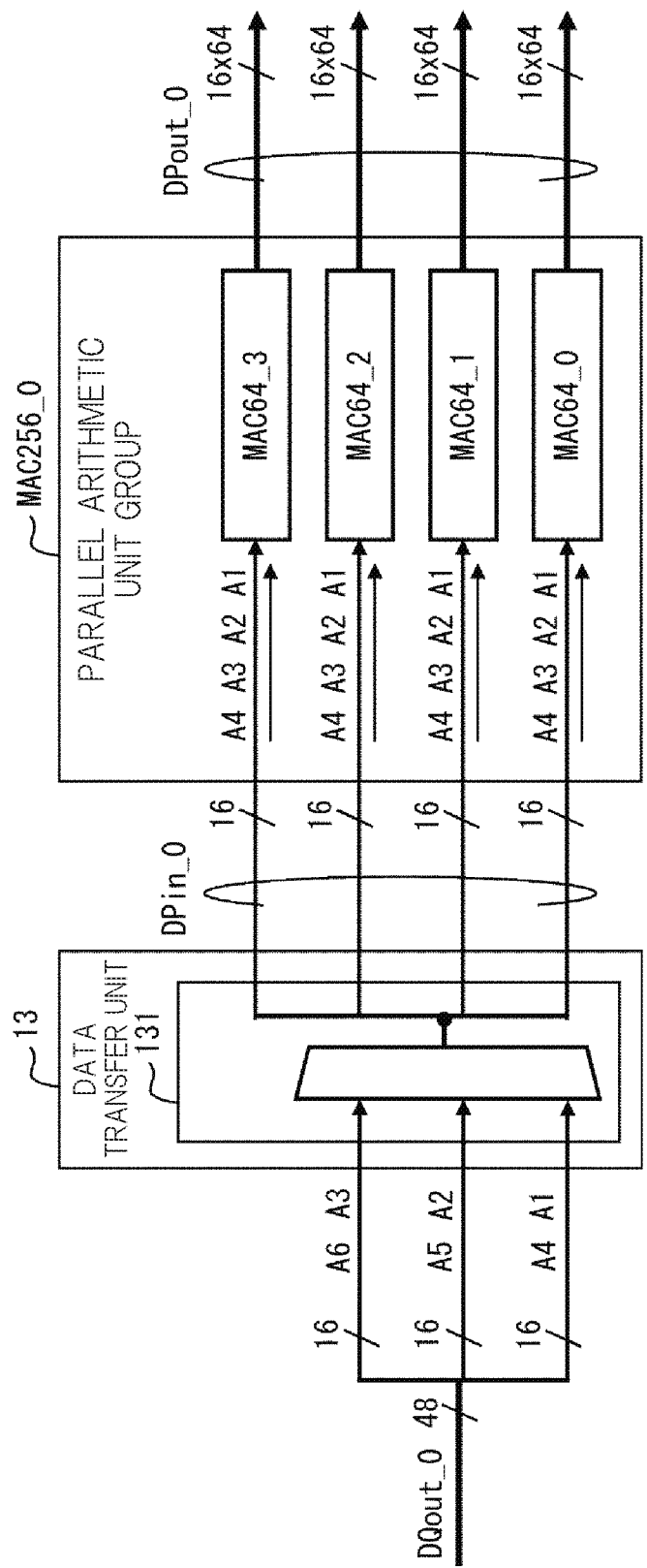
FIG. 27 is a diagram illustrating a data transfer unit and a parallel arithmetic unit of the accelerator when the input mode is the sixth input mode.

FIG. 27 is a diagram showing the parallel arithmetic unit MAC256_0, the data transfer unit 13 and the accelerator 12 when the input mode is the sixth input mode. In this case, the data transfer unit 13 selects the 16-bit data DQout_00 to DQout_02 composing the data DQout_0 of 48 bits (16 bits×3) in order using the selection circuit 131 (in the example shown in FIG. 27, A1, A2, A3, A4, A5, and A6 are selected in order), and distributes the selection result to four and outputs the data DPin_00 to DPin_03 of 16 bits. These 16-bit data DPin_00 to DPin_03 are input to the parallel arithmetic units MAC64_0 to MAC64_3, respectively.

The relationship between the data transfer unit 13 and the parallel arithmetic units MAC256_1 to MAC256_3 is the same as the relationship between the data transfer unit 13 and the parallel arithmetic unit MAC256_0, the description thereof is omitted.

At this time, three pieces of data to be output in one output process of the DRP 11 are input to each input terminal of the accelerator 12. Therefore, if the processing speed of the accelerator 12 is three times the processing speed of the DRP 11, it is well balanced. In order to maximize the processing performance of the accelerator 12, it is preferable to adjust the processing speed of the accelerator 12 to be slightly slower than three times the processing speed of the DRP 11. When data is intermittently outputted from the DRP 11, it is preferable to increase the processing rate of the DRP 11 in accordance with the degree of intermittency of the data because the processing performance of the accelerator 12 can be maximized.

Figure 28:
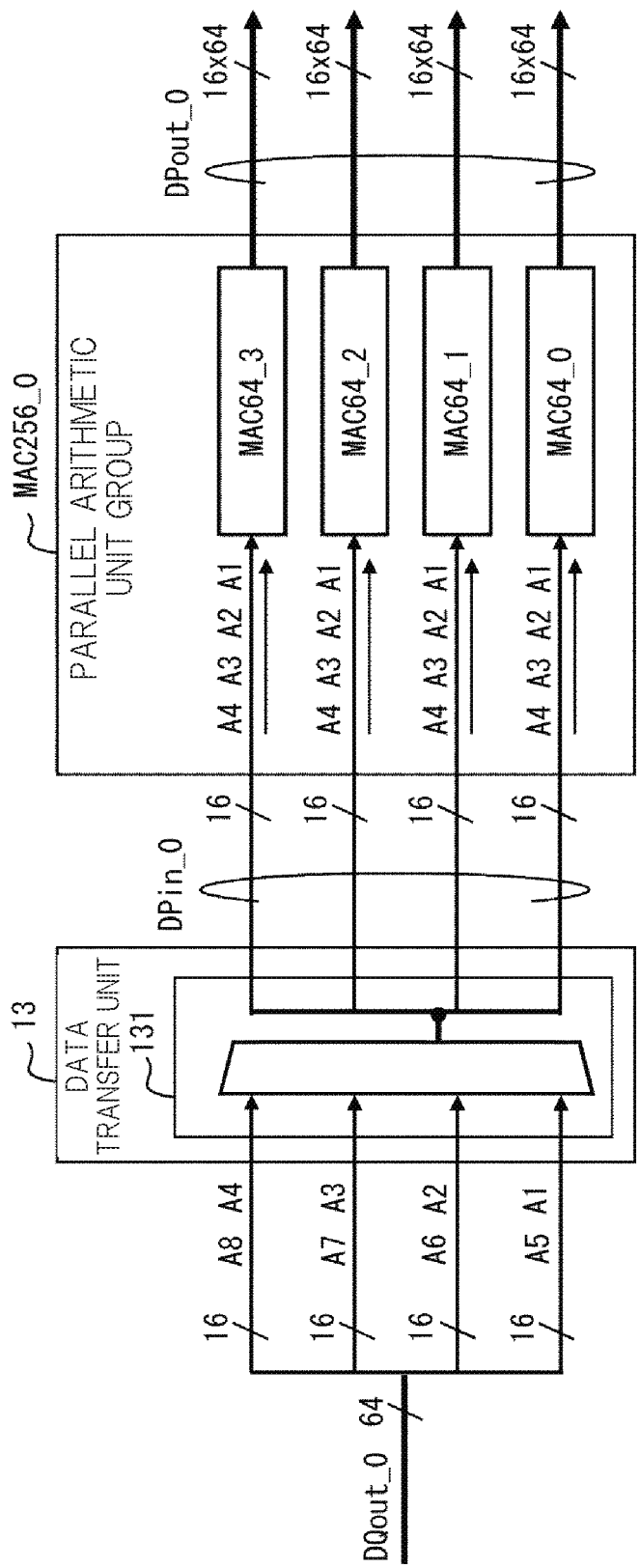
FIG. 28 is a diagram illustrating a data transfer unit and a parallel arithmetic unit in the accelerator when the input mode is the seventh input mode.

FIG. 28 is a diagram showing the parallel arithmetic unit MAC256_0, the data transfer unit 13 and the accelerator 12 when the input mode is the seventh input mode. In this case, the data transfer unit 13 selects the 16-bit data DQout_00 to DQout_03 composing the data DQout_0 of 64 bits (16 bits×4) sequentially using the selection circuit 131 (in the example shown in FIG. 28, A1, A2, A3, A4, A5, A6, A7, and A8 are selected in this order), and distributes the selection result to four and outputs the data DPin_00 to DPin_03 of 16 bits. These 16-bit data DPin_00 to DPin_03 are input to the parallel arithmetic units MAC64_0 to MAC64_3, respectively.

The relationship between the data transfer unit 13 and the parallel arithmetic units MAC256_1 to MAC256_3 is the same as the relationship between the data transfer unit 13 and the parallel arithmetic unit MAC256_0, the description thereof is omitted.

At this time, four pieces of data to be output in one DRP output process are input to each input terminal of the accelerator 12. Therefore, if the processing speed of the accelerator 12 is four times the processing speed of the DRP 11, it is well balanced. In order to maximize the processing performance of the accelerator 12, it is preferable to adjust the processing speed of the accelerator 12 to be slightly slower than four times the processing speed of the DRP 11. When data is intermittently outputted from the DRP 11, it is preferable to increase the processing rate of the DRP 11 in accordance with the degree of intermittency of the data because the processing performance of the accelerator 12 can be maximized.

As described above, the semiconductor device 1 according to the present embodiment can arbitrarily change the degree of parallelism of the parallel arithmetic process on the data inputted from the DRP 11 to the accelerator 12 via the data transfer unit 13. It should be noted that data processing is efficient when the data output rate from the DRP 11 is adjusted to match the processing throughput of the accelerator 12. In particular, if the data output rate from the DRP 11 is set to be slightly higher than the processing throughput of the accelerator 12, the processing performance of the accelerator 12 can be maximized.

Example of Data Transfer by the Data Transfer Unit 14

Next, an example of data transfer from the accelerator 12 to the DRP 11 by the data transfer unit 14 will be described. Hereinafter, examples of data transfer by the data transfer unit 14 in accordance with the mode of operation in which data is output from the accelerator 12 to the DRP 11 via the data transfer unit 14, hereinafter referred to as the output mode, will be described. The data DPout_0 is composed of data DPout_00 to DPout_03, which will be described later.

Figure 29:
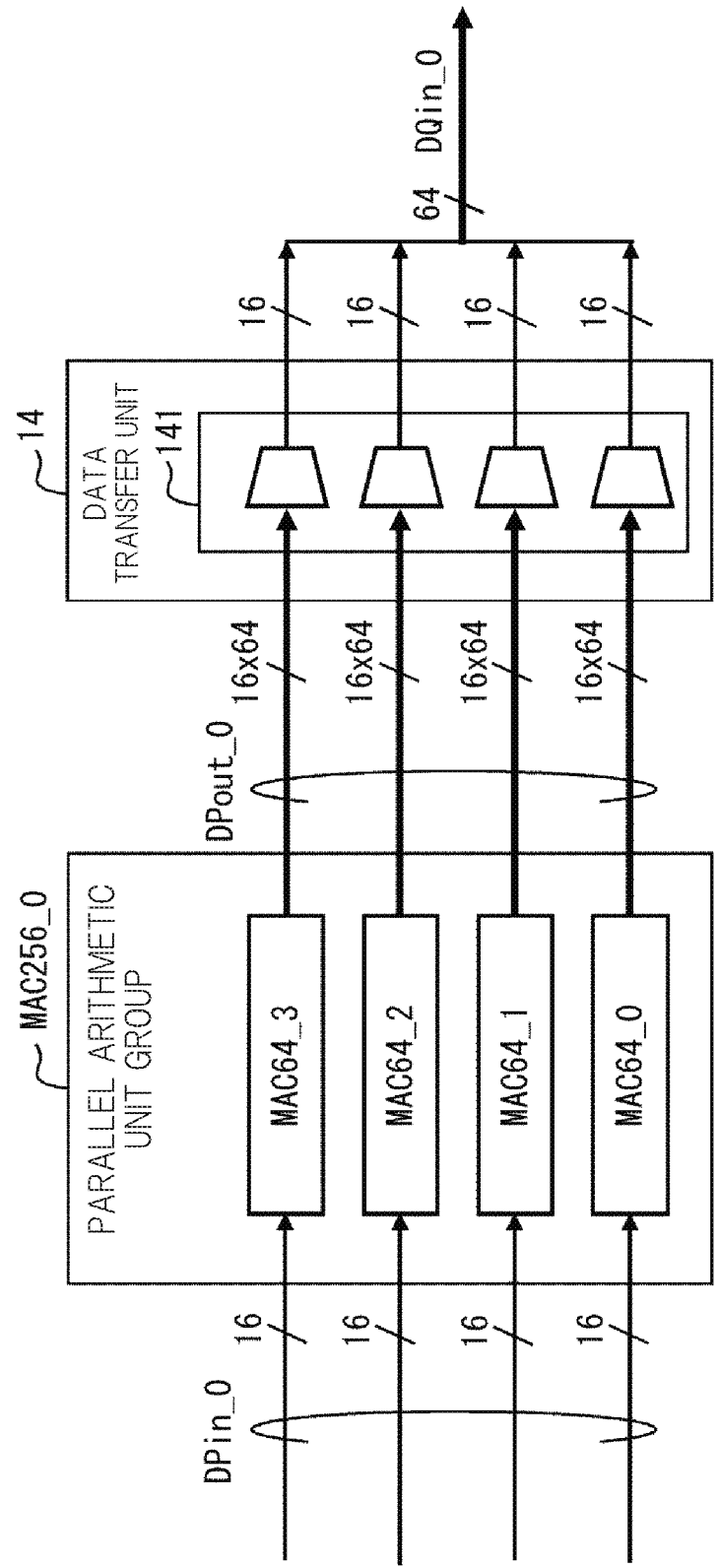
FIG. 29 is a diagram showing a parallel arithmetic unit in an accelerator and a data transfer unit when the output mode is a first output mode.

FIG. 29 is a diagram showing the parallel arithmetic unit MAC256_0 of the accelerator 12 and the data transfer unit 14 when the output mode is the first output mode. In this case, the data transfer unit 14 uses the selection circuit 141 to sequentially select one data from a maximum of 64 16-bit data DPout_00 output in parallel from the parallel arithmetic unit MAC64_0, and sequentially output the selected data as 16-bit data DQin_00. In addition, 16-bit data DQin_01 is output sequentially by selecting one data from DPout_01 having a maximum of 64 16-bit data output in parallel from the parallel processor MAC64_1. In addition, 16-bit data DQin_02 is output sequentially by selecting one data from DPout_02 having a maximum of 64 16-bit data output in parallel from the parallel processor MAC64_2. Further, a maximum of 64 16-bit data DPout_03 output in parallel from the parallel arithmetic unit MAC64_3 are sequentially selected, and sequentially outputs the selected data as 16-bit data DQin_03. That is, the data transfer unit 14 sequentially outputs 64-bit width data DQin_0 composed of 16-bit data DQin_00 to DQin_03.

The relationship between the parallel arithmetic units MAC256_1 to MAC256_3 and the data transfer unit 14 is the same as the relationship between the parallel arithmetic unit MAC256_0 and the data transfer unit 14, and a description thereof will be omitted.

Figure 30:
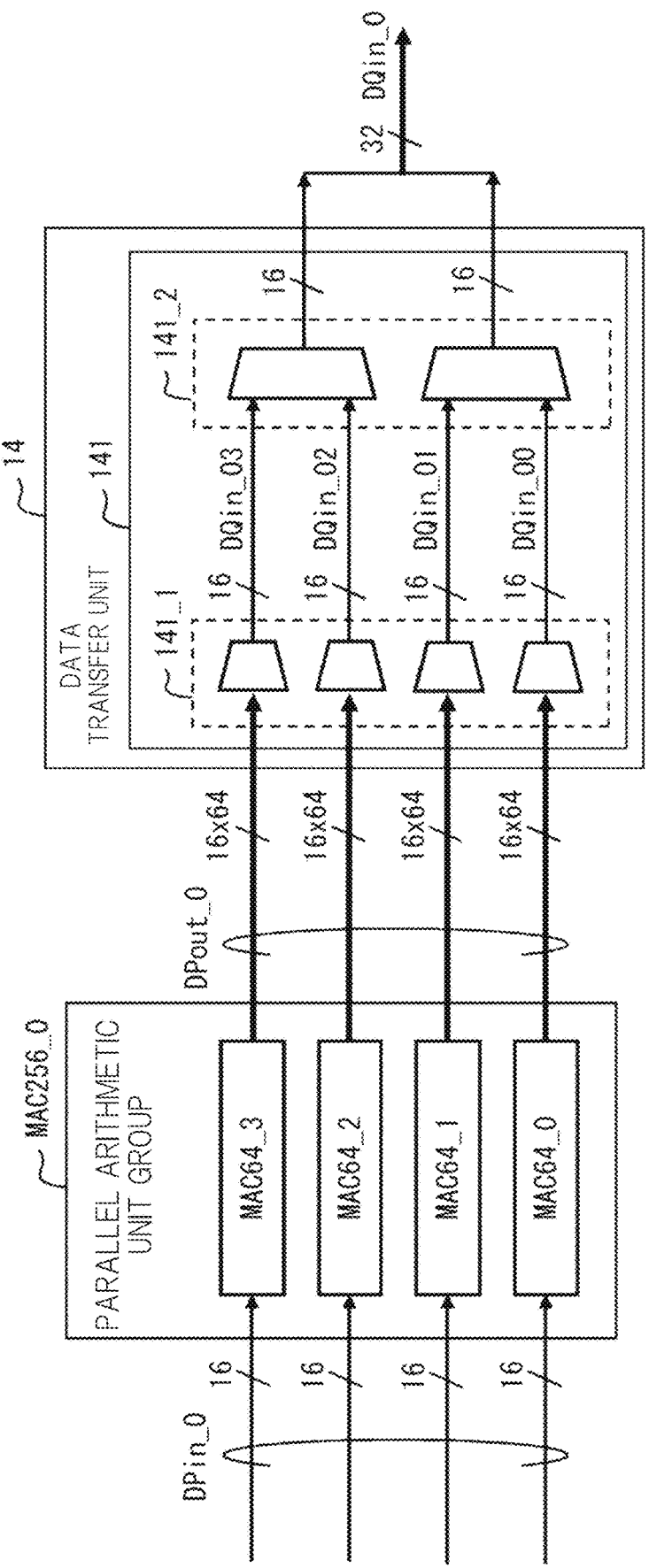
FIG. 30 is a diagram showing a parallel arithmetic unit in an accelerator and a data transfer unit when the output mode is a second output mode.

FIG. 30 is a diagram showing the parallel arithmetic unit MAC256_0 of the accelerator 12 and the data transfer unit 14 when the output mode is the second output mode. In this case, the data transfer unit 14 includes a selection circuit 141 composed of a first selection circuit 141_1 and a second selection circuit 141_2.

First, the selection circuit 141_1 sequentially selects one data from a maximum of 64 16-bit data DPout_00 output in parallel from the parallel arithmetic unit MAC64_0, and sequentially outputs the selected data as 16-bit data DQin_00. In addition, 16-bit data DQin_01 is output sequentially by selecting one by one from DPout_01 having a maximum of 64 16-bit data output in parallel from the parallel processor MAC64_1. In addition, 16-bit data DQin_02 is output sequentially by selecting one by one from DPout_02 having a maximum of 64 16-bit data output in parallel from the parallel processor MAC64_2. In addition, 16-bit data DQin_03 is output sequentially by selecting one by one from DPout_03 with a maximum of 64 16-bit data output in parallel from the parallel processor MAC64_3.

After that, the selection circuit 141_2 outputs 16-bit data DQin_00, and subsequently outputs 16-bit data DQin_01. In parallel, 16-bit data DQin_02 is output, followed by 16-bit data DQin_03. That is, the data transfer unit 14 sequentially outputs data DQin_0 having a 32-bit width composed of one of data DQin_00 and DQin_01 and one of data DQin_02 and DQin_03 output from the selection circuit 141_2.

The data transfer unit 14 may alternately output 16-bit data DQin_00 and 16-bit data DQin_01 using the selection circuit 141_2. The 16-bit data DQin_02 and the 16-bit data DQin_03 may be alternately output.

The relationship between the parallel arithmetic units MAC256_1 to MAC256_3 and the data transfer unit 14 is the same as the relationship between the parallel arithmetic unit MAC256_0 and the data transfer unit 14, and a description thereof will be omitted.

Figure 31:
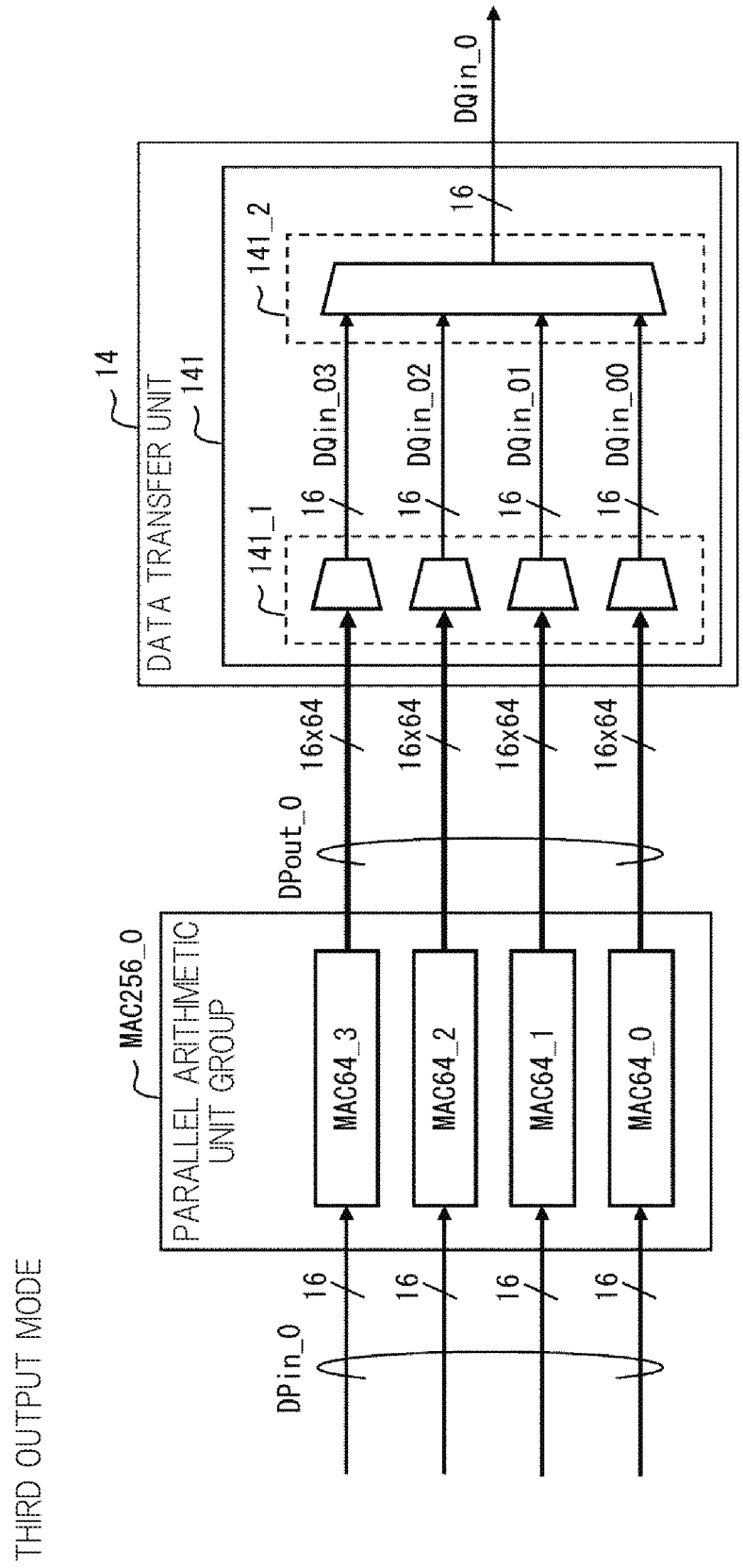
FIG. 31 is a diagram showing a parallel arithmetic unit in an accelerator and a data transfer unit when the output mode is a third output mode.

FIG. 31 is a diagram showing the parallel arithmetic unit MAC 256_0 of the accelerator 12 and the data transfer unit 14 in the case where the output mode is the third output mode. In this case, the data transfer unit 14 includes a selection circuit 141 composed of a first selection circuit 141_1 and a second selection circuit 141_2.

First, the selection circuit 141_1 sequentially selects one data from a maximum of 64 16-bit data DPout_00 output in parallel from the parallel arithmetic unit MAC64_0, and sequentially outputs the selected data as 16-bit data DQin_00. In addition, 16-bit data DQin_01 is output sequentially by selecting one by one from DPout_01 having a maximum of 64 16-bit data output in parallel from the parallel arithmetic unit MAC64_1. In addition, 16-bit data DQin_02 is output sequentially by selecting one by one from DPout_02 having a maximum of 64 16-bit data output in parallel from the parallel arithmetic unit MAC64_2. In addition, 16-bit data DQin_03 is output sequentially by selecting one by one from DPout_03 with a maximum of 64 16-bit data output in parallel from the parallel arithmetic unit MAC64_3.

Thereafter, the selection circuit 141_2 sequentially selects one data from the 16-bit data DQin_00 to DQin_03, and sequentially outputs the selected data as the 16-bit width data DQin_0.

The relationship between the parallel arithmetic units MAC256_1 to MAC256_3 and the data transfer unit 14 is the same as the relationship between the parallel arithmetic unit MAC256_0 and the data transfer unit 14, and a description thereof will be omitted.

Figure 32:
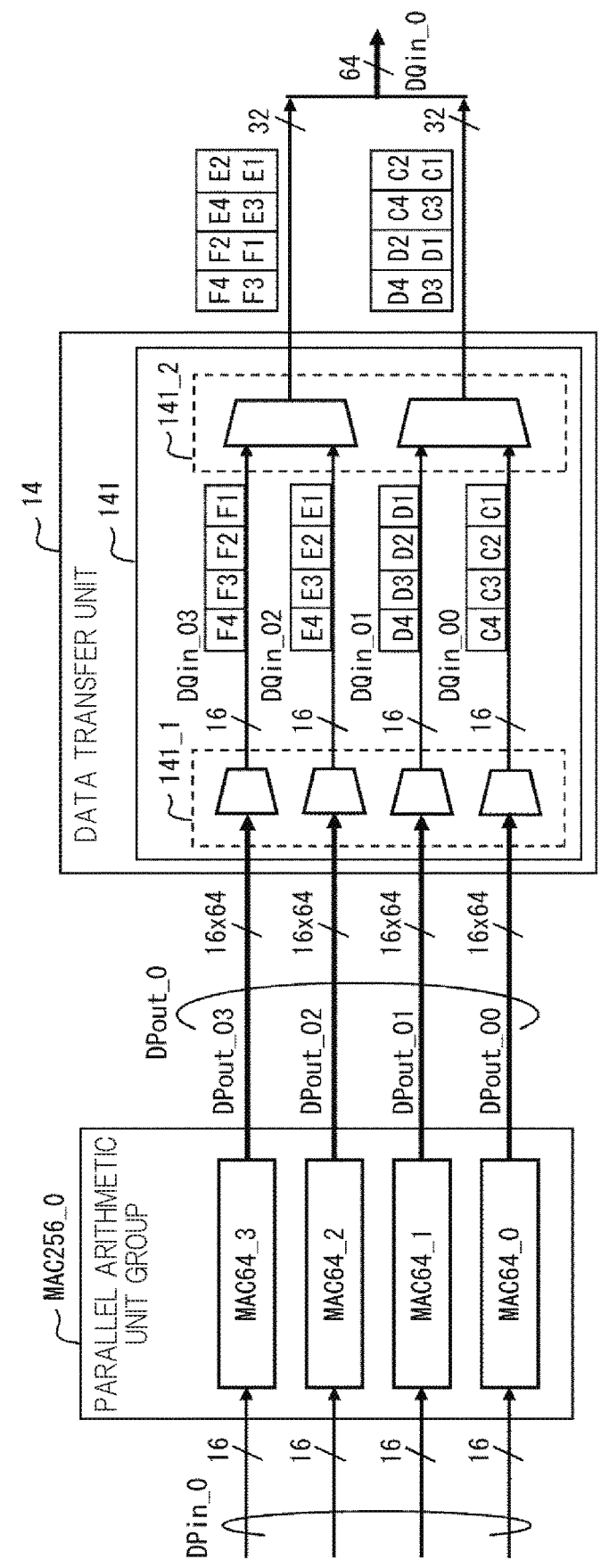
FIG. 32 is a diagram illustrating a parallel arithmetic unit in the accelerator and a data transfer unit when the output mode is a fourth output mode.

FIG. 32 is a diagram showing the parallel arithmetic unit MAC256_0 of the accelerator 12 and the data transfer unit 14 in the case where the output mode is the fourth output mode. In this case, the data transfer unit 14 includes a selection circuit 141 composed of a first selection circuit 141_1 and a second selection circuit 141_2.

First, the selection circuit 141_1 sequentially selects one data from a maximum of 64 16-bit data DPout_00 output in parallel from the parallel arithmetic unit MAC64_0, and sequentially outputs the selected data as 16-bit data DQin_00 (C1, C2, C3, C4, . . . in the example of FIG. 32). In addition, 16-bit data DPout_01 are sequentially selected one by one from a maximum of 64 16-bit data DPout_01 output in parallel from the parallel arithmetic unit MAC64_1, and are sequentially output as 16-bit data DQin_01 (D1, D2, D3, D4, . . . in the example of FIG. 32). In addition, a maximum of 64 16-bit data DPout_02 output in parallel from the parallel arithmetic unit MAC64_2 are sequentially selected one by one, and the selected data are sequentially output as 16-bit data DQin_02 (E1, E2, E3, E4, . . . ). In addition, a maximum of 64 16-bit data DPout_03 output in parallel from the parallel arithmetic unit MAC64_3 are sequentially selected one by one, and the selected data are sequentially output as 16-bit data DQin_03 (in the example of FIG. 32, F1, F2, F3, F4, . . . ).

Thereafter, the selection circuit 141_2 alternately outputs the 16-bit data DQin_00 and the 16-bit data DQin_01 as 32-bit data. In parallel with this, 16-bit data DQin_02 and 16-bit data DQin_03 are output in order (in this example, four elements in order) and two pieces of data are collectively output as 32-bit data. That is, the data transfer unit 14 sequentially outputs 64-bit width data DQin_0.

The relationship between the parallel arithmetic units MAC256_1 to MAC256_3 and the data transfer unit 14 is the same as the relationship between the parallel arithmetic unit MAC256_0 and the data transfer unit 14, and a description thereof will be omitted.

At this time, the data is inputted to the DRP 11 at a rate of ½ of the data outputted from the accelerator 12. Therefore, when the processing speed of the accelerator 12 is about twice the processing speed of the DRP 11, the data transfer speed of the data output from the accelerator 12 can be reduced to the DRP 11 processing speed after the accelerator 12 executes the parallel arithmetic operation processing efficiently without being rate-limited by the DRP 11 processing.

Figure 33:
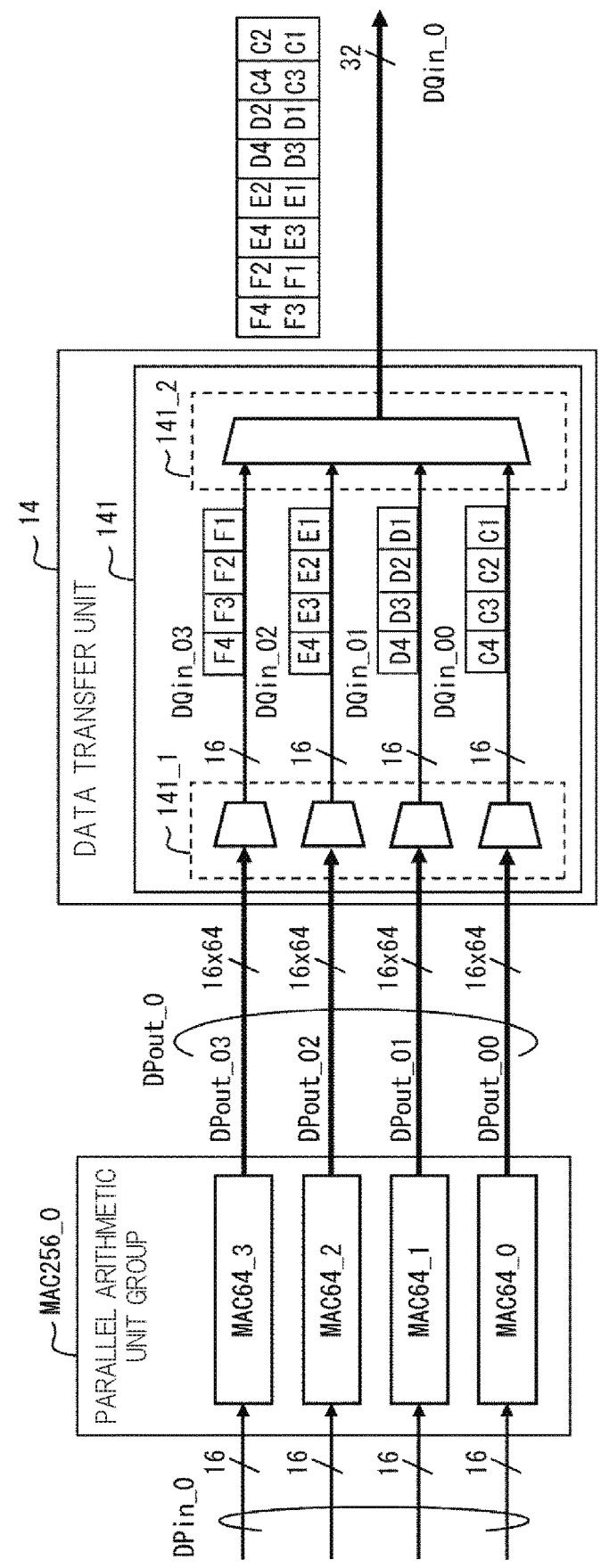
FIG. 33 is a diagram illustrating a parallel arithmetic unit in the accelerator 12 and a data transfer unit 14 when the output mode is the fifth output mode.

FIG. 33 is a diagram showing the parallel arithmetic unit MAC256_0 of the accelerator 12 and the data transfer unit 14 in the case where the output mode is the fifth output mode. In this case, the data transfer unit 14 includes a selection circuit 141 composed of a first selection circuit 141_1 and a second selection circuit 141_2.

First, the selection circuit 141_1 sequentially selects one by one from a maximum of 64 16-bit data DPout_00 output in parallel from the parallel arithmetic unit MAC64_0, and sequentially outputs the selected data as 16-bit data DQin_00 (C1, C2, C3, C4, . . . in the example of FIG. 33). In addition, a maximum of 64 16-bit data DPout_01 output in parallel from the parallel arithmetic unit MAC64_1 are sequentially selected one by one, and are sequentially output as 16-bit data DQin_01 (D1, D2, D3, D4, . . . in the example of FIG. 33). In addition, a maximum of 64 16-bit data DPout_02 output in parallel from the parallel arithmetic unit MAC64_2 are sequentially selected one by one, and are sequentially output as 16-bit data DQin_02 (E1, E2, E3, E4, . . . in the example of FIG. 33). In addition, a maximum of 64 16-bit data DPout_03 output in parallel from the parallel arithmetic unit MAC64_3 are sequentially selected one by one, and are sequentially output as 16-bit data DQin_03 (in the example of FIG. 33, F1, F2, F3, F4, . . . ).

Thereafter, the selection circuit 141_2 sequentially outputs 16-bit data DQin_00 to DQin_03 in order (in this example, in order of four elements) and collects two pieces of data as 32-bit width data DQin_0.

The relationship between the parallel arithmetic units MAC256_1 to MAC256_3 and the data transfer unit 14 is the same as the relationship between the parallel arithmetic unit MAC256_0 and the data transfer unit 14, and a description thereof will be omitted.

At this time, the data is inputted to the DRP 11 at a rate of ½ of the data outputted from the accelerator 12. Therefore, in particular, when the processing speed of the accelerator 12 is about twice the processing speed of the DRP 11, the data transfer speed of the data output from the accelerator 12 can be reduced to the DRP 11 processing speed after the accelerator 12 executes the parallel arithmetic processing efficiently without being rate-limited by the DRP 11 processing.

Figure 34:
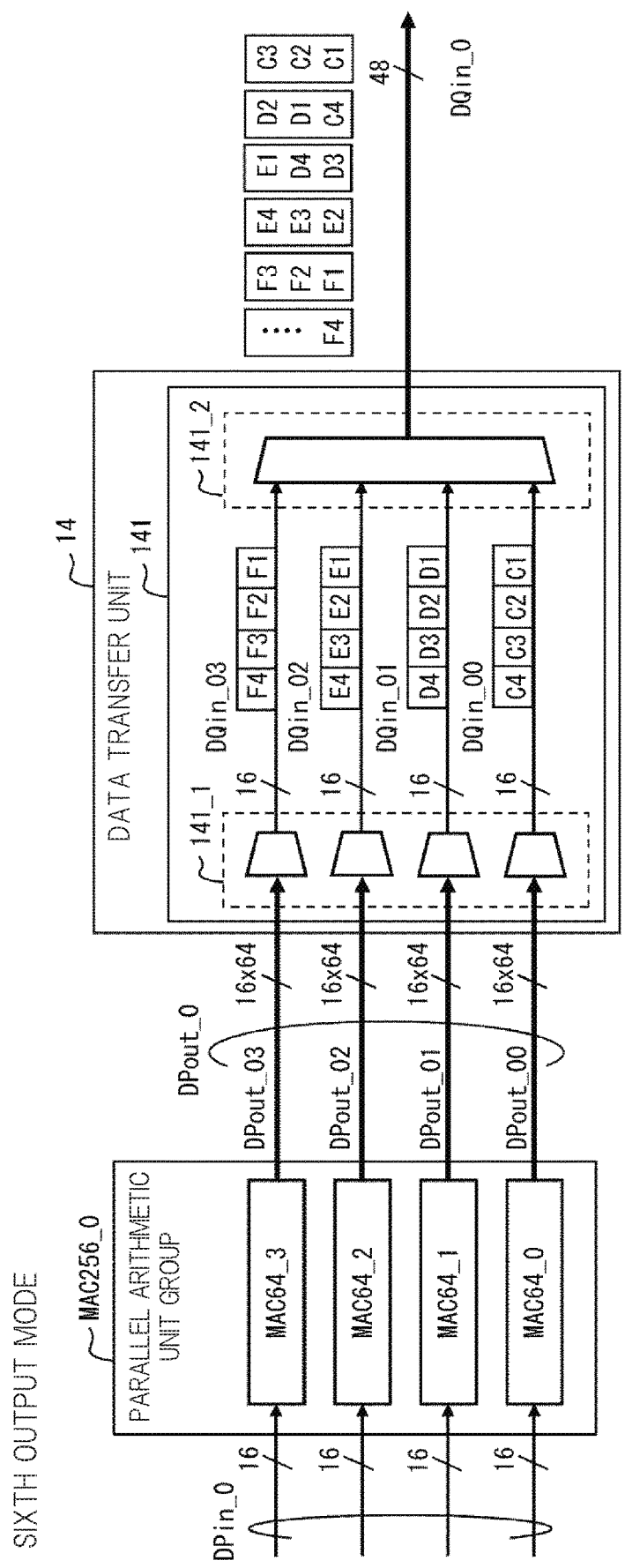
FIG. 34 is a diagram illustrating a parallel arithmetic unit in the accelerator and a data transfer unit when the output mode is the sixth output mode.

FIG. 34 is a diagram showing the parallel arithmetic unit MAC256_0 of the accelerator 12 and the data transfer unit 14 in the case where the output mode is the sixth output mode. In this case, the data transfer unit 14 includes a selection circuit 141 composed of a first selection circuit 141_1 and a second selection circuit 141_2.

First, the selection circuit 141_1 sequentially selects one by one from a maximum of 64 16-bit data DPout_00 output in parallel from the parallel arithmetic unit MAC64_0, and sequentially outputs the selected data as 16-bit data DQin_00 (C1, C2, C3, C4, . . . in the example of FIG. 34). In addition, a maximum of 64 16-bit data DPout_01 output in parallel from the parallel arithmetic unit MAC64_1 are sequentially selected one by one, and are sequentially output as 16-bit data DQin_01 (D1, D2, D3, D4, . . . in the example of FIG. 34). In addition, a maximum of 64 16-bit data DPout_02 output in parallel from the parallel arithmetic unit MAC64_2 are sequentially selected one by one, and are sequentially output as 16-bit data DQin_02 (E1, E2, E3, E4, . . . in the example of FIG. 34). In addition, a maximum of 64 16-bit data DPout_03 output in parallel from the parallel arithmetic unit MAC64_3 are sequentially selected one by one, and are sequentially output as 16-bit data DQin_03 (F1, F2, F3, F4, . . . in the example of FIG. 34).

Thereafter, the selection circuit 141_2 sequentially outputs 16-bit data DQin_00 to DQin_03 in order (in this example, in order of four elements) and collects three pieces of data as 48-bit width data DQin_0.

The relationship between the parallel arithmetic units MAC256_1 to MAC256_3 and the data transfer unit 14 is the same as the relationship between the parallel arithmetic unit MAC256_0 and the data transfer unit 14, and a description thereof will be omitted.

At this time, data is inputted to the DRP 11 at a rate of one third of the data outputted from the accelerator 12. Therefore, when the processing speed of the accelerator 12 is about three times the processing speed of the DRP 11, the data transfer speed of the data outputted from the accelerator 12 can be reduced to the DRP 11 processing speed after the accelerator 12 executes the parallel arithmetic processing efficiently without being rate-limited by the DRP 11 processing.

Figure 35:
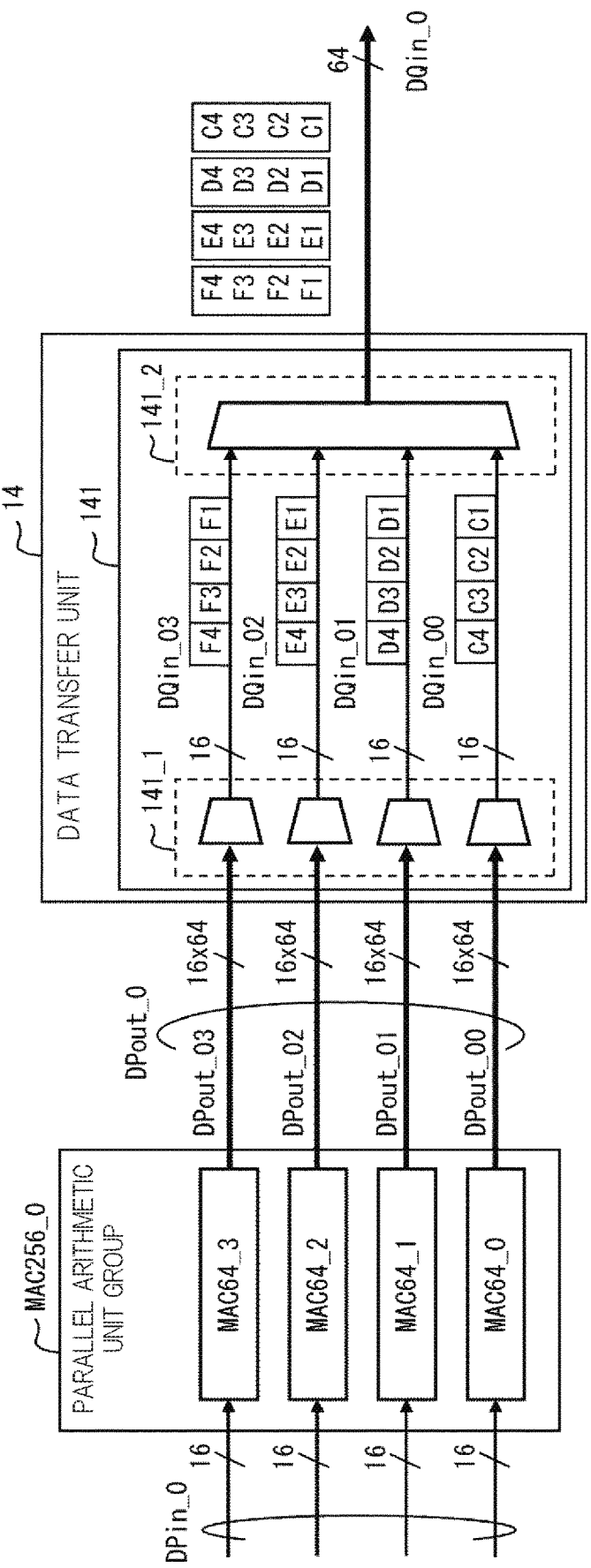
FIG. 35 is a diagram illustrating a parallel arithmetic unit in of the accelerator and a data transfer unit when the output mode is the seventh output mode.

FIG. 35 is a diagram showing the parallel arithmetic unit MAC256_0 of the accelerator 12 and the data transfer unit 14 in the case where the output mode is the seventh output mode. In this case, the data transfer unit 14 includes a selection circuit 141 composed of a first selection circuit 141_1 and a second selection circuit 141_2.

First, the selection circuit 141_1 sequentially selects one by one from a maximum of 64 16-bit data DPout_00 output in parallel from the parallel arithmetic unit MAC64_0, and sequentially outputs the selected data as 16-bit data DQin_00 (C1, C2, C3, C4, . . . in the example of FIG. 35). In addition, a maximum of 64 16-bit data DPout_01 output in parallel from the parallel arithmetic unit MAC64_1 are sequentially selected one by one, and are sequentially output as 16-bit data DQin_01 (D1, D2, D3, D4, . . . in the example of FIG. 35). In addition, 16-bit data DPout_02 are sequentially selected one by one from a maximum of 64 16-bit data DPout_02 output in parallel from the parallel arithmetic unit MAC64_2, and are sequentially output as 16-bit data DQin_02 (E1, E2, E3, E4, . . . in the example of FIG. 35). In addition, 16-bit data DPout_03 are sequentially selected one by one from a maximum of 64 16-bit data DPout_03 output in parallel from the parallel arithmetic unit MAC 64_3, and are sequentially output as 16-bit data DQin_03 (in the example of FIG. 35, F1, F2, F3, F4, . . . ).

Thereafter, the selection circuit 141_2 sequentially outputs 16-bit data DQin_00 to DQin_03 in order (in this example, in order of four elements) and collects four pieces of data as 64-bit width data DQin_0.

The relationship between the parallel arithmetic units MAC256_1 to MAC256_3 and the data transfer unit 14 is the same as the relationship between the parallel arithmetic unit MAC256_0 and the data transfer unit 14, and a description thereof will be omitted.

At this time, data is inputted to the DRP 11 at a rate of ¼ of the data outputted from the accelerator 12. Therefore, when the processing speed of the accelerator 12 is about four times the processing speed of the DRP 11, the data transfer speed of the data outputted from the accelerator 12 can be reduced to the DRP 11 processing speed after the accelerator 12 executes the parallel arithmetic processing efficiently without being rate-limited by the DRP 11 processing.

As described above, in the semiconductor device 1 according to the present embodiment, the data outputted from the accelerator 12 to the DRP 11 via the data transferring unit 14 can be changed to data of any bit-width. In order to maximize the performance of the accelerator 12, it is preferable that the data rate received by the DRP 11 is slightly higher than the data rate outputted from the accelerator 12.

Figure 36:
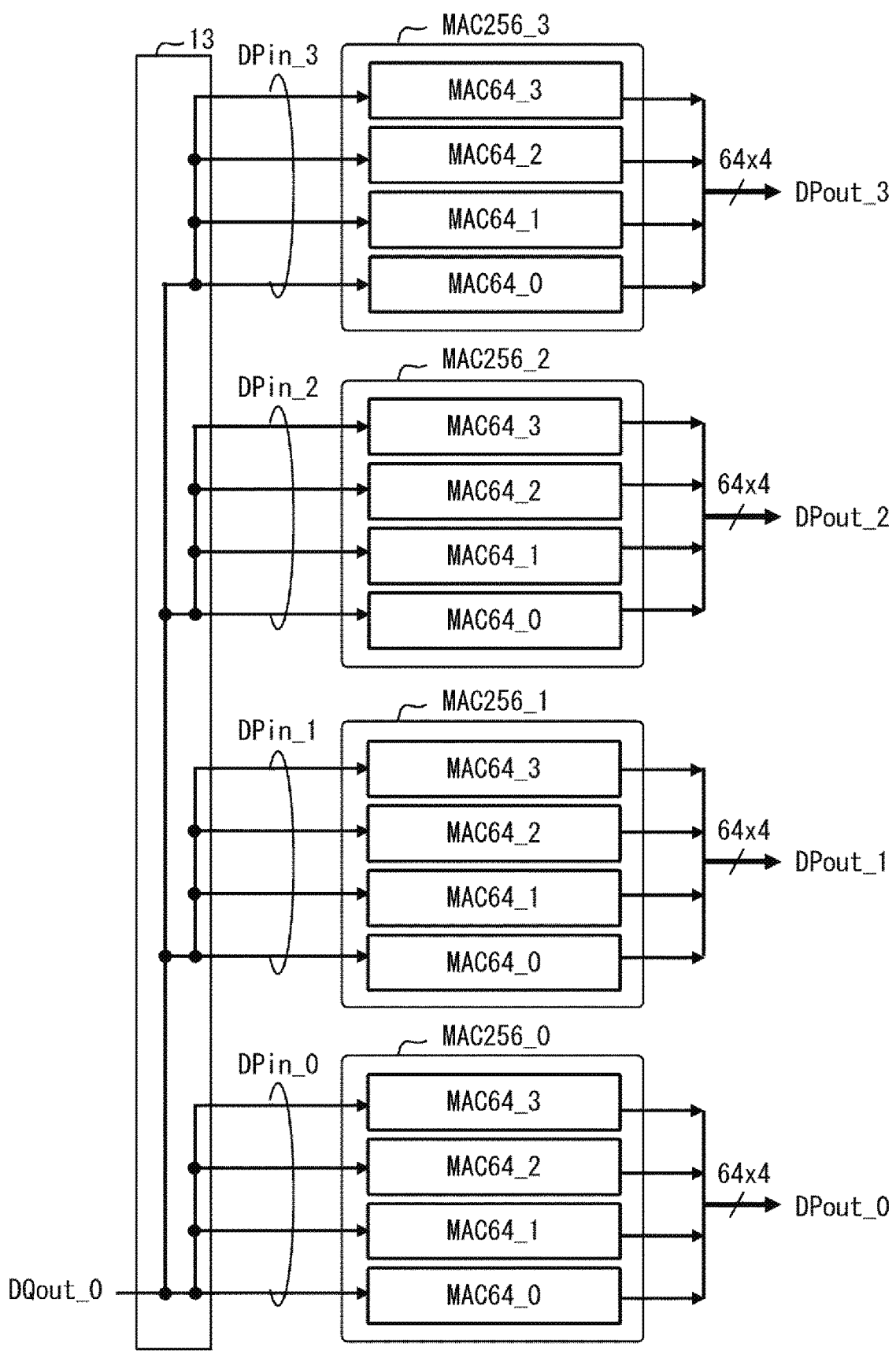
FIG. 36 is a diagram illustrating a flow of an operation process of a parallel arithmetic part when an operation is performed with the input data set to the maximum degree of parallelism.

FIG. 36 is a diagram showing the flow of the arithmetic operation processing of the parallel arithmetic part 121 when the arithmetic operation is performed on the input data with the maximum degree of parallelism. As shown in FIG. 36, the data DQout_0 outputted from the DRP 11 is distributed and supplied as data DPin_0 to DPin_3 by the data transferring unit 13 to the parallel arithmetic units MAC64_0 to MAC64_3 provided in the parallel arithmetic units MAC256_0 to MAC256_3, respectively. At this time, the parallel arithmetic part 121 can perform arithmetic operation on the data DQout_0 (data DPin_0 to DPin_3) in parallel by using up to 1024 arithmetic units. Note that the data transferring unit 14 is configured to selectively output the arithmetic operation results output in parallel from each of the 1024 arithmetic units, so that these arithmetic operation results can be converted into data of a desired bit-width and output to the DRP 11.

Figure 37:
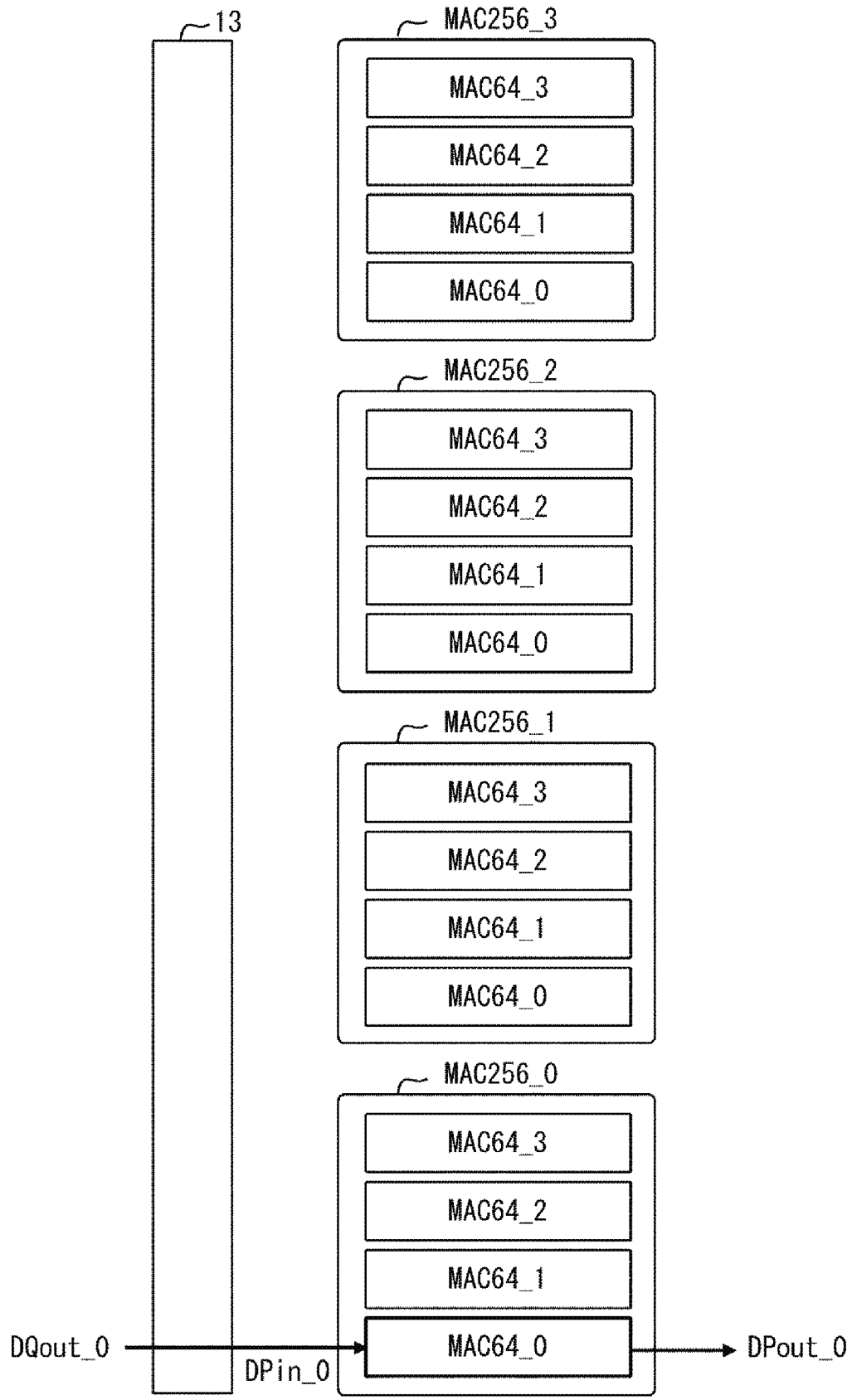
FIG. 37 is a diagram illustrating a flow of an operation process of a parallel arithmetic part when an operation process is performed by minimizing the parallelism of the input data.

FIG. 37 is a diagram showing the flow of the arithmetic operation of the parallel arithmetic part 121 in the case where the arithmetic operation is performed on the input data with the degree of parallelism as the minimum unit. As shown in FIG. 37, the data DQout_0 outputted from the DRP 11 is supplied to the parallel arithmetic unit MAC64_0 provided in the parallel arithmetic unit MAC256_0 as the data DPin_0 by the data transferring unit 13. At this time, the parallel operation part 121 can execute the arithmetic operation on the data DQout_0 (data DPin_0) in parallel by using one to 64 arithmetic units out of the 64 arithmetic units provided in the parallel arithmetic unit MAC64_0.

Figure 38:
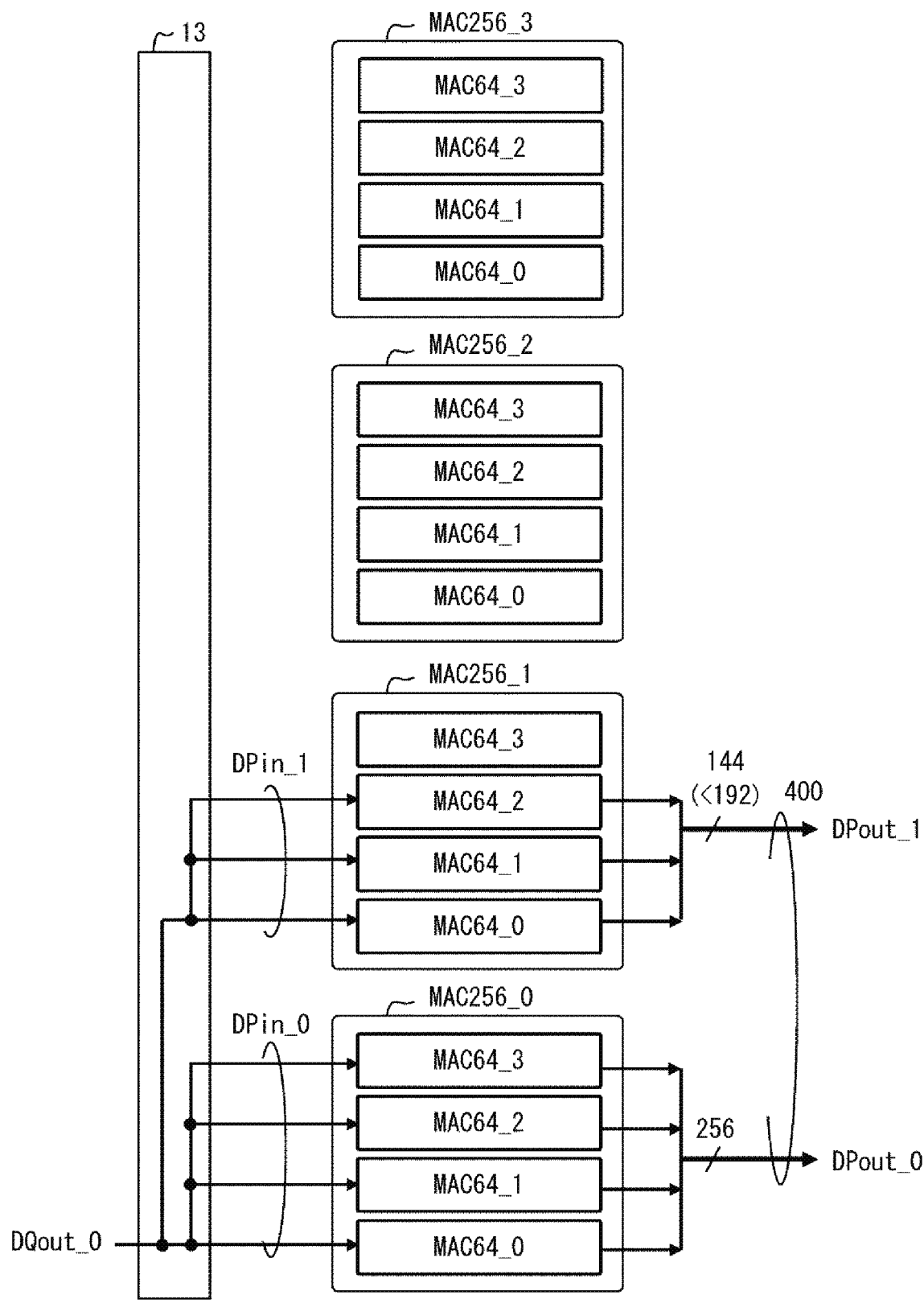
FIG. 38 is a diagram illustrating a flow of an operation process of a parallel arithmetic part 121 when an operation process is performed by setting the input data in parallel to a medium degree.

FIG. 38 is a diagram showing the flow of the arithmetic operation processing of the parallel arithmetic part 121 when the arithmetic operation is performed on the input data with the degree of parallelism set at a medium level. In the embodiment of FIG. 38, the data DQout_0 outputted from the DRP 11 is distributed and supplied as data DPin_0 and DPin_1 by the data transferring unit 13 to the parallel arithmetic units MAC64_0 to MAC64_3 provided in the parallel arithmetic unit MAC256_0 and the parallel arithmetic units MAC64_0 to MAC64_2 provided in the parallel arithmetic unit MAC256_0, respectively. Here, the parallel arithmetic part 121 can perform arithmetic operation processing on the data DQout_0 (data DPin_0 and DPin_1) in parallel using, for example, 400 arithmetic units.

Figure 39:
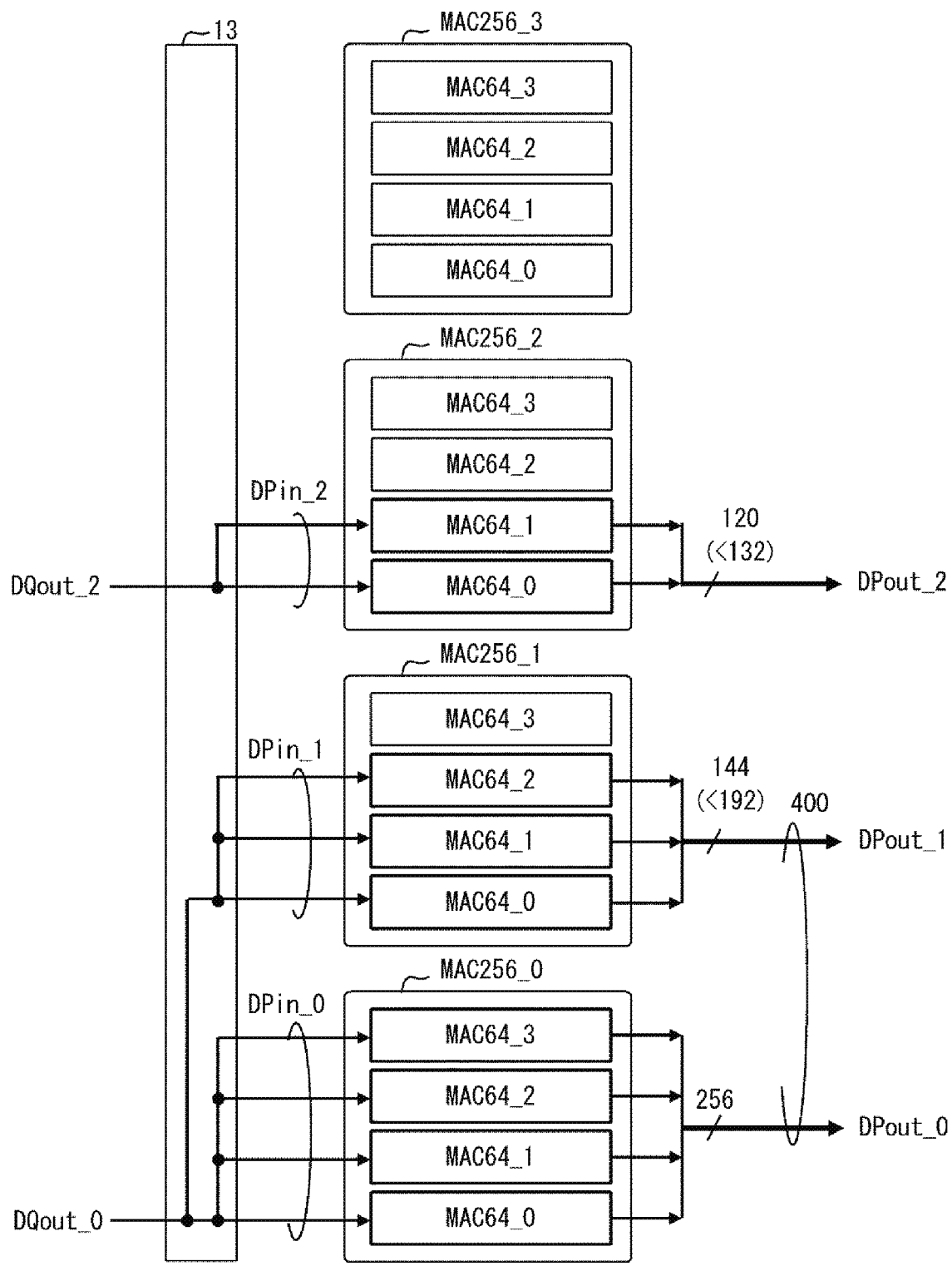
FIG. 39 is a diagram illustrating a flow of an operation process of a parallel arithmetic part when a parallel arithmetic operation is performed for each of two input data.

FIG. 39 is a diagram showing the flow of the arithmetic operation of the parallel arithmetic part 121 when the parallel arithmetic operation is performed on each of the two input data. In the embodiment of FIG. 39, the data DQout_0 outputted from the DRP 11 is distributed and supplied as data DPin_0 and DPin_1 by the data transferring unit 13 to the parallel arithmetic units MAC64_0 to MAC64_3 provided in the parallel arithmetic unit MAC256_0 and the parallel arithmetic units MAC64_0 to MAC64_2 provided in the parallel arithmetic unit MAC256_1, respectively. Further, the data DQout_2 outputted from the DRP 11 is distributed and supplied as data DPin_2 by the data transferring unit 13 to the parallel arithmetic units MAC64_0 and MAC64_1 provided in the parallel arithmetic unit MAC256_2. At this time, the parallel arithmetic part 121 can execute the arithmetic operation on the data DQout_0 (data DPin_0 and DPin_1) in parallel using, for example, 400 arithmetic units, and execute operation processing on the data DQout_2 (data DPin_2) in parallel using, for example, 120 different arithmetic units.

In the case of executing arithmetic operation using a plurality of arithmetic units different from each other for two or more input data, for example, a plurality of arithmetic units used for arithmetic operation processing for one input data and a plurality of arithmetic units used for arithmetic operation processing for the other input data may be supplied with individual predetermined data read out from the local memory 122, or may be supplied with common predetermined data.

Second Embodiment

Figure 40:
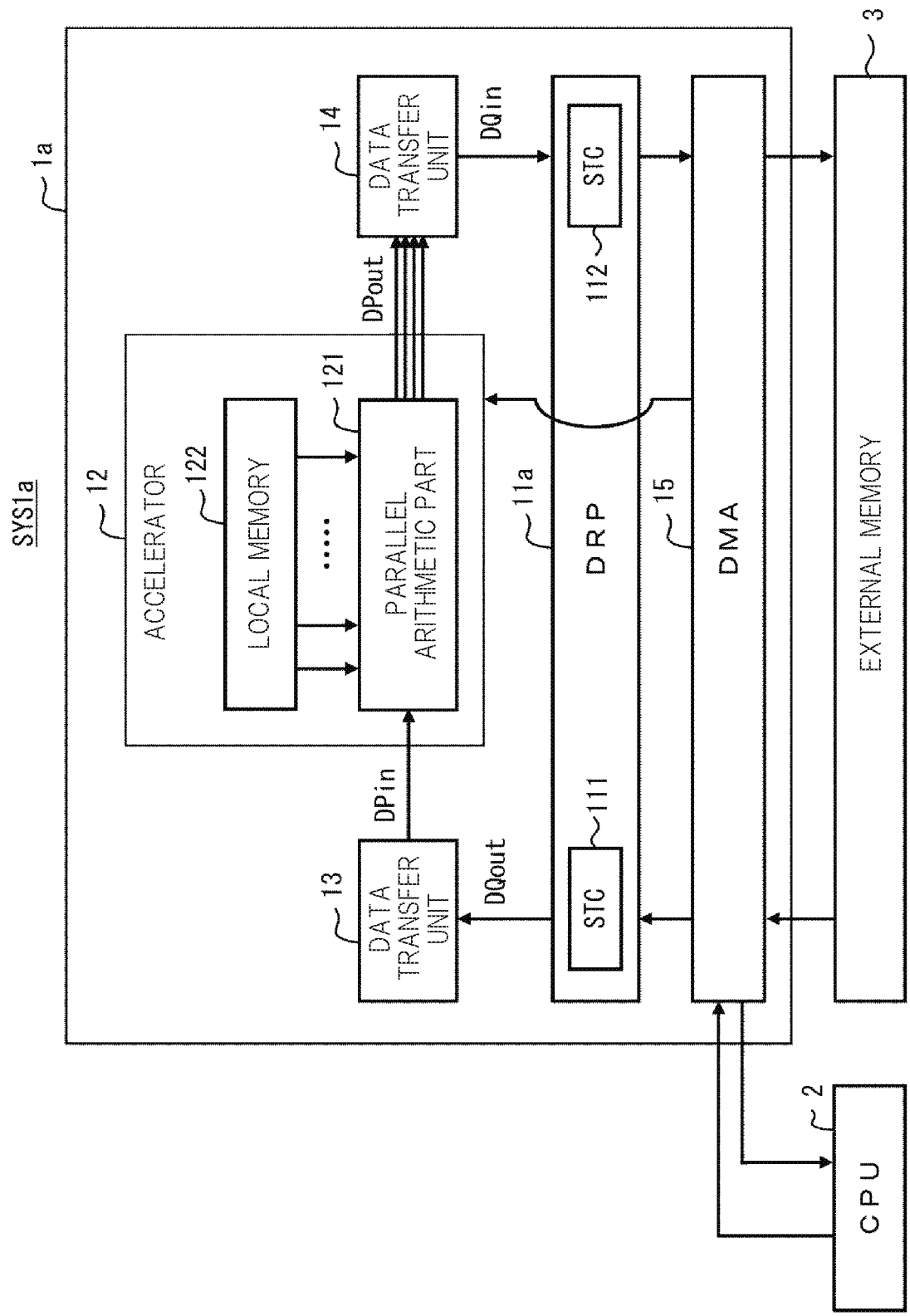
FIG. 40 is a block diagram illustrating an example of a configuration of a semiconductor system in which a semiconductor device according to a second embodiment is mounted.

FIG. 40 is a block diagram showing an exemplary configuration of a semiconductor system SYS1a on which the semiconductor system 1a according to the second embodiment is mounted. The semiconductor device 1a shown in FIG. 40 has a DRP 11a instead of a DRP 11 as compared with the semiconductor device 1 shown in FIG. 1.

The DRP 11a has, for example, two state management units (STCs; State Transition Controller) 111 and 112, performs arithmetic operation on data read out from the external memory 3 using one state management unit 111, outputs the arithmetic operation result to the accelerator 12, and performs arithmetic operation on data output from the accelerator 12 using the other state management unit 112, and writes the arithmetic operation result to the external memory 3. That is, the DRP 11a operates the processing of the data to be transmitted to the accelerator 12 and the processing of the data received from the accelerator 12 independently of each other. As a result, in the DRP 11a, it is possible to make the operation instruction (application) given when performing the dynamic reconfiguration simpler than the dynamic reconfiguration instruction (application) when performing the dynamic reconfiguration operation (DRP 11). It also allows the DRP 11a to reconfigure circuits more easily than with DRP 11.

In addition, the DRP 11a is provided with two state management units for independently operating the processing of the data to be transmitted to the accelerator 12 and the processing of the data received from the accelerator 12, whereby, for example, the degree of flexibility of arrangement of an external input terminal to which the data read from the external memory 3 is input, an external output terminal to which the data directed to the accelerator 12 is output, an external input terminal to which the data from the accelerator 12 is input, and an external output terminal to which the write data directed to the external memory 3 is output can be increased.

As described above, the semiconductor device according to first and second embodiments includes an accelerator having a parallel arithmetic part that performs arithmetic operation in parallel, a data processing unit such as DRP that sequentially transfers data, and a data transfer unit that sequentially selects and outputs a plurality of arithmetic operation processing results by the accelerator to the data processing unit. As a result, the semiconductor device according to the first and second embodiments and the semiconductor system including the same can perform a large amount of regular data processing by using the accelerator, and perform other data processing by using the data processing unit, so that efficient arithmetic operation can be performed even in a large-scale arithmetic processing such as, for example, a deep learning processing.

Although the invention made by the inventor has been specifically described based on the embodiment, the present invention is not limited to the embodiment already described, and it is needless to say that various modifications can be made without departing from the gist thereof.

In the first and second embodiments described above, the case where the individual predetermined data read out from the local memory 122 is supplied to the plurality of arithmetic units constituting the parallel arithmetic part 121 is described, but the present invention is not limited thereto. The common predetermined data read from the local memory 122 may be supplied to all or a group of the plurality of arithmetic units constituting the parallel arithmetic part 121. In this case, the circuit scale and power consumption of the local memory 122 can be reduced.

Some or all of the above-described embodiments may be described as the following appendix, but the present invention is not limited to the following.

Appendix 1

A semiconductor device, comprising: a data processing unit that performs data processing on sequentially input first input data and sequentially outputs the result of data processing as first output data; a parallel arithmetic unit that performs arithmetic processing in parallel between the first output data sequentially output from the data processing unit and each of a plurality of predetermined data; a holding circuit that holds the results of the arithmetic processing; and a first data transfer unit that sequentially selects a plurality of arithmetic processing results held by the accelerator and sequentially outputs the results of the arithmetic processing as the first input data.

Appendix 2

The semiconductor device according to Appendix 1, wherein the data processing unit is a processor that can be dynamically reconfigured based on an operation command that is sequentially given.

Appendix 3

A semiconductor system comprising: a semiconductor device as described in Appendix 3; an external memory; and a control unit that controls the operation of the semiconductor device based on a control instruction read from the external memory.

What is claimed is:

1. A semiconductor device, comprising:
a data processing unit;
an accelerator;
a first data transfer unit; and
a second data transfer unit,
wherein the data processing unit is configured to 1) sequentially receive first input data, 2) perform data processing on the first input data, and 3) sequentially output first output data as a result of the data processing to the first data transfer unit,
wherein the first data transfer unit is configured to 1) receive the first output data from the data processing unit and 2) output the first output data to a plurality of arithmetic units grouped as a first arithmetic unit group among a plurality of arithmetic units in a parallel arithmetic part of the accelerator,
wherein the first arithmetic unit group of the parallel arithmetic part of the accelerator is configured to 1) sequentially receive, from the first data transfer unit, the first output data, 2) perform arithmetic operation in parallel between the first output data and each of a plurality of predetermined data, and 3) output a plurality of arithmetic operation results to the second data transfer unit, and
wherein the second data transfer unit is configured to 1) receive the plurality of arithmetic operation results from the accelerator and 2) output, to the data processing unit, the plurality of arithmetic operation results in order as the first input data,
wherein the data processing unit is configured to sequentially output second output data in parallel with the first output data,
wherein the first data transfer unit is further configured to selectively output the second output data to a plurality of arithmetic units grouped as a second arithmetic unit group different from the first arithmetic unit group among the plurality of arithmetic units in the parallel arithmetic unit of the accelerator,
wherein the second arithmetic unit group is configured to 1) sequentially receive the second output data from the first data transfer unit and 2) perform arithmetic operation in parallel between the second output data and each of the plurality of predetermined data,
wherein the first data transfer unit is set to a first mode or a second mode based on processing speed of the accelerator with respect to the processing speed of the data processing unit,
wherein, when the first data transfer unit is set to the first mode, the first data transfer unit outputs the first output data and the second output data to the first arithmetic unit group and the second arithmetic unit group, respectively, and
wherein, when the first data transfer unit is set to the second mode, the first data transfer unit selects sequentially the first output data and the second output data and outputs selected results to the first arithmetic unit group and the second arithmetic unit group.

2. The semiconductor device according to claim 1, wherein the first output data is inputted in common to each of the plurality of arithmetic units of the first arithmetic unit group, and
wherein each of the plurality of arithmetic units of the first arithmetic unit group performs the arithmetic operation between a corresponding one of the plurality of predetermined data and the first output data.

3. The semiconductor device according to claim 1, wherein each of the plurality of arithmetic units of the parallel arithmetic unit of the accelerator comprises an adder and a multiplier to perform multiply-and-accumulate operation.

4. The semiconductor device according to claim 1, wherein the second data transfer unit sequentially outputs a plurality of second arithmetic results by the second arithmetic unit group as second input data to the data processing unit, and
wherein the data processing unit performs the data processing to the second input data in parallel to the data processing to the first input data.

5. The semiconductor device according to claim 4, wherein the second data transfer unit outputs the first arithmetic results and the second arithmetic results in order as the first input data.

6. The semiconductor device according to claim 1, wherein the second data transfer unit is set to a third mode or a fourth mode based on the processing speed of the accelerator with respect to the processing speed of the data processing unit,
wherein, when the second data transfer unit is set to the third mode, the second data transfer unit outputs the first arithmetic results by the first arithmetic units in order as the first input data, and
wherein, when the second data transfer unit is set to the fourth mode, the second data transfer unit selects collectively at least two of the first arithmetic results to output as the first input data.

7. The semiconductor device according to claim 1, wherein the first data transfer unit is configured to selectively output the first output data or the second output data to the second arithmetic unit group.

8. The semiconductor device according to claim 1, wherein the first data transfer unit selects and outputs the first output data and the second output data in order to the first arithmetic unit group and the second arithmetic unit group.

9. The semiconductor device according to claim 1, wherein each of the arithmetic units comprises a plurality of arithmetic circuits and a selector selectively outputting output results of the plurality of arithmetic circuits.

10. The semiconductor device according to claim 1, wherein the data processing unit sequentially outputs the first output data as a result of the data processing to data read from an external memory, and provides a result of data processing to the first input data sequentially input, to the external memory.

11. The semiconductor device according to claim 10, wherein the data processing unit comprises a first state management unit that controls arithmetic operation for generating the first output data, and a second state management unit that controls arithmetic operation for the first input data, wherein the second state management unit is different from the first state management unit.

12. The semiconductor device according to claim 1, wherein the accelerator further comprises a local memory storing the plurality of predetermined data.

13. The semiconductor device according to claim 12, wherein a first set of arithmetic units grouped as the first arithmetic unit group and a second set of arithmetic units grouped as the second arithmetic unit group are supplied with the plurality of predetermined data read out from the local memory in common.

14. The semiconductor device according to claim 12, wherein a first set of arithmetic units in the first arithmetic unit group and a second set of arithmetic units in the second arithmetic unit group are supplied with different predetermined data read out from the local memory, respectively.

15. A method of controlling a semiconductor device, the method comprising:
receiving, at a data processing unit, sequentially first input data;
performing, using the data processing unit, data processing on the first input data;
sequentially outputting, from the data processing unit, results of the data processing as first output data;
sequentially receiving, at an accelerator, the first output data output by the data processing unit;
performing, using the accelerator, arithmetic operation in parallel between the first output data sequentially output from the data processing unit and each of a plurality of predetermined data;
receiving, at a first data transfer unit, a plurality of arithmetic operation results from the accelerator; and
outputting, from the first data transfer unit, the plurality of arithmetic operation results in order as the first input data to the data processing unit,
wherein the accelerator includes a parallel arithmetic part that includes a first arithmetic unit group having a plurality of arithmetic units,
wherein the first data transfer unit outputs a plurality of first arithmetic results by the first arithmetic unit group in order as the first input data,
wherein the first data transfer unit is set to a first mode or a second mode based on processing speed of the accelerator with respect to the processing speed of the data processing unit, wherein, when the first data transfer unit is set to the first mode, the first data transfer unit outputs the first arithmetic results by the first arithmetic units in order as the first input data, and
wherein, when the first data transfer unit is set to the second mode, the first data transfer unit selects collectively at least two of the first arithmetic results to output as the first input data.

16. A semiconductor device, comprising:
a data processing unit configured to perform data processing on first input data sequentially input, and to output first output data as a result of the data processing sequentially;
an accelerator having a parallel arithmetic part which receives the first output data sequentially and performs arithmetic operation in parallel between the first output data and each of a plurality of predetermined data; and
a first data transfer unit configured to receive a plurality of arithmetic operation results by the accelerator, to output the plurality of arithmetic operation results in order as the first input data,
wherein the parallel arithmetic part includes a first arithmetic unit group having a plurality of arithmetic units,
wherein the first data transfer unit outputs a plurality of first arithmetic results by the first arithmetic unit group in order as the first input data,
wherein the first data transfer unit is set to a first mode or a second mode based on processing speed of the accelerator with respect to the processing speed of the data processing unit,
wherein, when the first data transfer unit is set to the first mode, the first data transfer unit outputs the first arithmetic results by the first arithmetic units in order as the first input data, and
wherein, when the first data transfer unit is set to the second mode, the first data transfer unit selects collectively at least two of the first arithmetic results to output as the first input data.

17. The semiconductor device according to claim 16, further comprises a second data transfer unit selectively outputting the first output data to the first arithmetic unit group in the parallel arithmetic part.

18. The semiconductor device according to claim 17, wherein the data processing unit is configured to sequentially output second output data in parallel with the first output data, and
wherein the second data transfer unit is configured to selectively output the second output data to a plurality of arithmetic units grouped as a second arithmetic unit group different from the first arithmetic unit group among the plurality of arithmetic units in the parallel arithmetic unit.

19. The semiconductor device according to claim 18, wherein the second data transfer unit is set to a third mode or a fourth mode based on processing speed of the accelerator with respect to the processing speed of the data processing unit,
wherein, when the second data transfer unit is set to the third mode, the second data transfer unit outputs the first output data and the second output data to the first arithmetic unit group and the second arithmetic unit group, respectively,
wherein, when the second data transfer unit is set to the fourth mode, the second data transfer unit selects sequentially the first output data and the second output data and outputs selected results to the first arithmetic unit group and the second arithmetic unit group.

* * * * *